United States Patent
Tagawa

(10) Patent No.: US 7,643,187 B2
(45) Date of Patent: Jan. 5, 2010

(54) IMAGE PROCESSING APPARATUS AND PREVIEW IMAGE DISPLAYING METHOD

(75) Inventor: Yukio Tagawa, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 286 days.

(21) Appl. No.: 11/686,662

(22) Filed: Mar. 15, 2007

(65) Prior Publication Data
US 2007/0216973 A1 Sep. 20, 2007

(30) Foreign Application Priority Data
Mar. 16, 2006 (JP) ............................ 2006-073406
Mar. 9, 2007 (JP) ............................ 2007-060381

(51) Int. Cl.
- G03F 3/10 (2006.01)
- G06K 15/00 (2006.01)
- G06F 17/00 (2006.01)
- G06K 9/36 (2006.01)
- G03G 15/04 (2006.01)

(52) U.S. Cl. ...................... 358/527; 358/1.14; 358/1.9; 715/203; 715/204; 715/274; 382/292; 399/193

(58) Field of Classification Search ................. 358/527, 358/1.14, 1.9; 715/527, 530, 517, 526, 203, 715/204, 274; 382/317, 292; 399/193; 270/58.11
See application file for complete search history.

(56) References Cited

U.S. PATENT DOCUMENTS

| | | | |
|---|---|---|---|
| 4,871,158 A * | 10/1989 | May et al. ................. 270/58.11 |
| 6,115,510 A | 9/2000 | Koga |
| 6,473,539 B1 * | 10/2002 | Koga .......................... 382/317 |
| 6,927,865 B1 | 8/2005 | Kujirai et al. |
| 2001/0024195 A1 | 9/2001 | Hayakawa |
| 2002/0186983 A1 | 12/2002 | Asai |
| 2004/0165207 A1 | 8/2004 | Kashiwagi |
| 2005/0243371 A1 | 11/2005 | Kanaya et al. |
| 2006/0114490 A1 * | 6/2006 | Rolleston .................... 358/1.14 |
| 2007/0143671 A1 * | 6/2007 | Paterson et al. ............. 715/527 |

FOREIGN PATENT DOCUMENTS

| | | |
|---|---|---|
| JP | 2001-45239 | 2/2001 |
| JP | 2004-234261 | 8/2004 |

* cited by examiner

*Primary Examiner*—Edward L Coles
*Assistant Examiner*—Charlotte M Baker
(74) *Attorney, Agent, or Firm*—Oblon, Spivak, McClelland, Maier & Neustadt, L.L.P.

(57) ABSTRACT

An image processing apparatus which previews a read image is disclosed. The image processing apparatus includes a preview image processing unit in which a user is allowed to set a processing condition for the read preview image by operating on the read preview image and a preview image processed by the processing condition is displayed together with the setting of the processing condition on a displaying section.

19 Claims, 62 Drawing Sheets

FIG.13
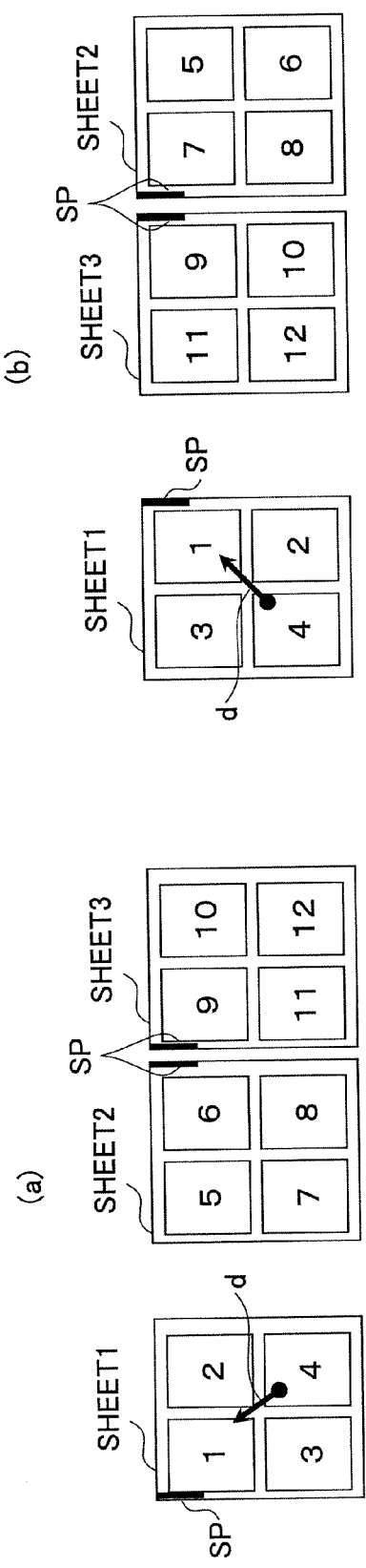
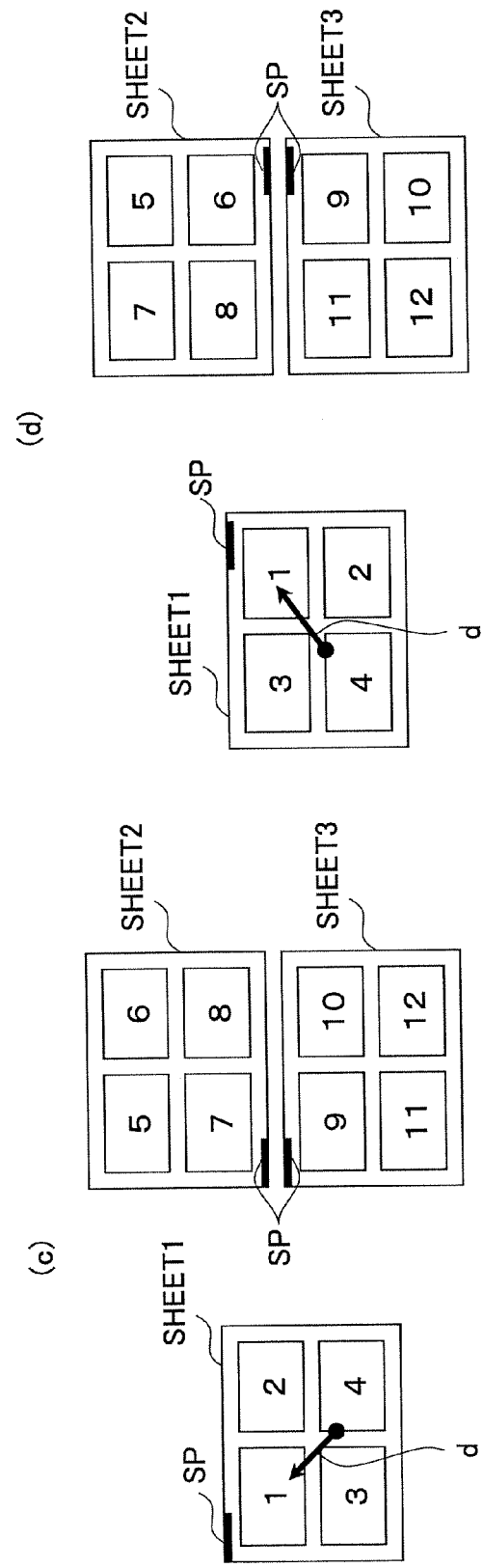

FIG.16

| BINDING METHOD | | PAGE TURNING DIRECTION | LEFT DIRECTION TURNING | | RIGHT DIRECTION TURNING | | UPPER DIRECTION TURNING | |
|---|---|---|---|---|---|---|---|---|
| | | | HORIZONTAL WRITING | VERTICAL WRITING | HORIZONTAL WRITING | VERTICAL WRITING | HORIZONTAL WRITING | VERTICAL WRITING |
| 2-POSITION STAPLING | POSITION | | LEFT SIDE | LEFT SIDE | RIGHT SIDE | RIGHT SIDE | UPPER SIDE | UPPER SIDE |
| | REAR SURFACE DIRECTION FOR FRONT SURFACE | | SAME | SAME | SAME | SAME | HEAD AND TAIL REVERSED | HEAD AND TAIL REVERSED |
| 1-POSITION STAPLING | POSITION | | LEFT SIDE | LEFT SIDE | RIGHT SIDE | RIGHT SIDE | UPPER SIDE | UPPER SIDE |
| | REAR SURFACE DIRECTION FOR FRONT SURFACE | | SAME | SAME | SAME | SAME | SAME | HEAD AND TAIL REVERSED |
| PUNCH | POSITION | | LEFT SIDE | LEFT SIDE | RIGHT SIDE | RIGHT SIDE | UPPER SIDE | UPPER SIDE |
| | REAR SURFACE DIRECTION FOR FRONT SURFACE | | SAME | SAME | SAME | SAME | HEAD AND TAIL REVERSED | HEAD AND TAIL REVERSED |

92 TABLE

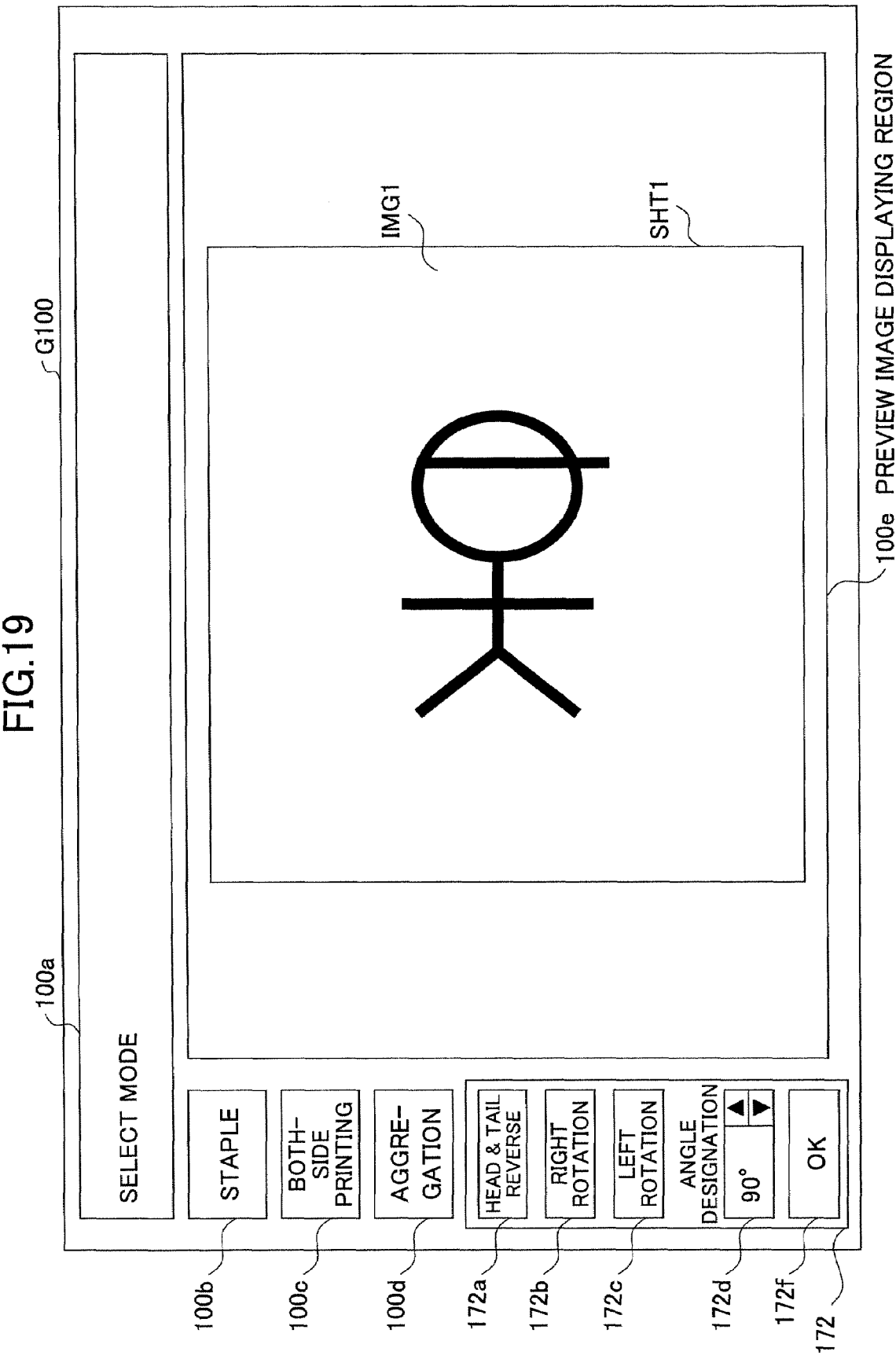

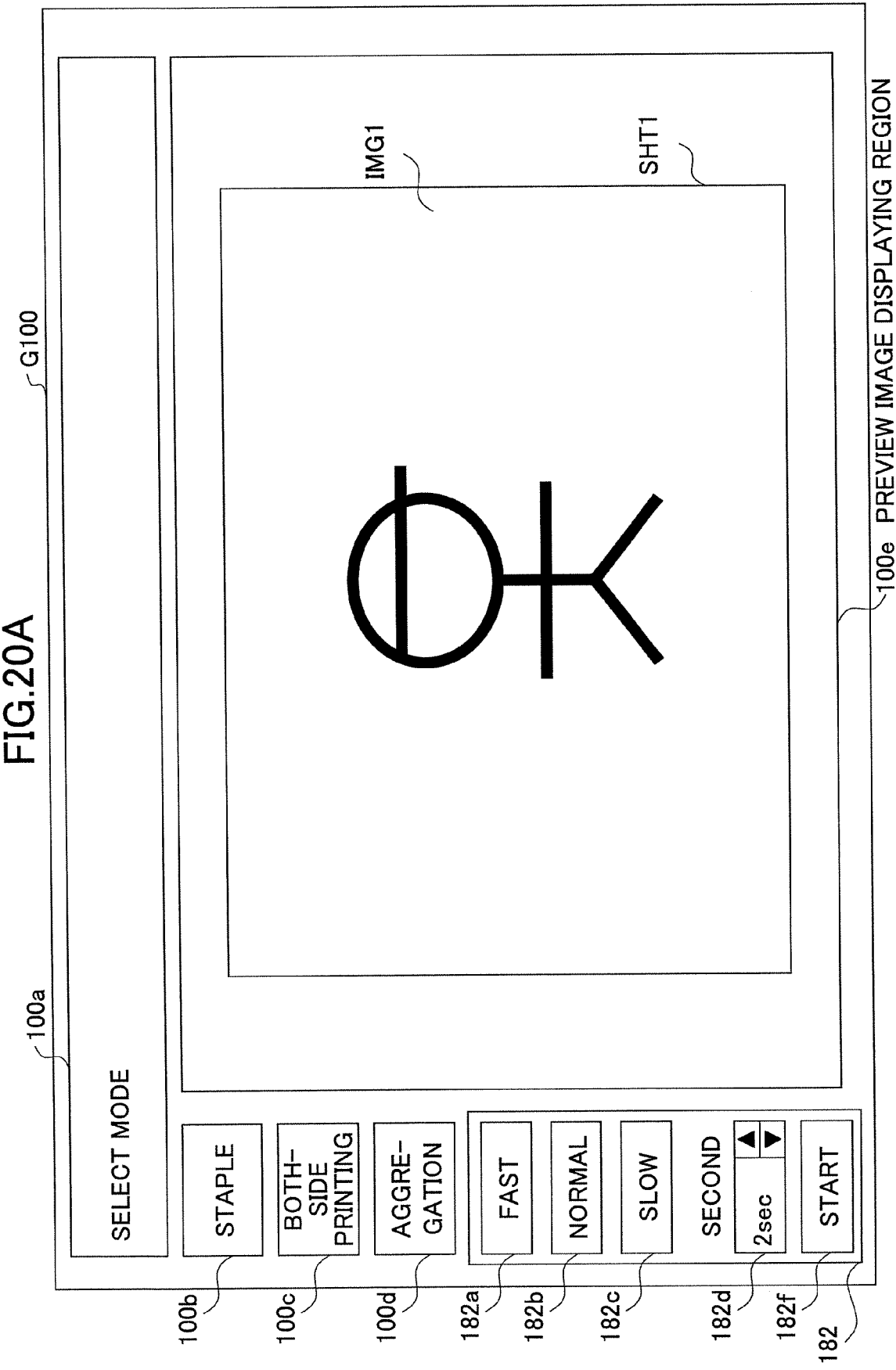

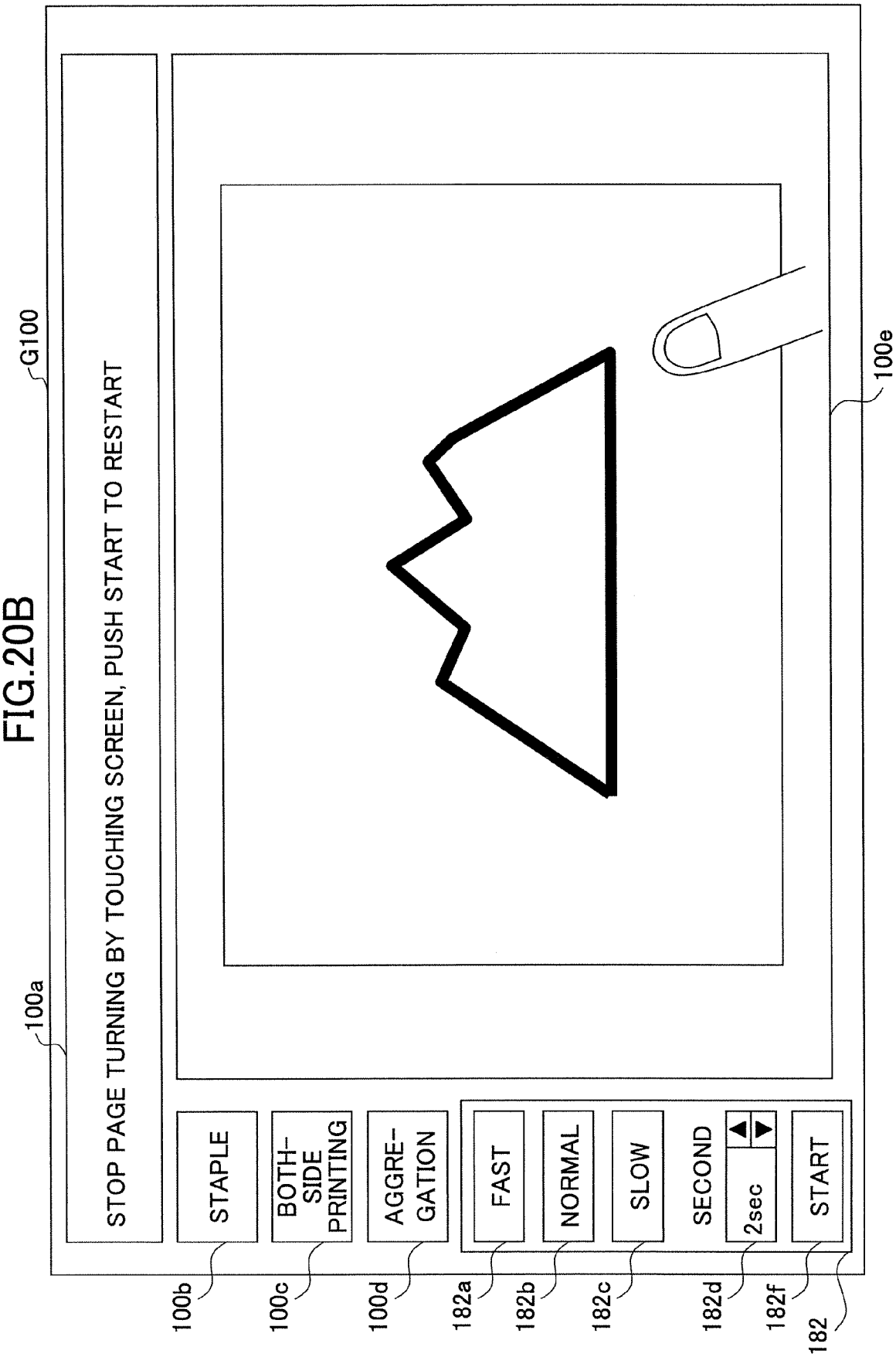

FIG.22
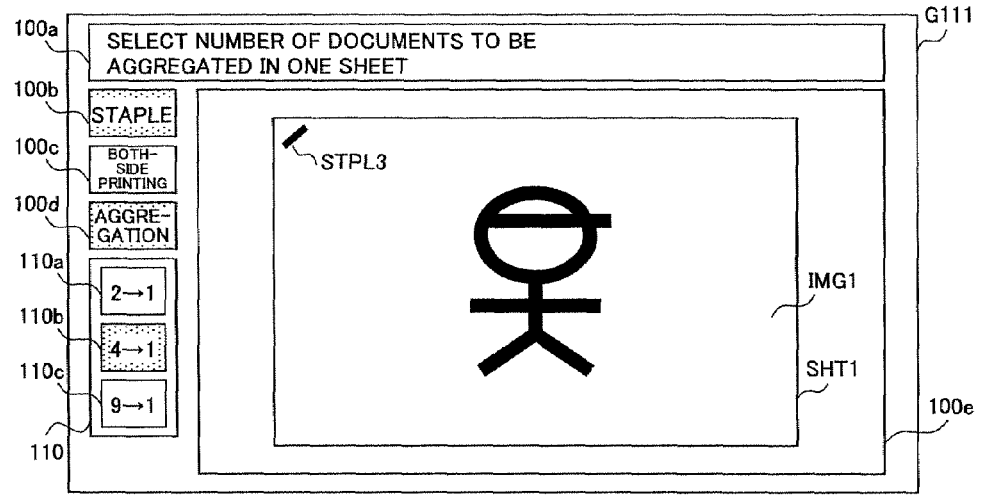
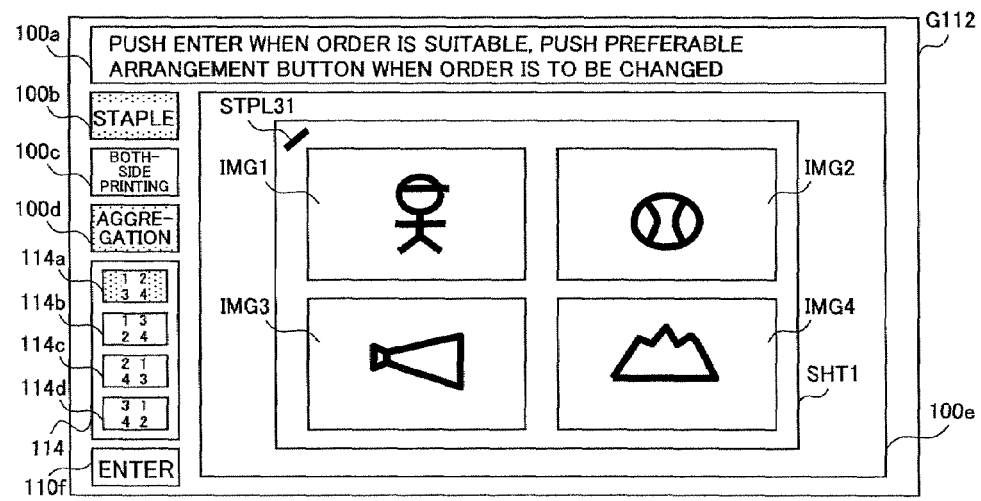
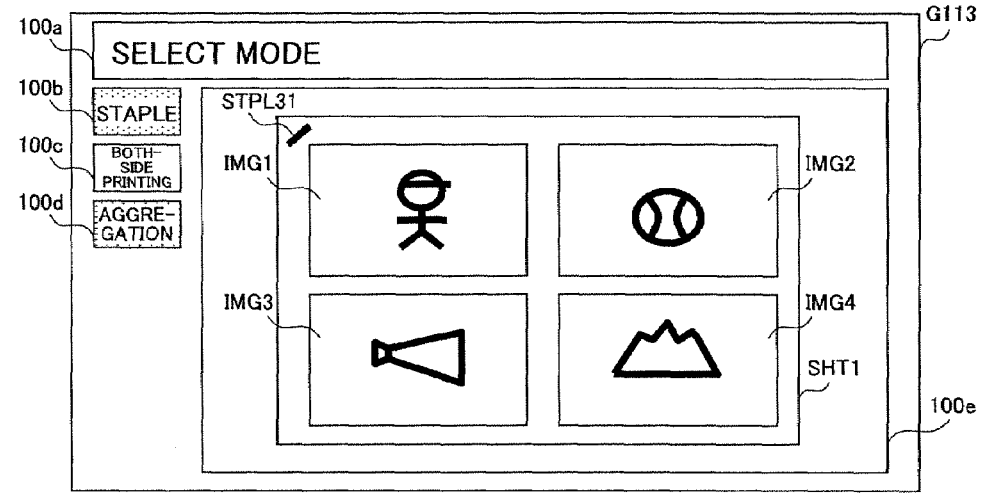

FIG.25
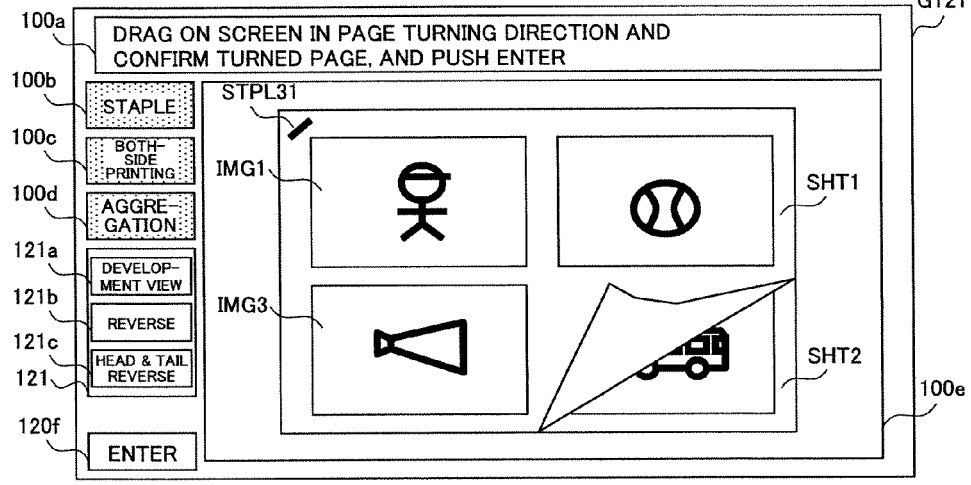
(a)
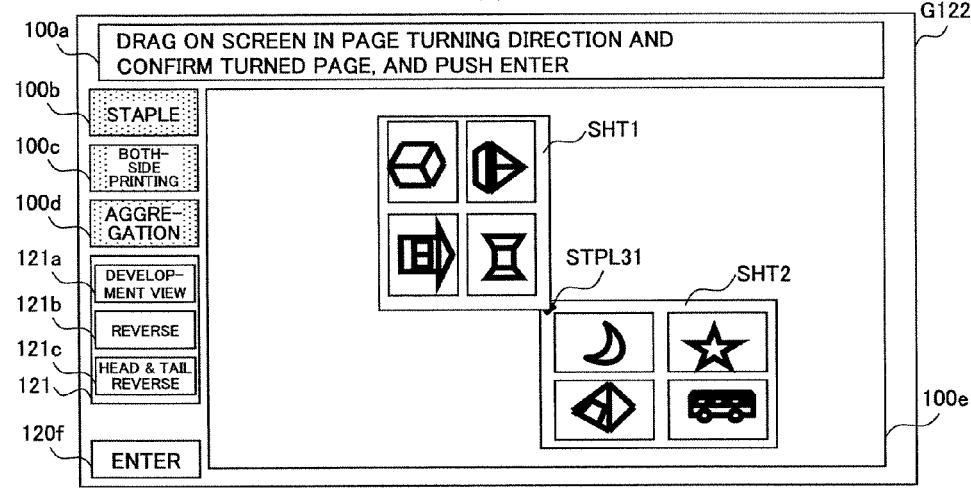
(b)
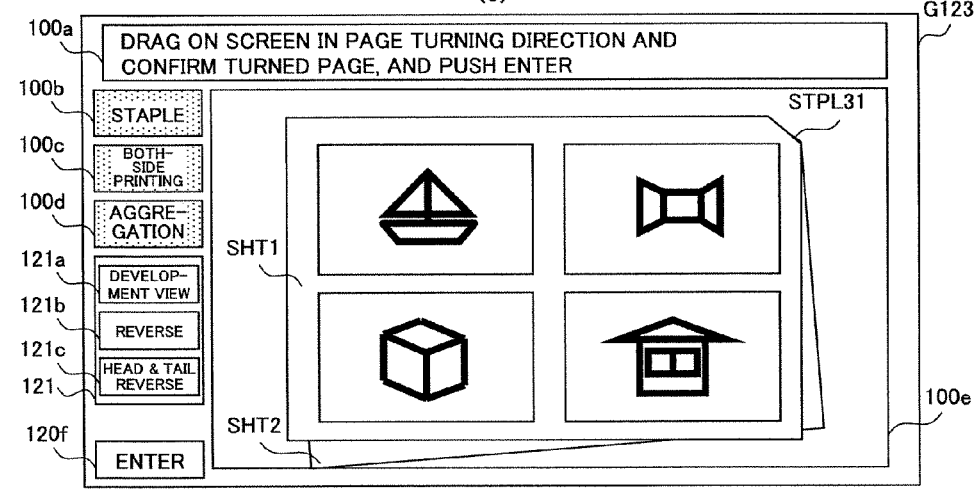
(c)

FIG.31
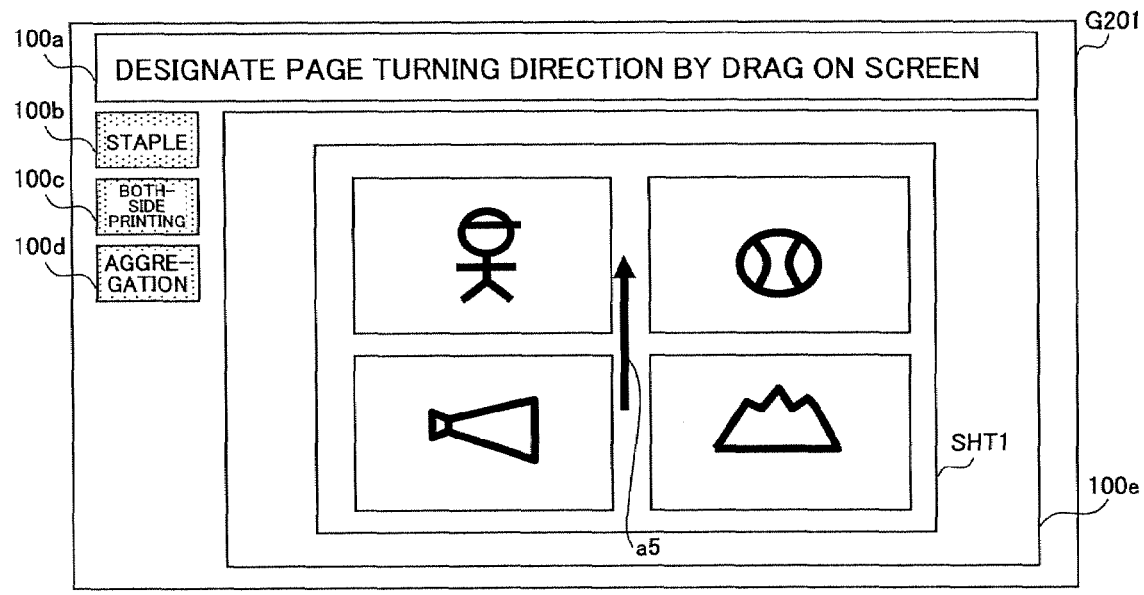
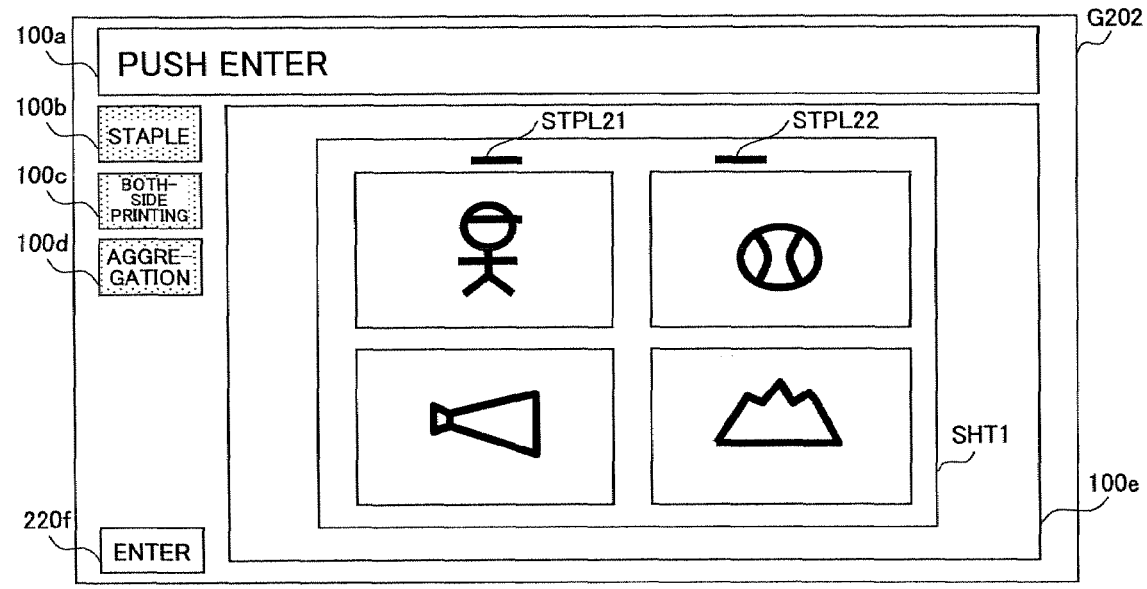

FIG.33
(a)
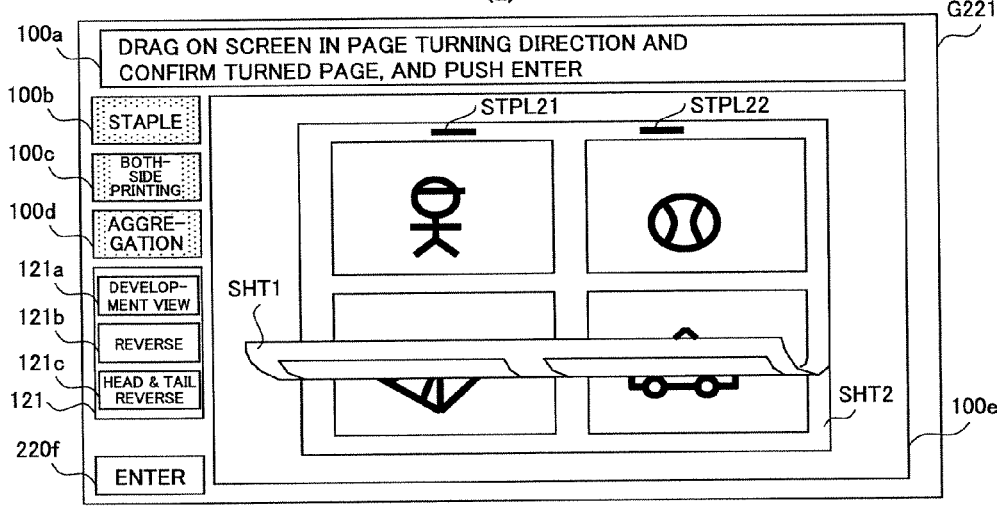
(b)
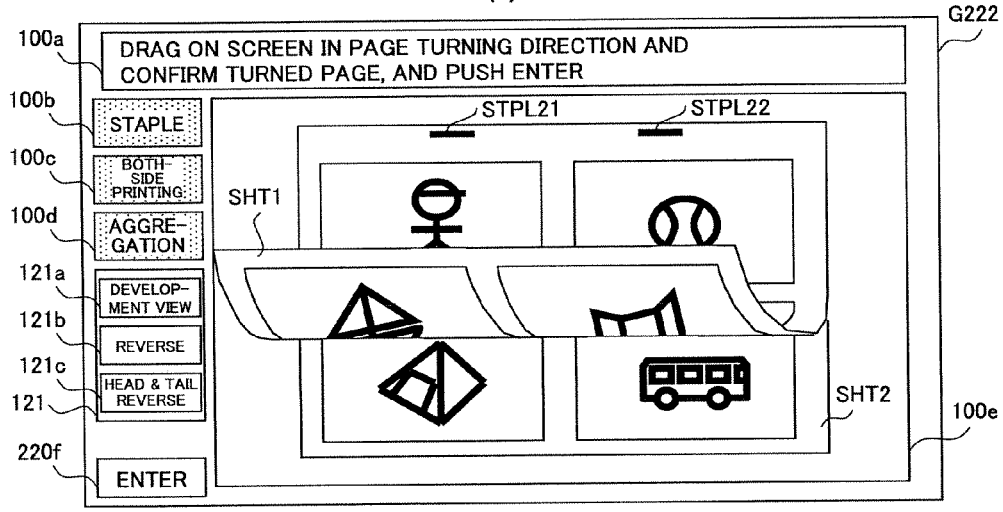
(c)
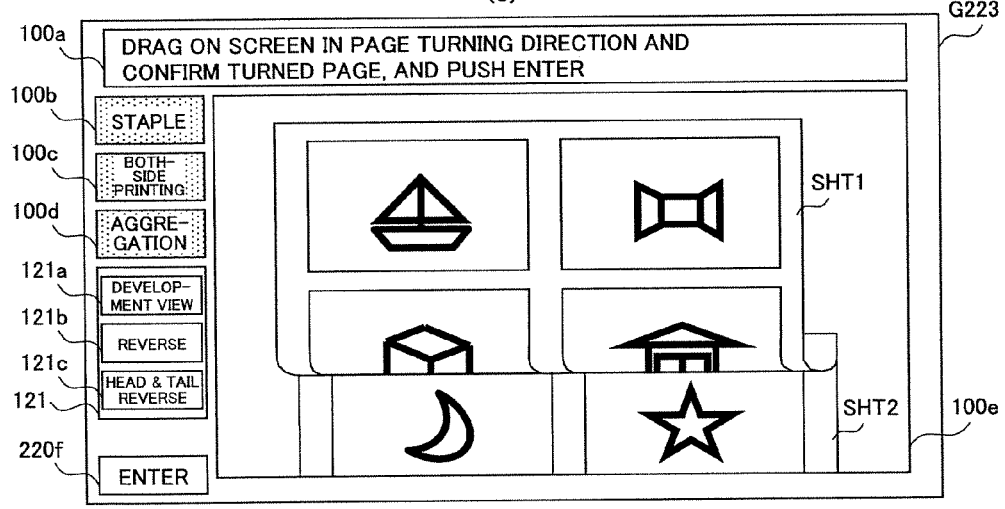

FIG.37
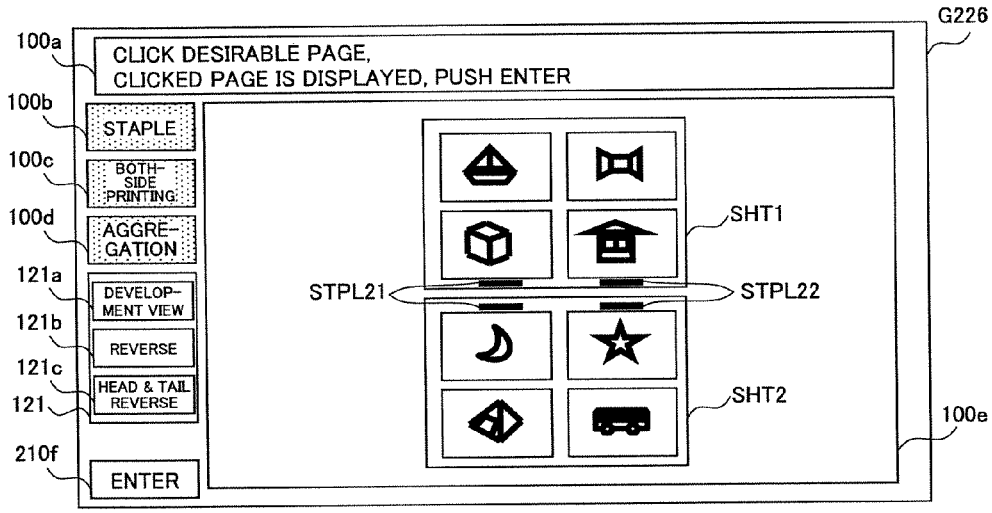
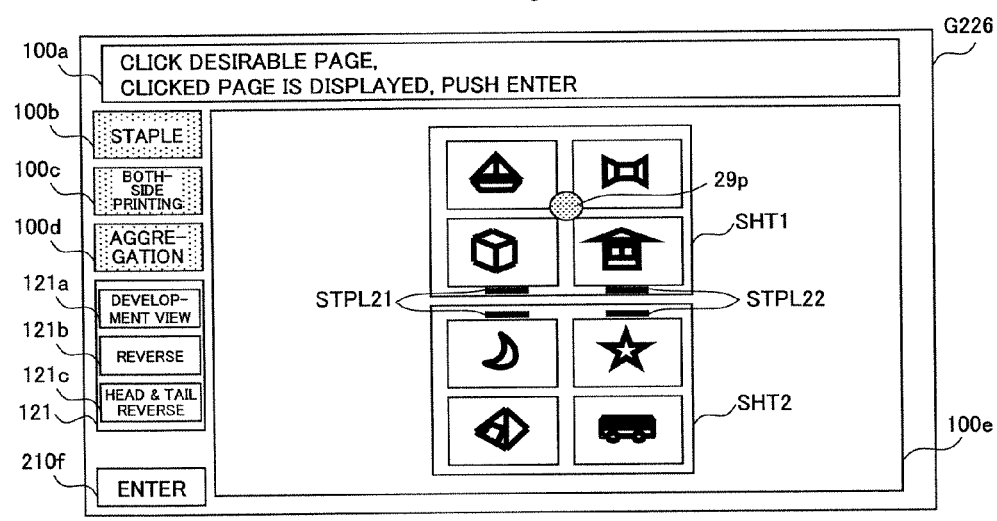
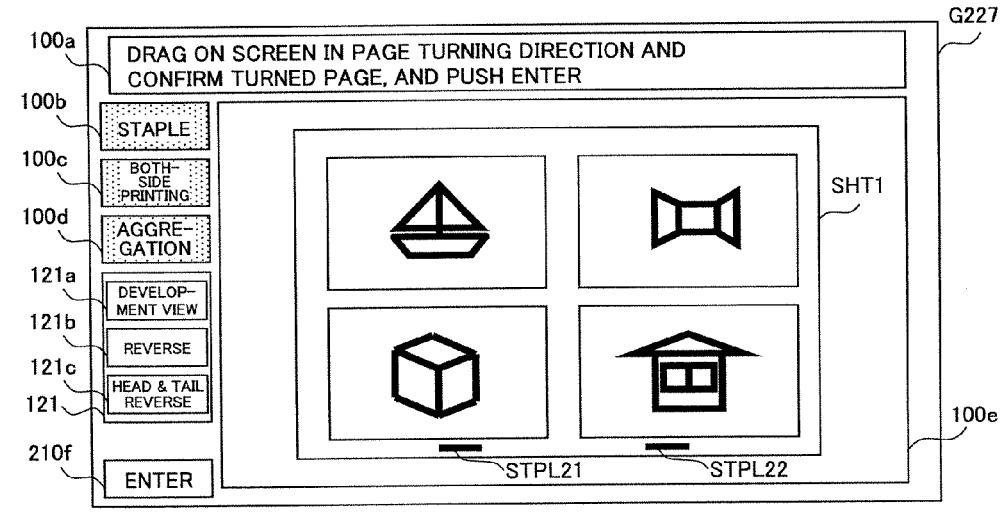

FIG.48
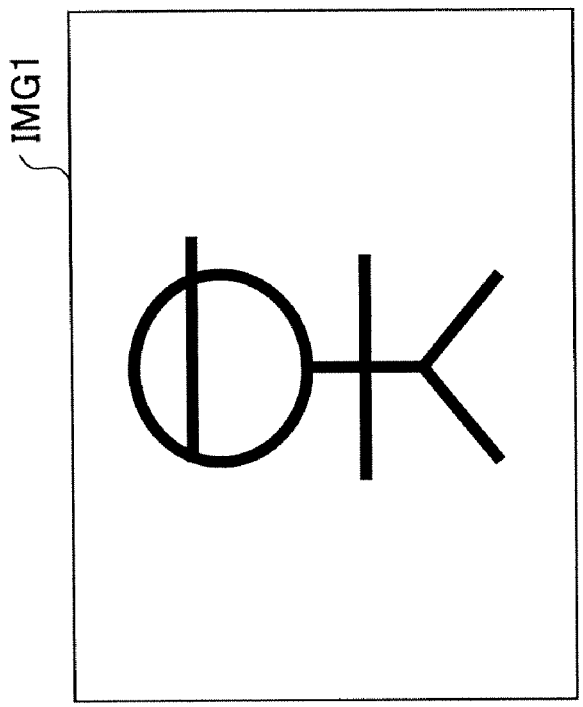
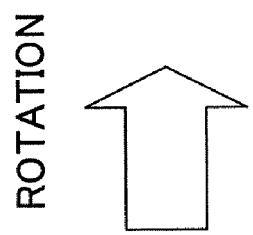
ROTATION
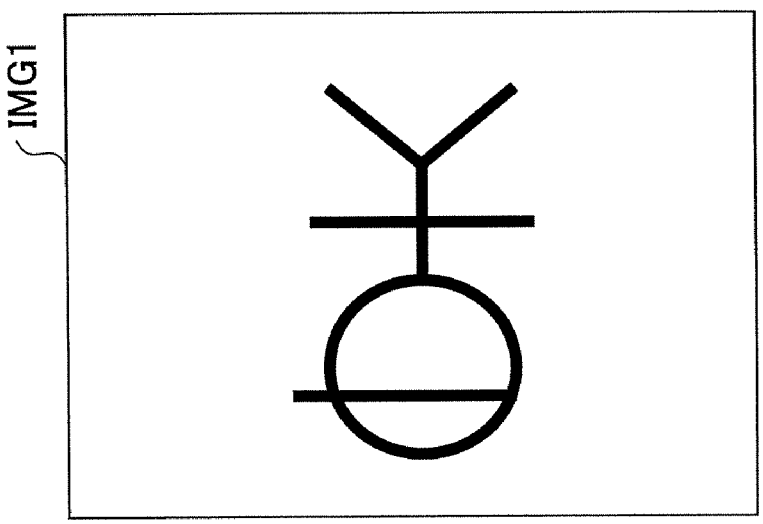

FIG.55
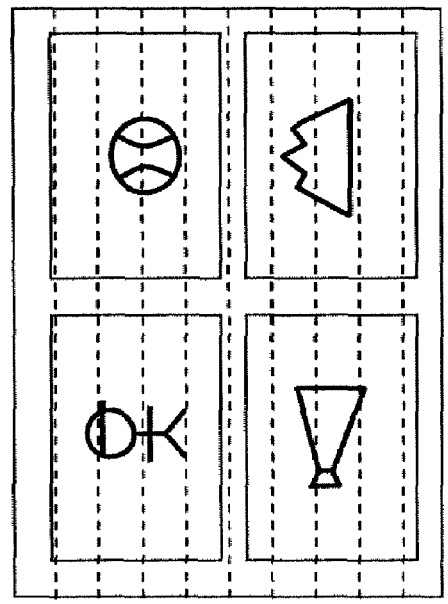
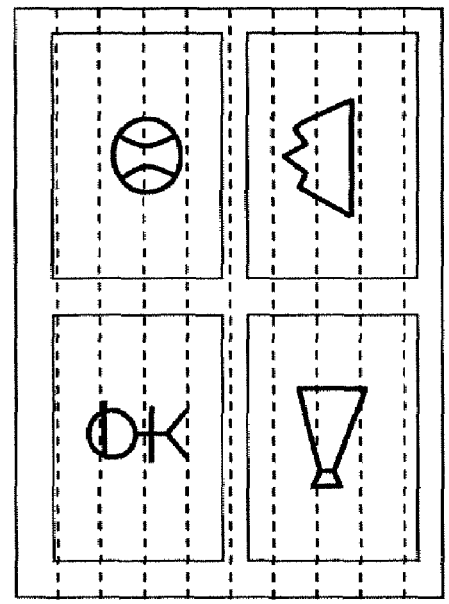
FROM FIG. 54 →

FIG.60
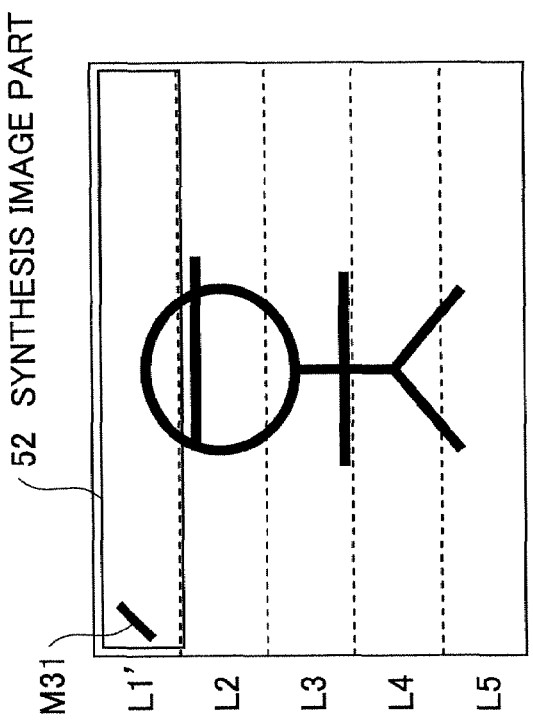
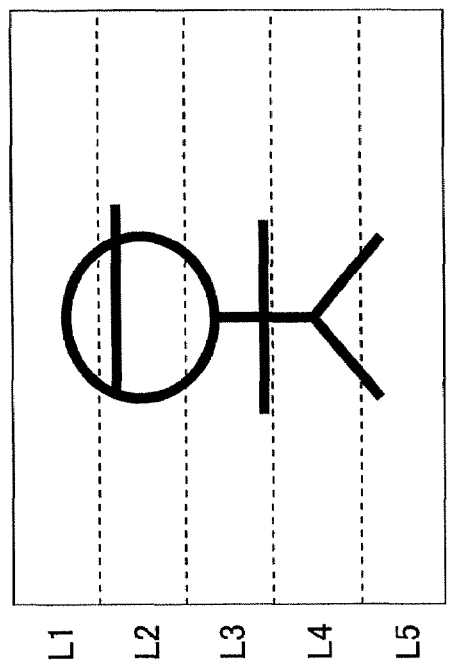

FIG.61
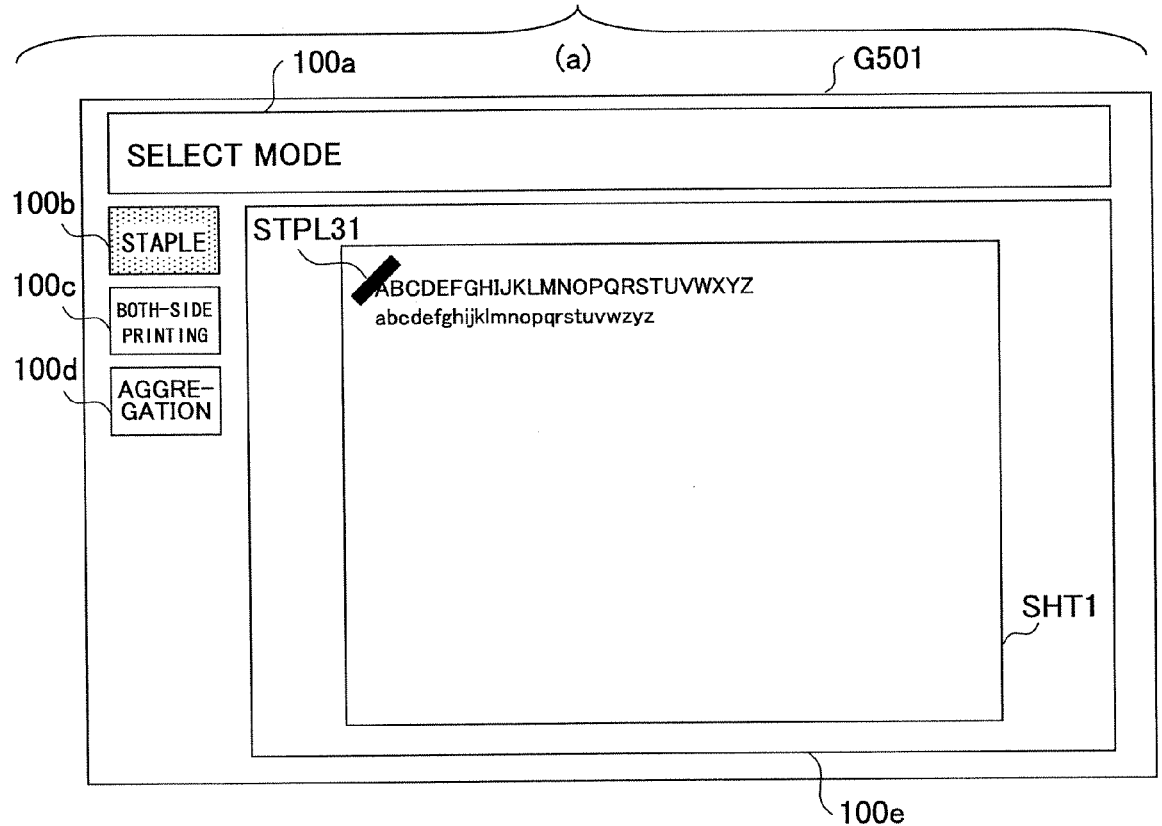
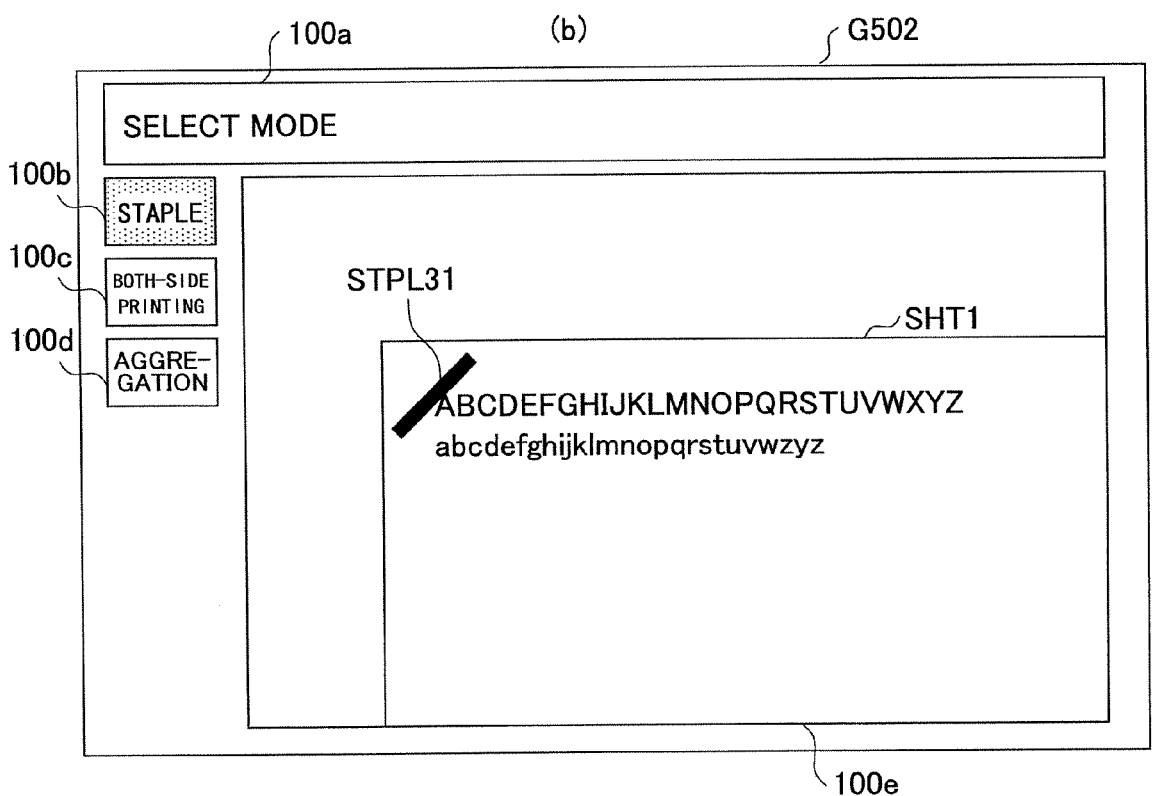

IMAGE PROCESSING APPARATUS AND PREVIEW IMAGE DISPLAYING METHOD

BACKGROUND OF THE INVENTION

1. Field of the Invention

The present invention generally relates to an image processing apparatus and a preview image displaying method in the image processing apparatus which allows operability close to human senses.

2. Description of the Related Art

Recently, in an image processing apparatus having a copying function, a scanning function, and so on, a method is proposed in which a processing condition by a user is easily determined when an image is formed by using the above function.

For example, in Patent document 1, an image processing apparatus is disclosed. In the image processing apparatus, an image is pre-scanned by selecting a reading condition in a scanner and a reading condition having a high recognition rate is automatically selected by applying an OCR (optical character recognition) process to the pre-scanned image. With this, the processing condition is easily determined by the user.

In addition, in Patent Document 2, a scanner and a control method thereof are disclosed. In the scanner, a preview image pre-scanned by a user is rotated corresponding to necessity, and the user scans the image by setting a suitable rotational angle.

[Patent Document 1] Japanese Laid-Open Patent Application No. 2004-234261

[Patent Document 2] Japanese Laid-Open Patent Application No. 2001-045239

However, when a user copies images (documents) by setting processing conditions such as both-side printing, aggregation of pages, and stapling sheets; an output document may be different from that the user desires to obtain. Consequently, the user tries a copy of the images by setting processing conditions, and confirms the copied document. Then, the user changes the processing conditions, if necessary.

In some cases, corresponding to the settings of the processing conditions, documents are stapled, and a thumbnail image of the staple documents is displayed. However, the stapled image is displayed in a fixed small image from which the stapled status is hardly recognized.

Consequently, the user cannot recognize whether the documents are stapled by the set processing conditions before the document is actually printed.

That is, in the conventional method, a visually recognition method of the status to be output and a changing method of settings are not provided. Therefore, the user cannot easily determine the settings of the processing conditions visually and intuitively before an image is output.

SUMMARY OF THE INVENTION

In a preferred embodiment of the present invention, there is provided an image processing apparatus and a preview image displaying method in the image processing apparatus which allows operability close to human senses.

Features and advantages of the present invention are set forth in the description that follows, and in part will become apparent from the description and the accompanying drawings, or may be learned by practice of the invention according to the teachings provided in the description. Features and advantages of the present invention will be realized and attained by an image processing apparatus and a preview image displaying method in the image processing apparatus particularly pointed out in the specification in such full, clear, concise, and exact terms as to enable a person having ordinary skill in the art to practice the invention.

To achieve one or more of these and other advantages, according to one aspect of the present invention, there is provided an image processing apparatus which previews a read image. The image processing apparatus includes a preview image processing unit in which a user is allowed to set a processing condition for the read preview image by operating on the read preview image and a preview image processed by the processing condition is displayed together with the setting of the processing condition on a displaying section.

EFFECT OF THE INVENTION

According to an embodiment of the present invention, a user can set a processing condition for printing an image by directly operating a preview image. In addition, the processing condition can be set by a click and a drag on the preview image. Therefore, the user can visually and intuitively set the processing condition.

Moreover, the user can designate a staple position by touching a desirable position on the preview image. In addition, operability of the user can be increased by operation buttons and an operation on the preview image.

BRIEF DESCRIPTION OF THE DRAWINGS

Features and advantages of the present invention will become more apparent from the following detailed description when read in conjunction with the accompanying drawings, in which:

FIG. 13 is a diagram showing a relationship between a staple position and a page turning direction when the staple position is at the upper side;

FIG. 16 is a table in which a binding method of a document and a page turning direction of the document are shown by correlating with each other;

FIG. 19 is a diagram showing a screen on which a rotated preview image is displayed by pushing a rotation button shown in FIG. 18;

FIG. 20A is a diagram showing a screen on which a preview image is displayed by pushing an automatic page turning button shown in FIG. 18;

FIG. 20B is a diagram showing a screen on which a preview image on a page is displayed by pushing a start button shown in FIG. 20A;

FIG. 22 is a diagram showing processes for designating a document aggregation;

FIG. 25 is a diagram showing screens in which documents are turned;

FIG. 31 is a diagram showing screens of a preview image in which a staple position is determined by designating the page turning direction;

FIG. 33 is a diagram showing screens in which the first sheet image is turned;

FIG. 37 is a diagram showing processes to display a development view;

FIG. 48 is a diagram showing first document images when the image is read and displayed by being applied a rotation method;

FIG. 55 is a diagram showing a fourth screen flow in which a preview image having the four reduced document images is displayed;

FIG. 60 is a screen flow when a staple mark is attached to a preview image; and

FIG. 61 is a diagram showing screens of preview images in which the staple position is determined.

DESCRIPTION OF THE PREFERRED EMBODIMENTS

Best Mode of Carrying Out the Invention

The best mode of carrying out the present invention is described with reference to the accompanying drawings.

Figure 1:
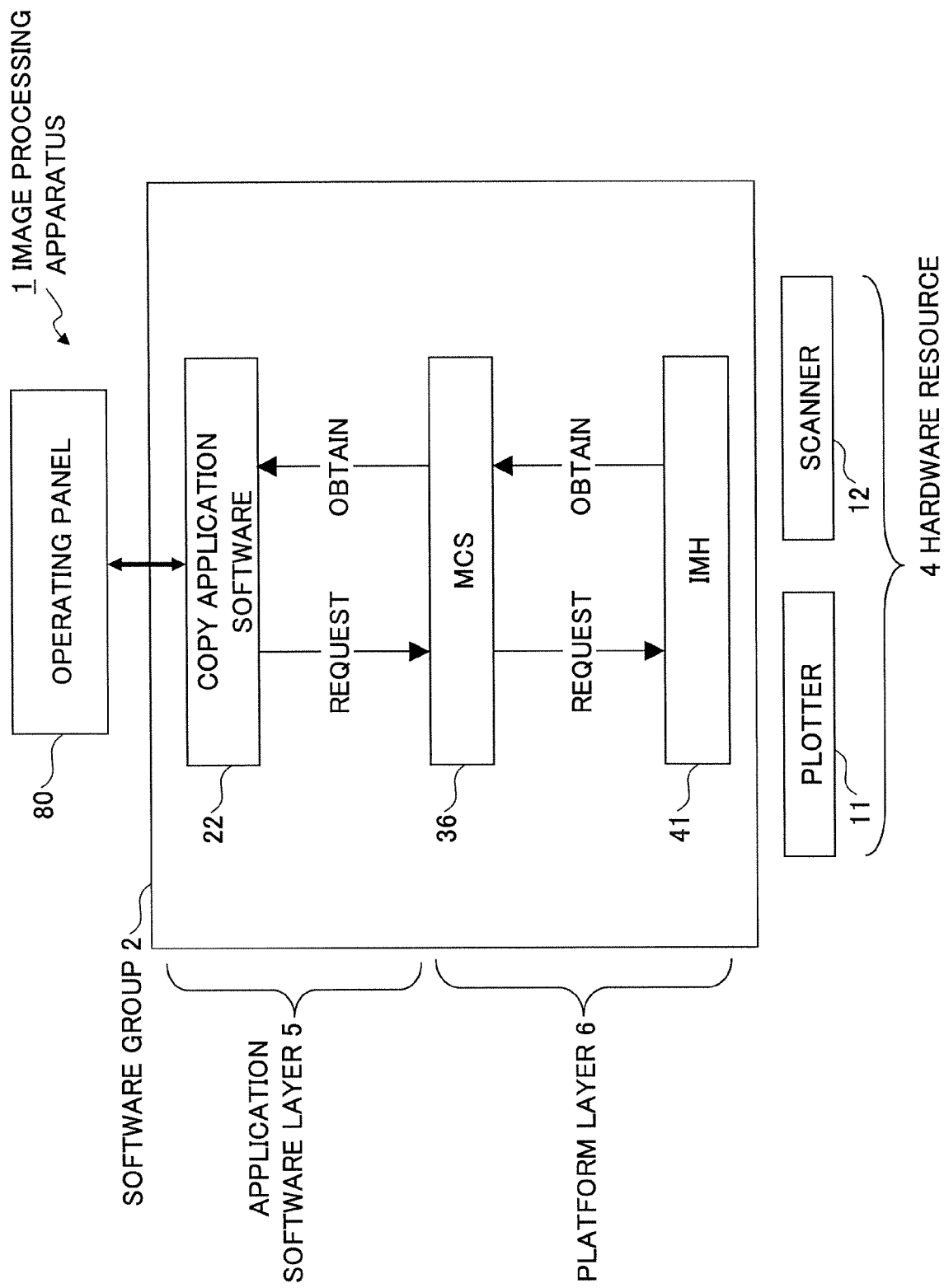
FIG. 1 is a block diagram showing functions of an image processing apparatus according to an embodiment of the present invention.

FIG. 1 is a block diagram showing functions of an image processing apparatus according to an embodiment of the present invention. As shown in FIG. 1, an image processing apparatus 1 includes a software group 2, a hardware resource 4, and an operating panel 80. In the image processing apparatus 1 shown in FIG. 1, in order to make the description concise, only elements necessary for the present invention are shown.

The software group 2 includes various functions to be realized by programs which are executed by a CPU (central processing unit) 61 (described below) in a controller 60 (described below). The hardware resource 4 includes a plotter 11, a scanner 12, and so on. The operating panel 80 receives an instruction from a user and displays information for the user.

The software group 2 includes an application layer 5 and a platform layer 6. An OS (operating system) on the application layer 5 and the platform layer 6 executes software in the application layer 5 and the platform layer 6 in parallel.

The application layer 5 includes, for example, copy application software 22 for supplying a copy function to a user. The application layer 5 can include other application software.

The platform layer 6 manages the use of the hardware resource 4 by interpreting a process request from the application layer 5. The platform layer 6 includes an MCS (memory control service) 36 and an IMH (image memory handler) 41. The MCS 36 obtains a memory region and releases the obtained memory region, utilizes an HDD (described below), controls compressing image data and expanding the compressed image data, and controls other functions. The IMH 41 manages a memory.

When the copy application software 22 requests the MCS 36 to obtain an image for previewing the image, the MCS 36 requests the IMH 41 to obtain an image read by the scanner 12. When the scanner 12 obtains an image requested by the IMH 41, the scanner 12 informs the IMH 41 of obtaining the image. The IMH 41 informs the MCS 36 of obtaining the image. The MCS 36 informs the copy application software 22 of obtaining the image. The copy application software 22 communicates with the operating panel 80 so that the obtained image is previewed.

The preview image is displayed on the operating panel 80, and a user performs a desirable operation on the preview image on the operating panel 80. When processing conditions are determined by a user operation, the copy application software 22 receives the processing conditions from the operating panel 80 and makes the IMH 41 execute a process on the image read by the scanner 12 via the MCS 36. The IMH 41 makes the plotter 11 form an image on a predetermined recording medium on which image the process is to be applied.

Figure 2:
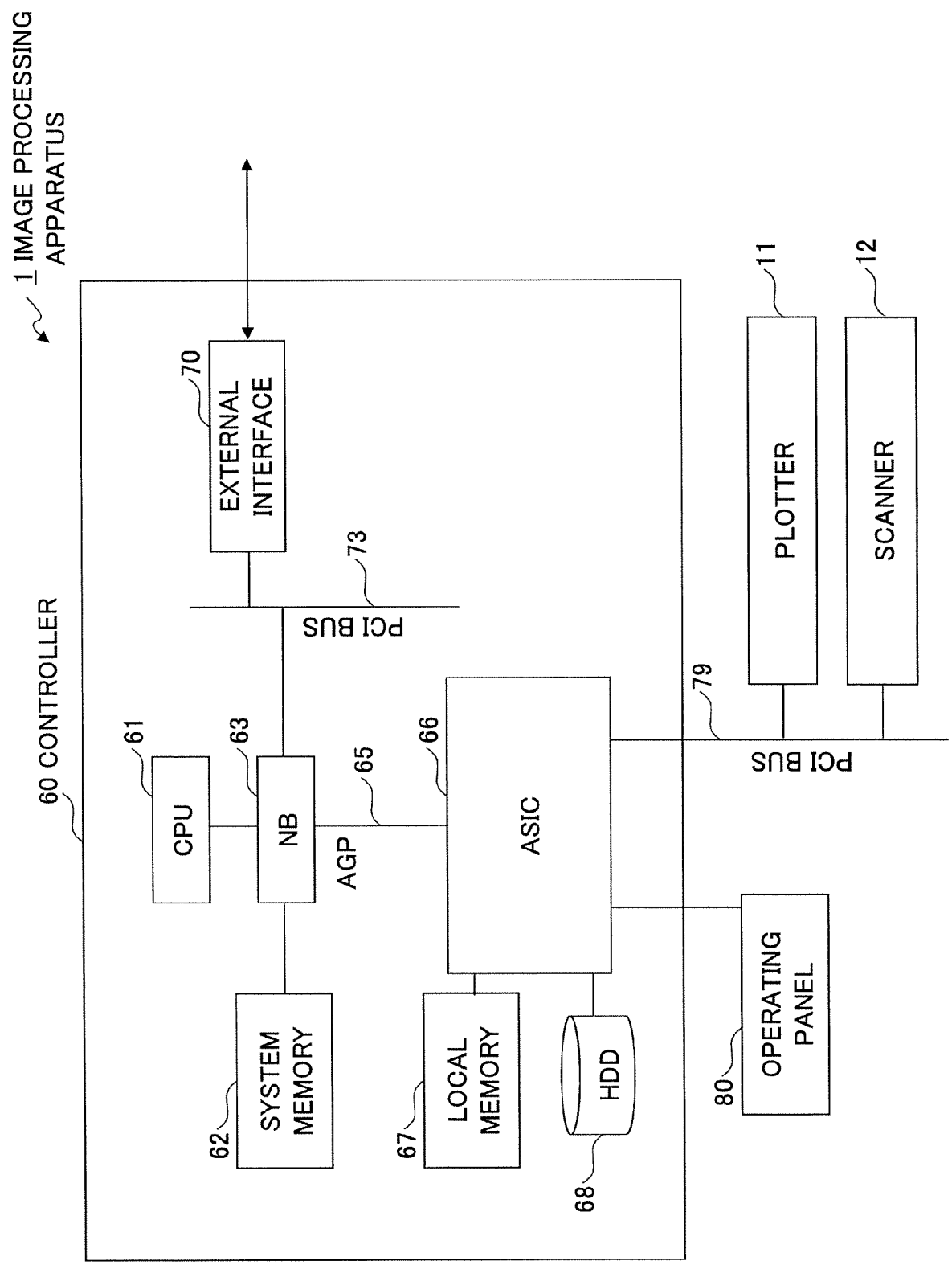
FIG. 2 is a block diagram showing hardware of the image processing apparatus.

FIG. 2 is a block diagram showing hardware of the image processing apparatus 1. As shown in FIG. 2, the image processing apparatus 1 includes the controller 60, the operating panel 80, the plotter 11 and the scanner 12.

As shown in FIG. 2, the controller 60 includes the CPU 61, a system memory 62, an NB (north bridge) 63, an ASIC (application specific integrated circuit) 66, a local memory 67, a HDD (hard disk drive) 68, and an external interface 70.

The operating panel 80 is connected to the ASIC 66. The plotter 11 and the scanner 12 are connected to the ASIC 66 via a PCI (peripheral component interconnect) bus 79.

The local memory 67 and the HDD 68 are connected to the ASIC 66, and the CPU 61 is connected to the ASIC 66 via the NB 63 which is a CPU chip set. The ASIC 66 is connected to the NB 63 via an AGP (accelerated graphic port) 65.

The CPU 61 controls all the elements in the image processing apparatus 1. The CPU 61 operates the MCS 36 and the IMH 41 on the OS, and operates the copy application software 22 in the application layer 5.

The NB 63 connects the CPU 61 to the system memory 62, the ASIC 66, and the external interface 70. The NB 63 is connected to the external interface 70 via a PCI bus 73.

The system memory 62 stores image data for writing. The local memory 67 is a buffer for storing image data for copying and for storing code data. The ASIC 66 is an image processing IC having hardware elements. The HDD 68 is storage for storing image data, document data, programs, font data, form data, and so on.

The external interface 70 connects the image processing apparatus 1 to a network such as the Internet and a LAN.

Figure 3:
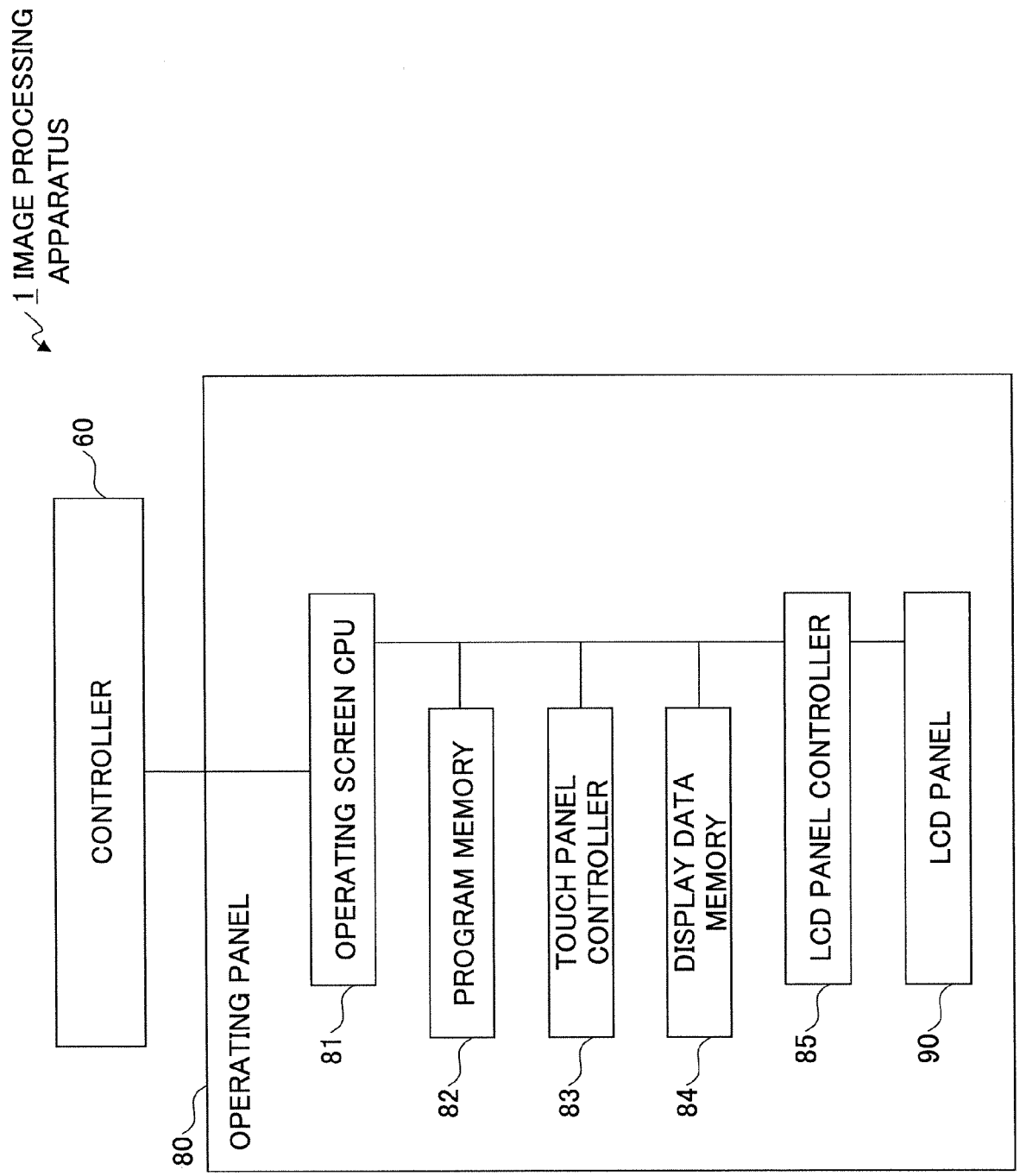
FIG. 3 is a block diagram showing an operating panel in detail in the image processing apparatus.

FIG. 3 is a block diagram showing the operating panel 80 in detail in the image processing apparatus 1. As shown in FIG. 3, the operating panel 80 includes an operating screen CPU 81, a program memory 82, a touch panel controller 83, a display data memory 84, a LCD (liquid crystal display) panel controller 85, and an LCD panel 90.

The operating screen CPU 81 controls all the elements in the operating panel 80 by communicating with the controller 60. In addition, the operating screen CPU 81 controls a display on the LCD panel 90 by reading a program stored in the program memory 82 and executing the program.

The program memory 82 stores all the programs for controlling all the elements in the operating panel 80. The touch panel controller 83 controls the LCD panel 90 corresponding to a user operation on a screen displayed on the LCD panel 90 via the LCD panel controller 85. The display data memory 84 stores image data which are used for displaying a preview image. The LCD panel controller 85 controls a display on the LCD panel 90 corresponding to the user operation. The LCD panel 90 provides a touch panel function.

Figure 4:
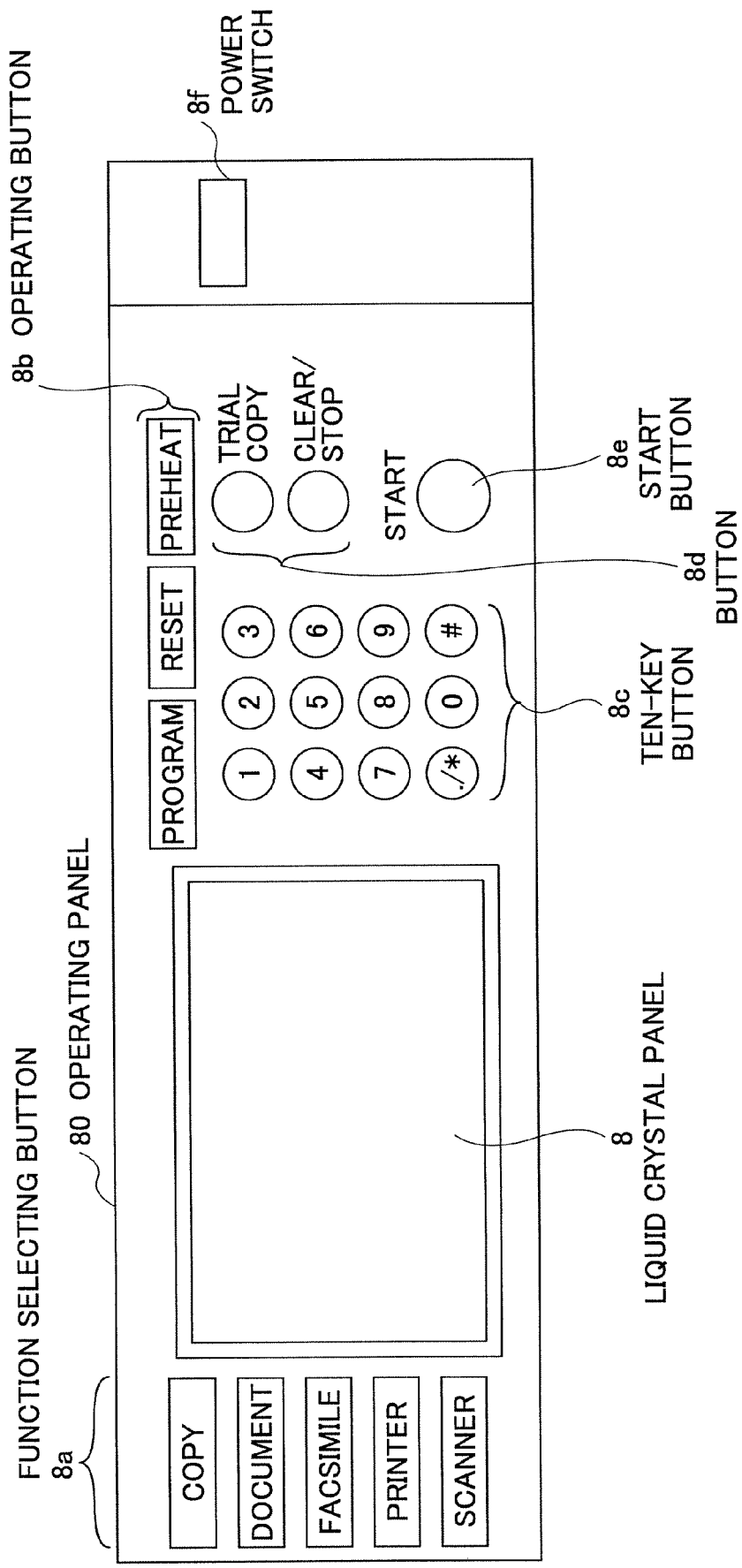
FIG. 4 is a diagram showing an upper surface of the operating panel.

FIG. 4 is a diagram showing an outline of the operating panel 80. As shown in FIG. 4, the operating panel 80 includes a liquid crystal panel 8, a function selecting button 8a, an operating button 8b, ten-key buttons 8c, buttons 8d, a start button 8e, and a power switch 8f.

A preview image (described below) is displayed on the liquid crystal panel 8. The function selecting button 8a includes a copy button, a document button, a facsimile button, a printer button, and a scanner button; and one of the buttons is selected by a user. The operating button 8b includes a program button, a reset button, and a preheat button.

From the ten-key button 8c, the user inputs a figure. The button 8d includes a trial copy button and clear/stop buttons for canceling the operation. The user starts operations by pushing the start button 8e. The power of the image processing apparatus 1 is turned on by pushing the power switch 8f.

Next, referring to FIGS. 1 through 9, the IMH 41 and the operating panel 80 for displaying a preview image are described in detail.

Figure 5:
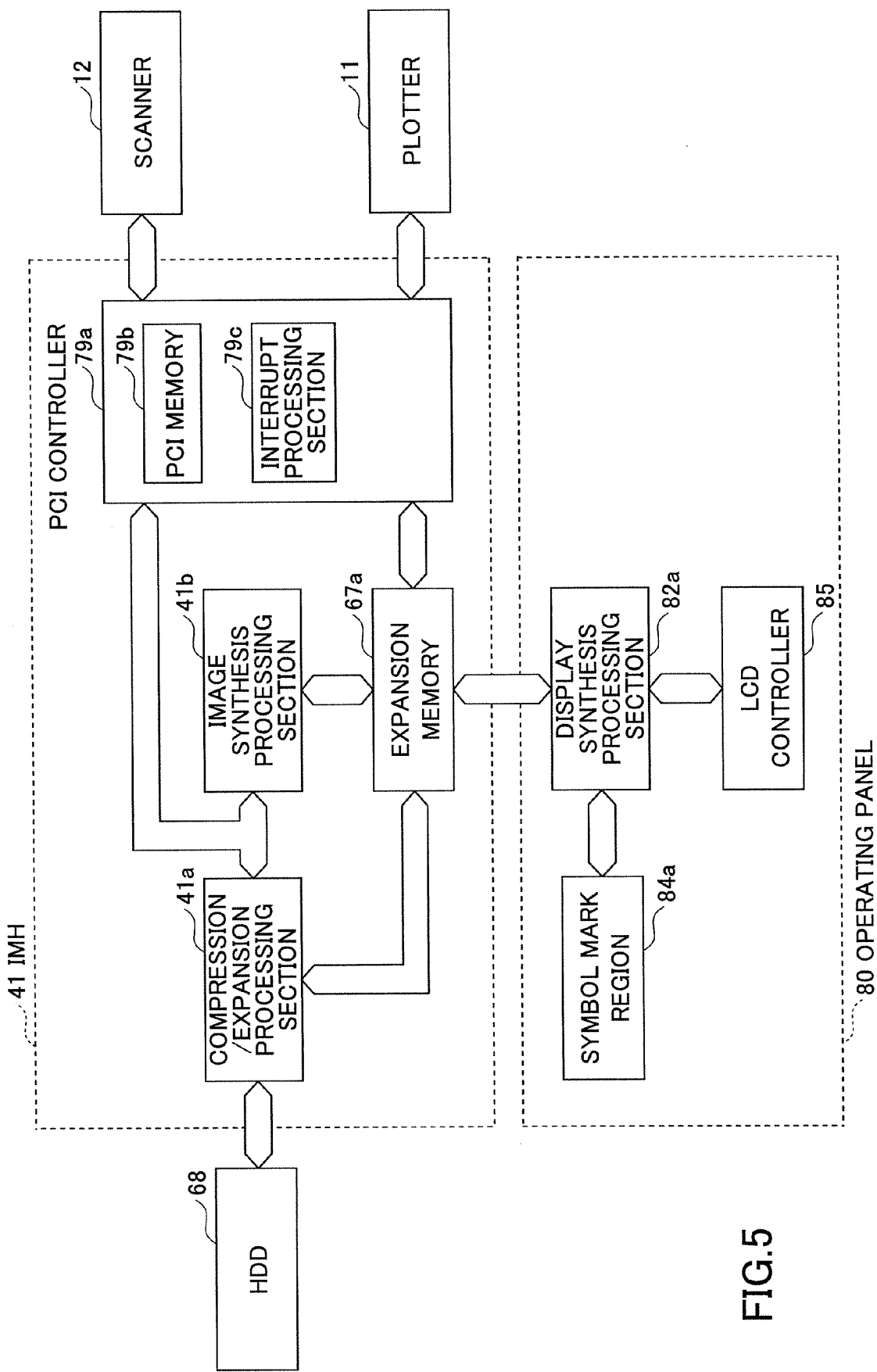
FIG. 5 is a diagram showing an IMH and the operating panel for synthesizing moving images.

FIG. 5 is a diagram showing the IMH 41 and the operating panel 80 for synthesizing moving images. As shown in FIG. 5, the IMH 41 includes a compression/expansion processing section 41a, an image synthesis processing section 41b, an expansion memory 67a, and a PCI controller 79a.

The compression/expansion processing section 41a compresses image data stored in the expansion memory 67a and image data read by the scanner 12 when the image data are stored in the HDD 68. In addition, the compression/expansion processing section 41a expands the image data stored in the HDD 68 when the image data are processed by the plotter 11 or are stored in the expansion memory 67a.

The image synthesis processing section 41b synthesizes image data read by the scanner 12 by storing the image data in the expansion memory 67a based on an initial processing condition, and synthesizes image data stored in the expansion memory 67a based on a set processing condition. The synthesized image data are output by the plotter 11 as print data.

The expansion memory 67a is a part of the local memory 67 which can be used by the IMH 41 and stores processed image data.

The PCI controller 79a includes a PCI memory 79b and an interrupt processing section 79c and controls access to the scanner 12 and the plotter 11 vi the PCI bus 79 (refer to FIG. 2). The PCI memory 79b temporarily stores image data read by the scanner 12 and image data for an image to be formed by the plotter 11.

The interrupt processing section 79c generates an interrupt signal corresponding to timing when the image synthesis processing section 41b forms an image. Since the scanner 12 reads image data line by line, when the interruption signal is generated every one line reading, a preview image is formed by synthesizing line images and one line image is sequentially displayed. In addition, when the preview image is displayed by rotating the image, the number of image transfer clocks generated by the scanner 12 at each one line reading is counted and the interrupt signal is generated when the counted number equals clocks for the lines of one page.

As shown in FIG. 5, the operating panel 80 includes a display synthesis processing section 82a, a symbol mark region 84a, and an LCD controller 85.

The display synthesis processing section 82a is realized when the operating screen CPU 81 executes a program stored in the program memory 82, and synthesizes a symbol mark stored in the symbol mark region 84a with image data from expansion memory 67a to form a preview image.

The symbol mark region 84a is a part of the display data memory 84 and stores picture images such as a staple mark and a punch mark beforehand. The LCD controller 85 displays a synthesized preview image and also displays a screen based on an instruction by the user on the LCD panel 90.

Figure 6:
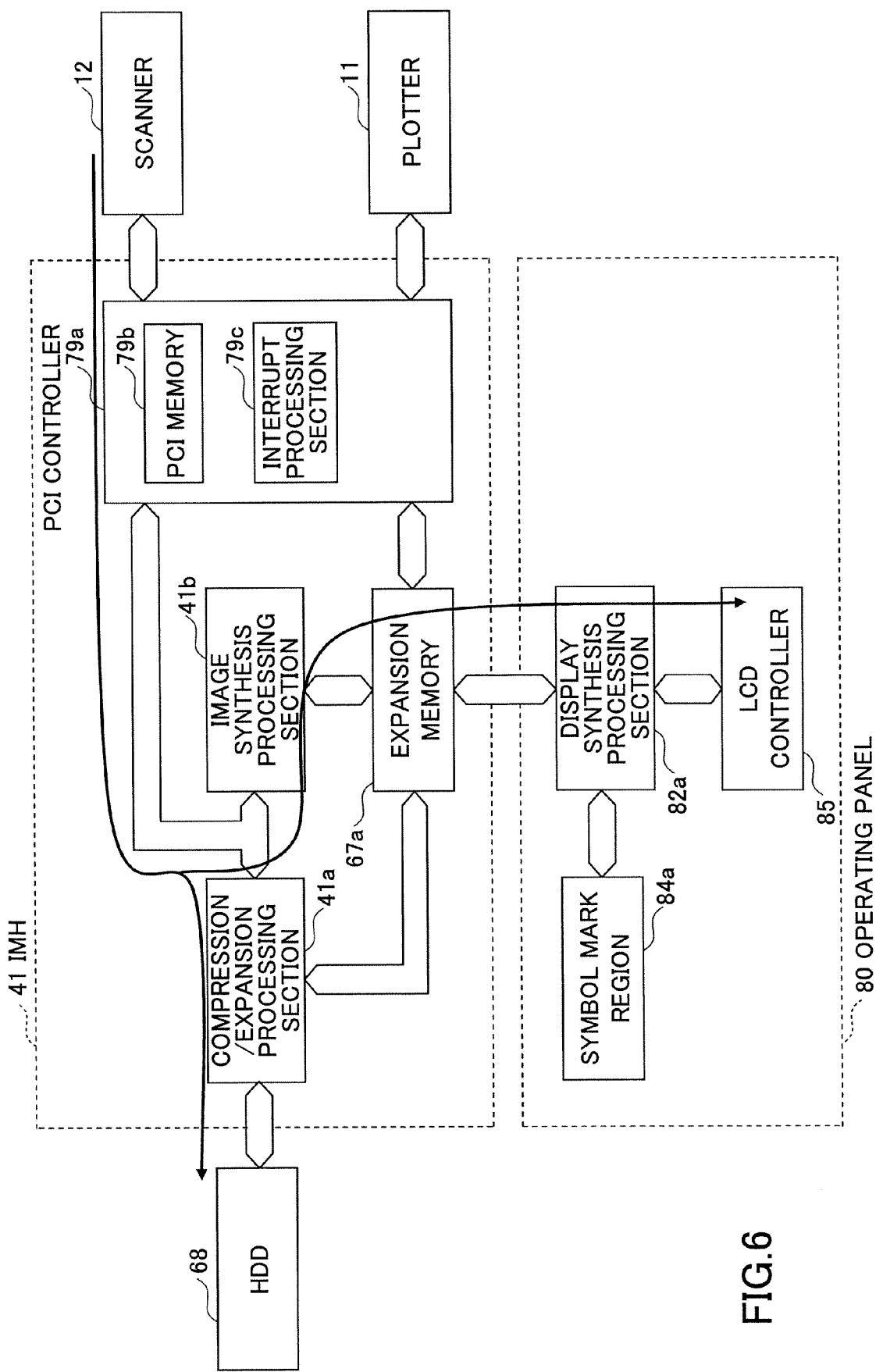
FIG. 6 is a diagram showing a data flow for displaying a preview image at the same time as when image data are stored.

FIG. 6 is a diagram showing a data flow for displaying a preview image at the same time as when image data are being stored. In FIG. 6, in the IMH 41, image data read by the scanner 12 are sent to the compression/expansion processing section 41a and the image synthesis processing section 41b via the PCI controller 79a.

The compression/expansion processing section 41a compresses the received image data and stores the compressed image data in the HDD 68. The image synthesis processing section 41b synthesizes the received image data and stores the synthesized image data in the expansion memory 67a.

In the operating panel 80, the display synthesis processing section 82a forms a preview image (display data) by synthesizing the image data received from the expansion memory 67a in the IMH 41 with the picture image stored in the symbol mark region 84a. The LCD controller 85 displays the preview image (display data) on the LCD panel 90.

Figure 7:
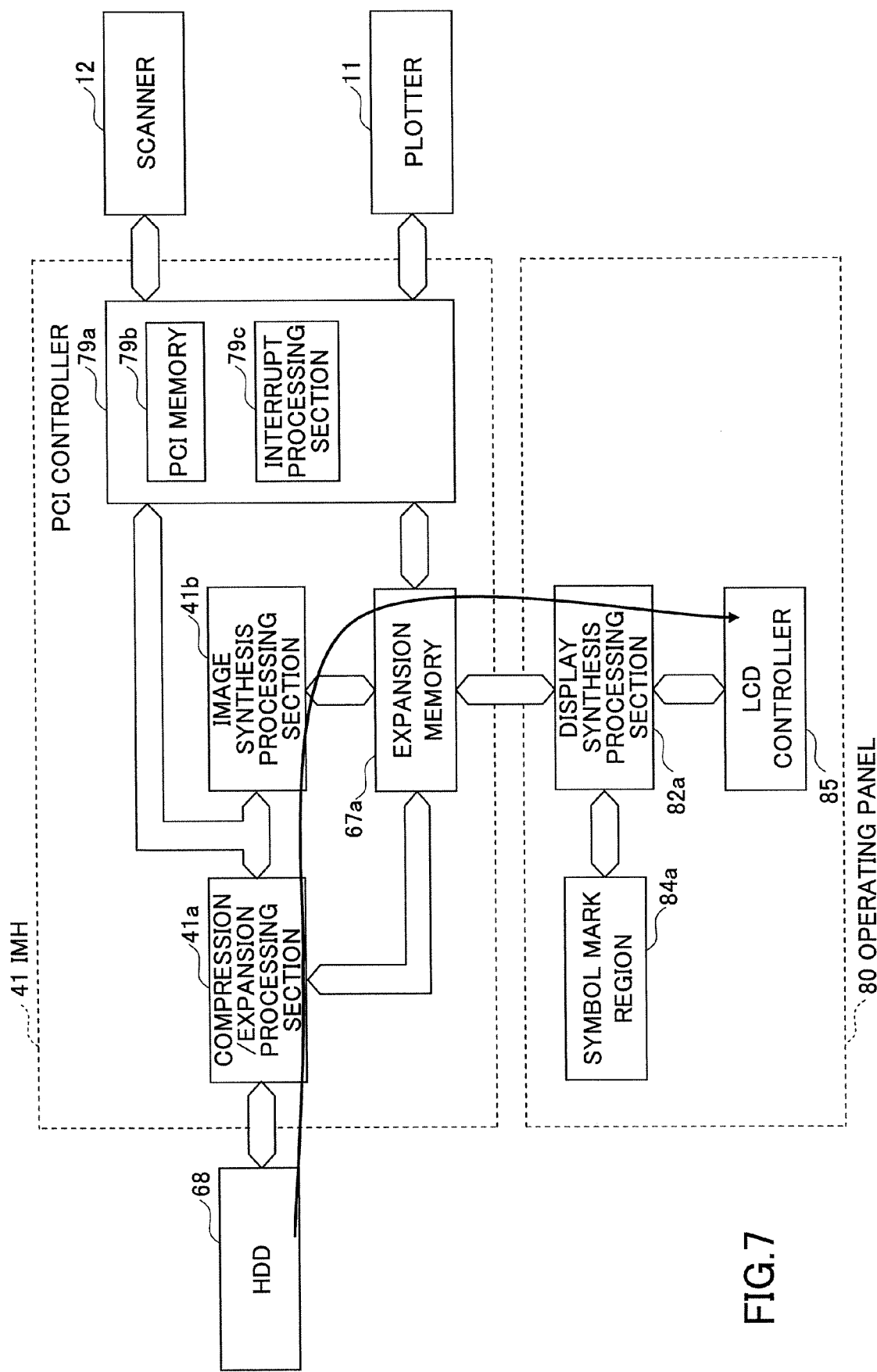
FIG. 7 is a diagram showing a data flow for displaying a preview image when a processing condition is designated after storing image data.

FIG. 7 is a diagram showing a data flow for displaying a preview image when a processing condition is designated after storing image data. In FIG. 7, when a user designates a processing condition for image data stored in the HDD 68, in the IMH 41, the compression/expansion processing section 41a expands image data read from the HDD 68, and the image synthesis processing section 41b synthesizes the expanded image data by the designated processing condition and stores the synthesized image data in the expansion memory 67a.

In the operating panel 80, the display synthesis processing section 82a forms a preview image (display data) by synthesizing the image data received from the expansion memory 67a in the IMH 41 with the picture image stored in the symbol mark region 84a. The LCD controller 85 displays the preview image (display data) on the LCD panel 90.

Figure 8:
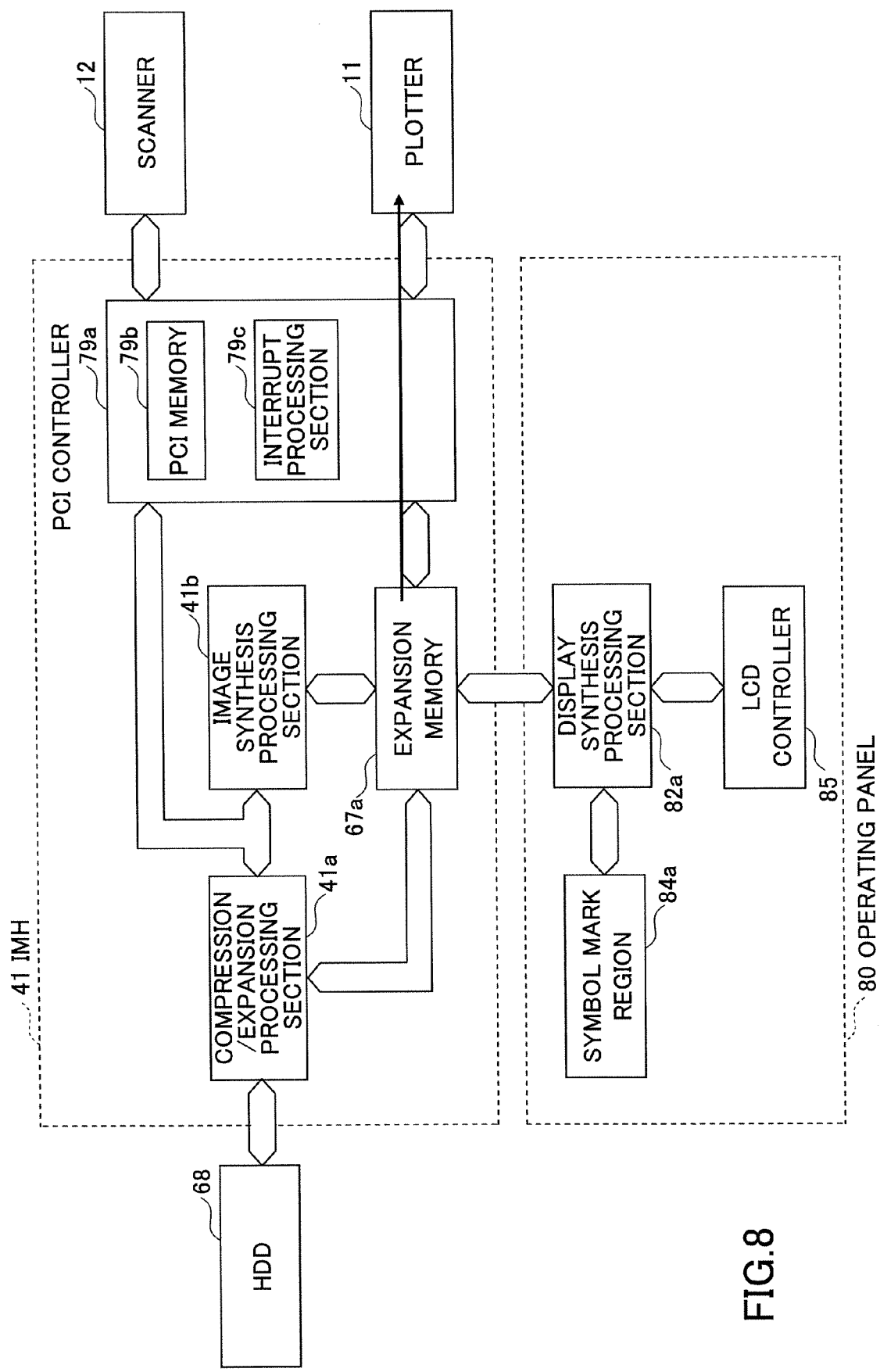
FIG. 8 is a diagram showing a data flow for printing a preview image after processing image data.

FIG. 8 is a diagram showing a data flow for printing a preview image after processing image data. In FIG. 8, in the IMH 41, processed image data stored in the expansion memory 67a are sent to the plotter 11 via the PCI controller 79a, and the plotter 11 forms (prints) a preview image on a predetermined recording medium.

Figure 9:
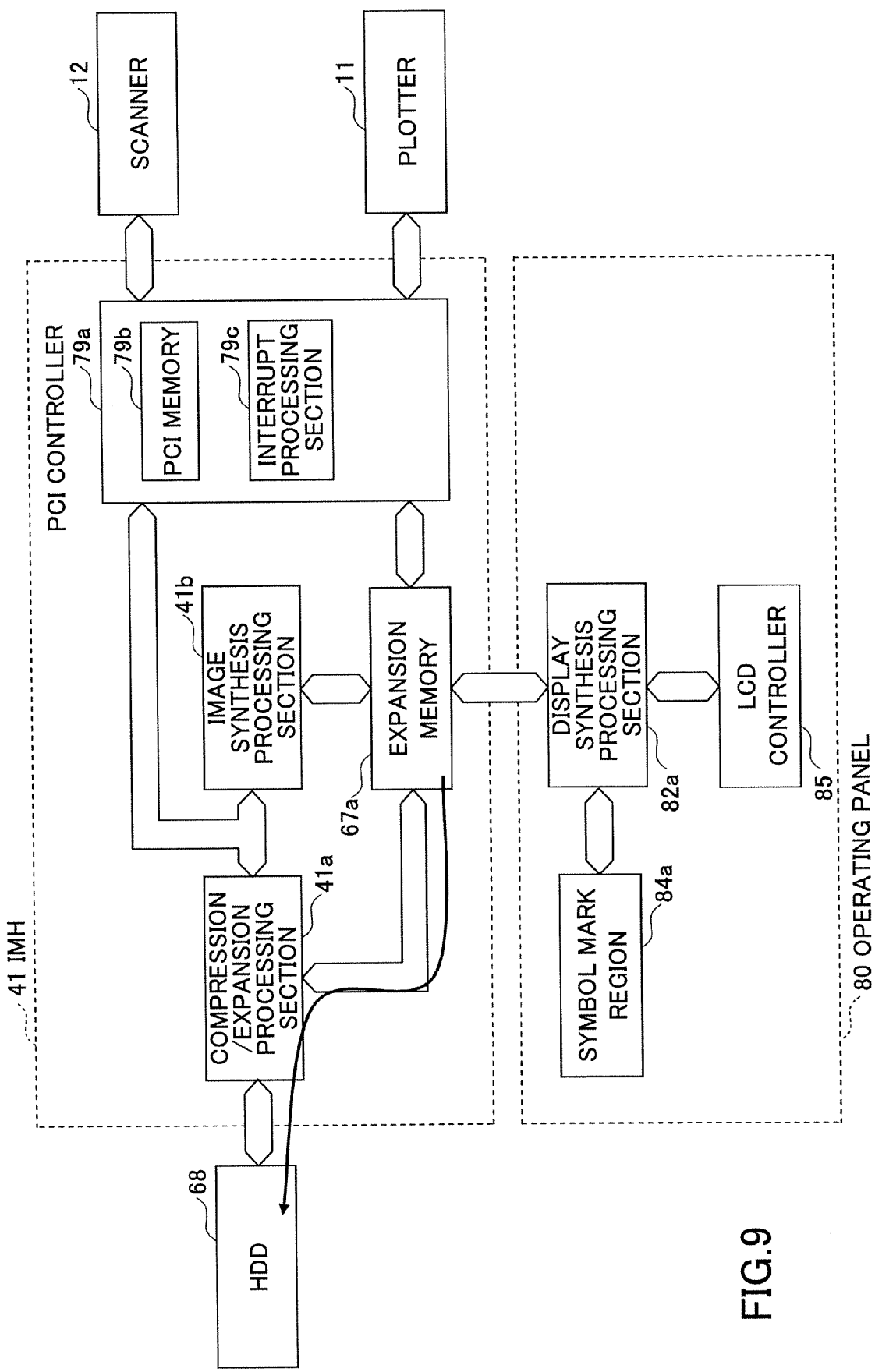
FIG. 9 is a diagram showing a data flow for storing a preview image after processing image data.

FIG. 9 is a diagram showing a data flow for storing a preview image after processing image data. In FIG. 9, in the IMH 41, processed image data stored in the expansion memory 67a are compressed by the compression/expansion processing section 41a and the compressed image data are stored in the HDD 68.

Figure 10:
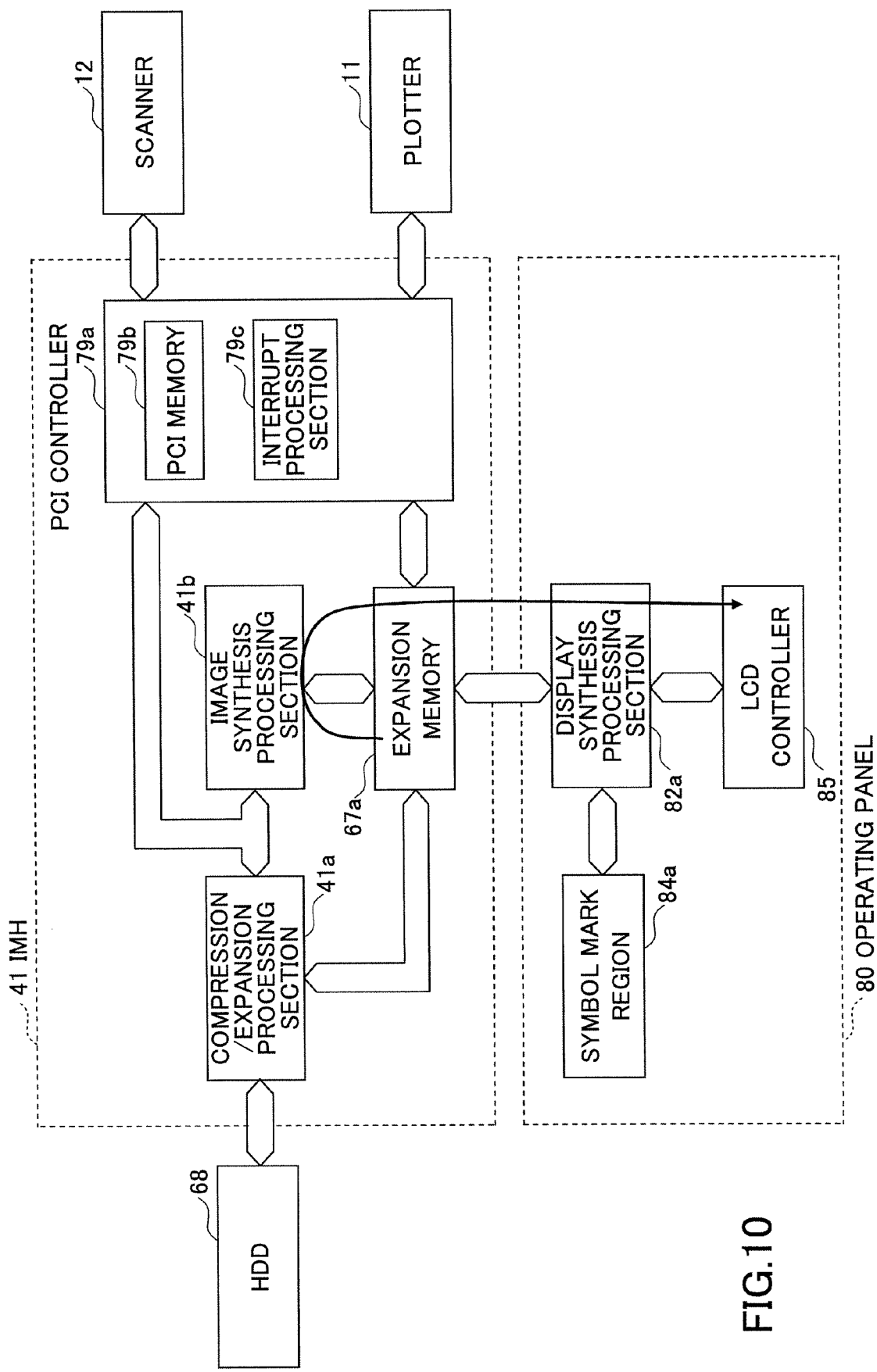
FIG. 10 is a diagram showing a data flow for displaying a preview image when a new processing condition is set in the image data stored in an expansion memory.

FIG. 10 is a diagram showing a data flow for displaying a preview image when a new processing condition is set in the image data stored in the expansion memory 67a. In FIG. 10, when a user designates a new processing condition for the image data stored in the expansion memory 67a, the image synthesis processing section 41b reads image data from the expansion memory 67a without reading image data from the HDD 68, synthesizes the read image data, and stores the image data in the expansion memory 67a.

In the operating panel 80, the display synthesis processing section 82a forms a preview image (display data) by synthesizing the image data received from the expansion memory 67a in the IMH 41 with the picture image stored in the symbol mark region 84a. The LCD controller 85 displays the preview image (display data) on the LCD panel 90.

In this case, a process is not needed in which the compression/expansion processing section 41a expands image data by reading the image data from the HDD 68. Therefore, the memory resources can be effectively used and the power consumption can be reduced.

Figure 11:
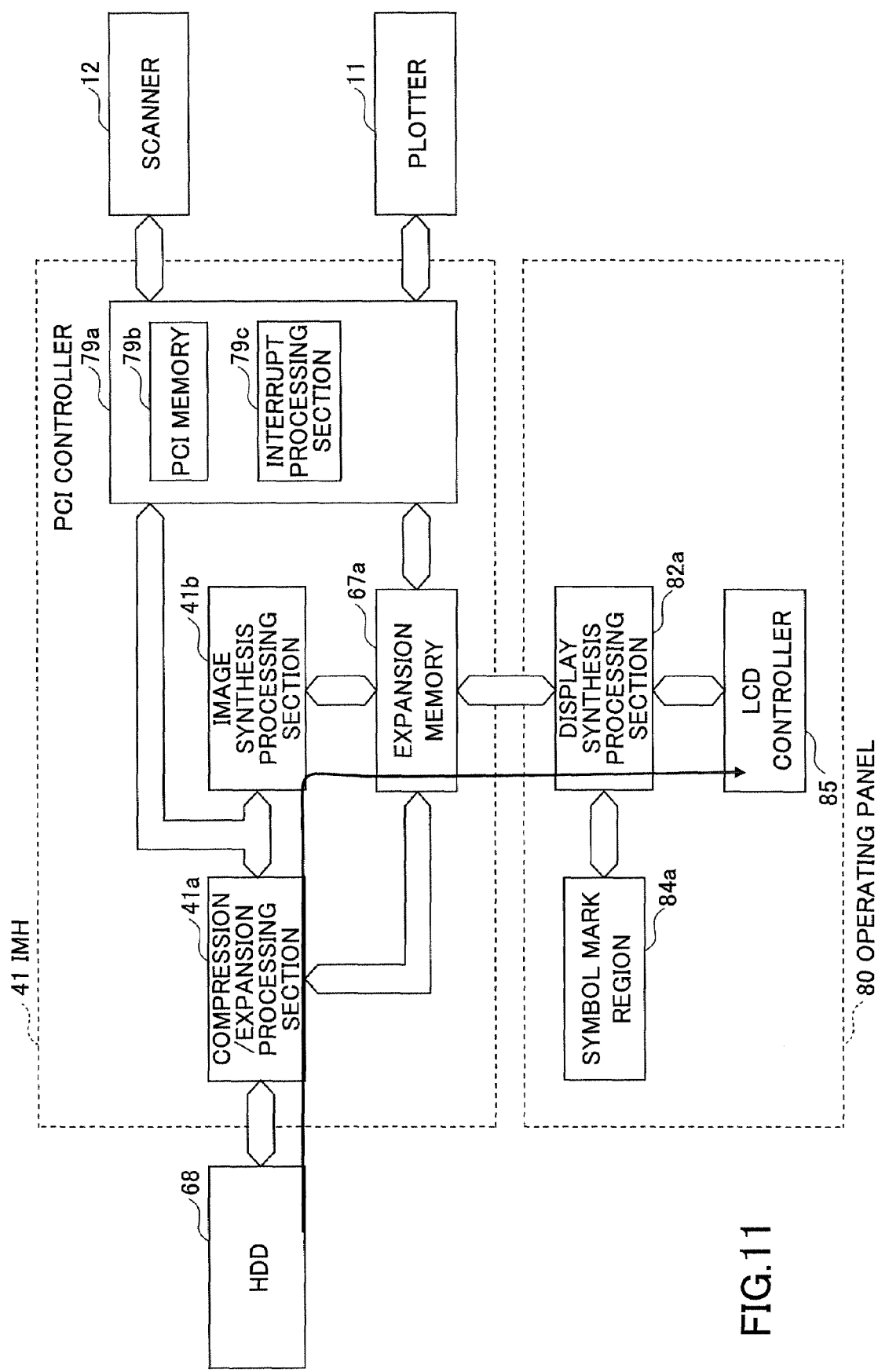
FIG. 11 is a diagram showing a data flow for displaying a preview image by using an initial processing condition.

FIG. 11 is a diagram showing a data flow for displaying a preview image by using an initial processing condition. In FIG. 11, when a determined processing condition is cancelled and a processing condition is made to be an initial processing condition, in the IMH 41, the compression/expansion processing section 41a expands image data read from the HDD 68, and the image synthesis processing section 41b synthesizes the expanded image data by the initial processing condition and stores the synthesized image data in the expansion memory 67a.

In the operating panel 80, the display synthesis processing section 82a forms a preview image (display data) by synthesizing the image data received from the expansion memory 67a in the IMH 41 with a picture image stored in the symbol mark region 84a. The LCD controller 85 displays the preview image (display data) on the LCD panel 90.

In the embodiment of the present invention, in order to easily determine a processing condition for printing an image by directly operating a preview image displayed on the operating panel 80, the following method is established which method designates a processing condition based on user psychology.

[Designation of Staple Position]

(1). A staple button is pushed, a binding position of documents is clicked, and a staple position is designated.

(2). A page is turned, a finishing state of a document is confirmed, and a staple position of the document is designated.

(3). When the head and tail of a stapled document are wrong, a staple position of the document is designated by changing the head and tail.

[Designation of Page Turning Direction]

(1). A staple button is pushed and the page turning direction is designated.

(2). A staple position and the head and tail of a document are set in an image processing apparatus corresponding to the page turning direction.

(3). When the head and tail of a stapled document are wrong, the head and tail of the rear surface is changed by changing the head and tail of the front surface.

[Relationship Between Staple Position and Page Turning Direction]

(1). Horizontal wiring may be largely used in a business document.

(2). The staple position is suitable at the upper side or the left side of the business document.

(3). When some documents are aggregated in one sheet, the staple position may be at the side of the sheet having a small page number.

(4). The page turning direction is determined by the staple position.

(5). A short stroke is suitable when a page is turned, and a page turning direction is suitable which easily turns a page.

A punch position is similar to the above staple position.

There is an exception to the user psychology; therefore, in the embodiment of the present invention, candidates for providing the user with easy operations are determined, and the user can select one of the candidates.

Referring to FIGS. 12 through 16, a relationship between a staple position and a page turning direction is described. In FIGS. 12 through 16, an example in which four pages are aggregated in one sheet is described. The number written in each sheet 1, 2, 3, and 4 is the image order scanned by the scanner 12, for example, the number corresponds to the page number. The image order is referred to as the read image 1, 2, 3, . . . n. In addition, a staple position "sp" is shown by a bold line and a punch position "ph" is shown by "o", and a page turning direction "d" is shown by an arrow.

Figure 12:
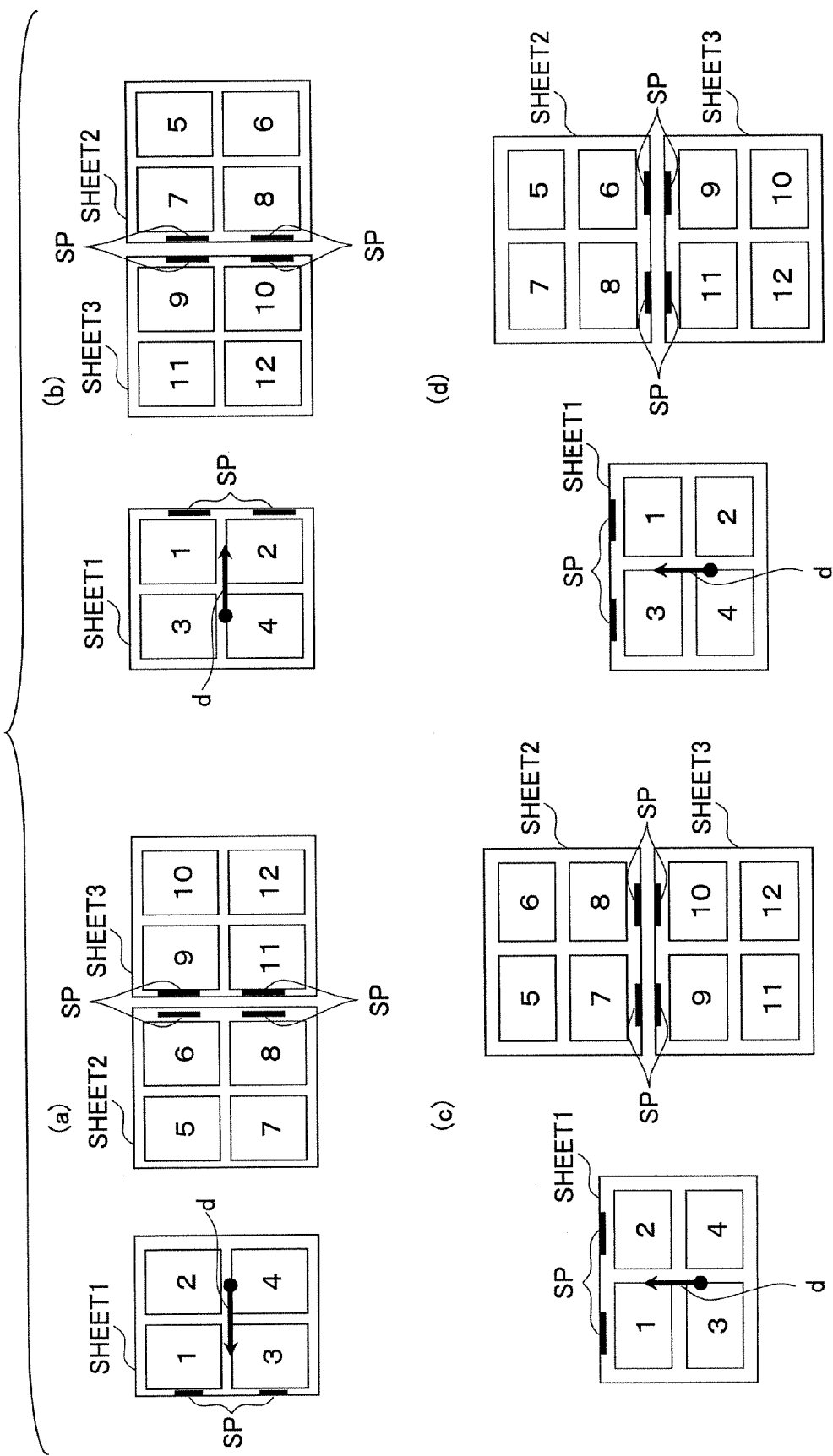
FIG. 12 is a diagram showing a relationship between a staple position and a page turning direction when the staple positions are two.

FIG. 12 is a diagram showing a relationship between a staple position "sp" and a page turning direction "d" when the staple positions "sp" are two.

In FIG. 12(a), in vertical direction sheets 1, 2, and 3, the read images are aggregated in the order of upper left, upper right, lower left, and lower right positions. In FIG. 12(a), when the staple positions "sp" are designated at the left sides of the read images 1 and 3, the page turning direction "d" is predicted from the read image 2 to the read image 1 (the read image 4 to the read image 3). On the other hand, when the page turning direction "d" is designated from the read image 1 to the read image 2 (the read image 3 to the read image 4), the staple positions "sp" are predicted at the right sides of the read images 2 and 4.

In FIG. 12(a), when the sheet 1 is turned, the sheets 2 and 3 are a two-page spread. The sheet 2 is a rear surface of the sheet 1. The staple positions "sp" are at the right sides of the read images 6 and 8 in the sheet 2 and at the left sides of the read images 9 and 11 in the sheet 3.

In FIG. 12(b), in vertical direction sheets 1, 2, and 3, the read images are aggregated in the order of upper right, lower right, upper left, and lower left positions. In FIG. 12(b), when the staple positions "sp" are designated at the right sides of the read images 1 and 2, the page turning direction "d" is predicted from the read image 3 to the read image 1 (the read image 4 to the read image 2). On the other hand, when the page turning direction "d" is designated from the read image 1 to the read image 3 (the read image 2 to the read image 4), the staple positions "sp" are predicted at the left sides of the read images 3 and 4.

In FIG. 12(b), when the sheet 1 is turned, the sheets 2 and 3 are a two-page spread. The sheet 2 is a rear surface of the sheet 1. The staple positions "sp" are at the left sides of the read images 7 and 8 in the sheet 2 and at the right sides of the read images 9 and 10 in the sheet 3.

In FIG. 12(c), in horizontal direction sheets 1, 2, and 3, the read images are aggregated in the order of upper left, upper right, lower left, and lower right positions. In FIG. 12(c), when the staple positions "sp" are designated at the upper sides of the read images 1 and 2, the page turning direction "d" is predicted from the read image 3 to the read image 1 (the read image 4 to the read image 2). On the other hand, when the page turning direction "d" is designated from the read image 1 to the read image 3 (the read image 2 to the read image 4), the staple positions "sp" are predicted at the lower sides of the read images 3 and 4.

In FIG. 12(c), when the sheet 1 is turned, the sheets 2 and 3 are a two-page spread. The sheet 2 is a rear surface of the sheet 1. The staple positions "sp" are at the lower sides of the read images 7 and 8 in the sheet 2 and at the upper sides of the read images 9 and 10 in the sheet 3.

In FIG. 12(d), in horizontal direction sheets 1, 2, and 3, the read images are aggregated in the order of upper right, lower right, upper left, and lower left positions. In FIG. 12(d), when the staple positions "sp" are designated at the upper sides of the read images 1 and 3, the page turning direction "d" is predicted from the read image 2 to the read image 1 (the read image 4 to the read image 3). On the other hand, when the page turning direction "d" is designated from the read image 1 to the read image 2 (the read image 3 to the read image 4), the staple positions "sp" are predicted at the lower sides of the read images 2 and 4.

In FIG. 12(d), when the sheet 1 is turned, the sheets 2 and 3 are a two-page spread. The sheet 2 is a rear surface of the sheet 1. The staple positions "sp" are at the lower sides of the read images 6 and 8 in the sheet 2 and at the upper sides of the read images 9 and 11 in the sheet 3.

FIG. 13 is a diagram showing a relationship between a staple position "sp" and a page turning direction "d" when the staple position "sp" is at the upper side. In FIG. 13, the staple is positioned along one side at the upper end of the sheet.

In FIG. 13(a), in vertical direction sheets 1, 2, and 3, the read images are aggregated in the order of upper left, upper right, lower left, and lower right positions. In FIG. 13(a), when the staple position "sp" is designated at the upper left side of the read image 1 along the side, the page turning direction "d" is predicted from the read image 4 to the read image 1. On the other hand, when the page turning direction "d" is designated from the read image 1 to the read image 4, the staple position "sp" is predicted at the lower right side of the read image 4.

In FIG. 13(a), when the sheet 1 is turned, the sheets 2 and 3 are a two-page spread. The sheet 2 is a rear surface of the sheet 1. The staple position "sp" is at the upper right side of the read image 6 in the sheet 2 and at the upper left side of the read image 9 in the sheet 3.

In FIG. 13(b), in vertical direction sheets 1, 2, and 3, the read images are aggregated in the order of upper right, lower right, upper left, and lower left positions. In FIG. 13(b), when the staple position "sp" is designated at the upper right side of the read image 1 along the side, the page turning direction "d" is predicted from the read image 4 to the read image 1. On the other hand, when the page turning direction "d" is designated from the read image 1 to the read image 4, the staple position "sp" is predicted at the lower left side of the read image 4.

In FIG. 13(b), when the sheet 1 is turned, the sheets 2 and 3 are a two-page spread. The sheet 2 is a rear surface of the sheet 1. The staple position "sp" is at the upper left side of the read image 7 in the sheet 2 and at the upper right side of the read image 9 in the sheet 3.

In FIG. 13(c), in horizontal direction sheets 1, 2, and 3, the read images are aggregated in the order of upper left, upper right, lower left, and lower right positions. In FIG. 13(c), when the staple position "sp" is designated at the upper left side of the read image 1 along the upper side, the page turning direction "d" is predicted from the read image 4 to the read image 1. On the other hand, when the page turning direction "d" is designated from the read image 1 to the read image 4, the staple position "sp" is predicted at the lower right side of the read image 4 along the lower side.

In FIG. 13(c), when the sheet 1 is turned, the sheets 2 and 3 are a two-page spread. The sheet 2 is a rear surface of the sheet 1. The staple position "sp" is at the lower left side of the read image 7 in the sheet 2 and at the upper left side of the read image 9 in the sheet 3.

In FIG. 13(d), in horizontal direction sheets 1, 2, and 3, the read images are aggregated in the order of upper right, lower right, upper left, and lower left positions. In FIG. 13(d), when the staple position "sp" is designated at the upper right side of the read image 1 along the upper side, the page turning direction "d" is predicted from the read image 4 to the read image 1. On the other hand, when the page turning direction "d" is designated from the read image 1 to the read image 4, the staple position "sp" is predicted at the lower left side of the read image 4 along the lower side.

In FIG. 13(d), when the sheet 1 is turned, the sheets 2 and 3 are a two-page spread. The sheet 2 is a rear surface of the sheet 1. The staple position "sp" is at the lower right side of the read image 6 in the sheet 2 and at the upper right side of the read image 9 in the sheet 3.

Figure 14:
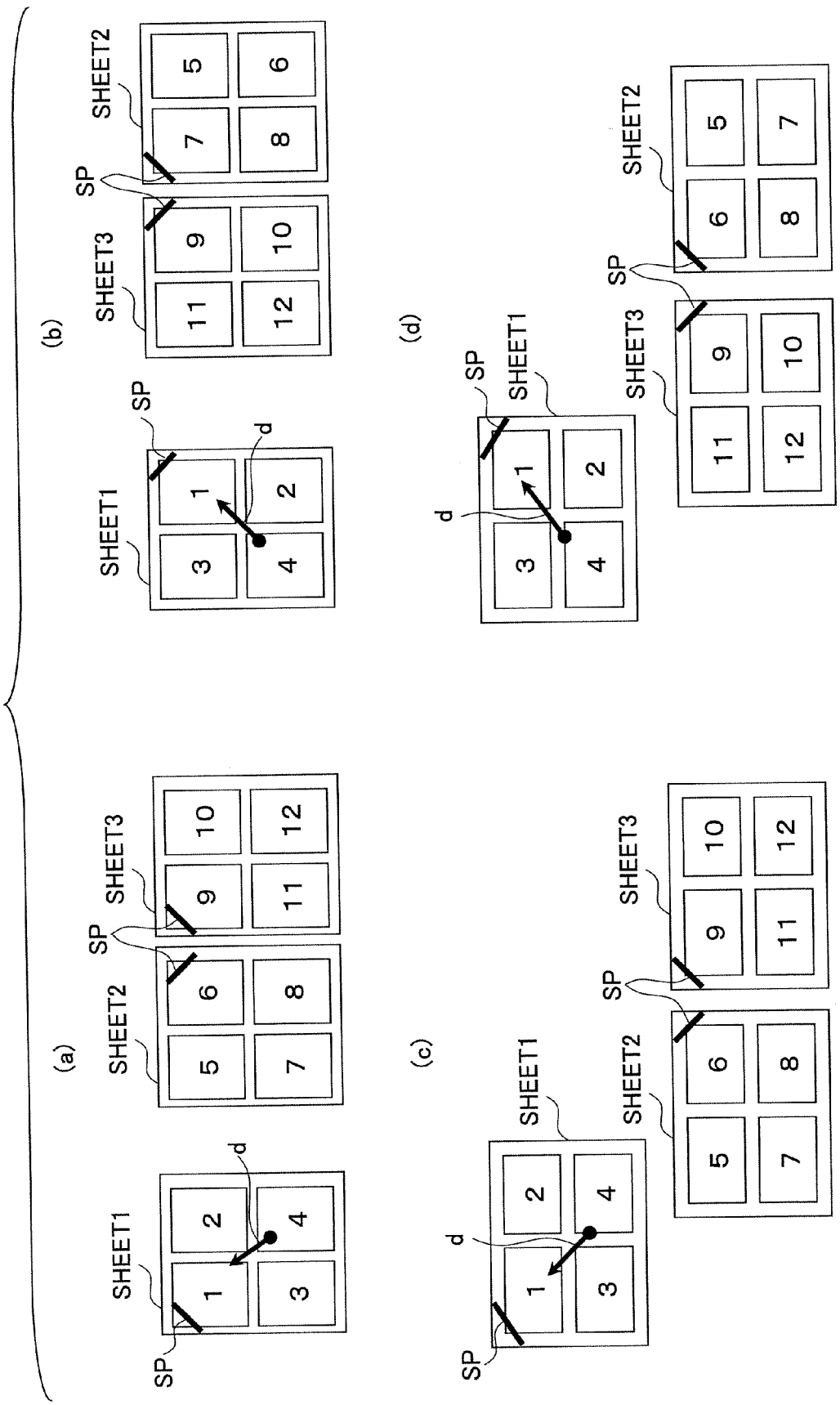
FIG. 14 is a diagram showing a relationship between a staple position and a page turning direction when the staple position is at a corner end.

FIG. 14 is a diagram showing a relationship between a staple position "sp" and a page turning direction "d" when the staple position "sp" is at a corner end. In FIG. 14, the long-length direction of the staple is positioned along one corner of the sheet.

In FIG. 14(a), in vertical direction sheets 1, 2, and 3, the read images are aggregated in the order of upper left, upper right, lower left, and lower right positions. In FIG. 14(a), when the staple position "sp" is designated at the upper left corner of the read image 1, the page turning direction "d" is predicted from the read image 4 to the read image 1. On the other hand, when the page turning direction "d" is designated from the read image 1 to the read image 4, the staple position "sp" is predicted at the lower right corner of the read image 4.

In FIG. 14(a), when the sheet 1 is turned, the sheets 2 and 3 are a two-page spread. The sheet 2 is a rear surface of the sheet 1. The staple position "sp" is at the upper right corner of the read image 6 in the sheet 2 and at the upper left corner of the read image 9 in the sheet 3.

In FIG. 14(b), in vertical direction sheets 1, 2, and 3, the read images are aggregated in the order of upper right, lower right, upper left, and lower left positions. In FIG. 14(b), when the staple position "sp" is designated at the upper right corner of the read image 1, the page turning direction "d" is predicted from the read image 4 to the read image 1. On the other hand, when the page turning direction "d" is designated from the read image 1 to the read image 4, the staple position "sp" is predicted at the lower left corner of the read image 4.

In FIG. 14(b), when the sheet 1 is turned, the sheets 2 and 3 are a two-page spread. The sheet 2 is a rear surface of the sheet 1. The staple position "sp" is at the upper left corner of the read image 7 in the sheet 2 and at the upper right corner of the read image 9 in the sheet 3.

In FIG. 14(c), in horizontal direction sheets 1, 2, and 3, the read images are aggregated in the order of upper left, upper right, lower left, and lower right positions. In FIG. 14(c), when the staple position "sp" is designated at the upper left corner of the read image 1, the page turning direction "d" is predicted from the read image 4 to the read image 1. On the other hand, when the page turning direction "d" is designated from the read image 1 to the read image 4, the staple position "sp" is predicted at the lower right corner of the read image 4.

In FIG. 14(c), when the sheet 1 is turned, the sheets 2 and 3 are a two-page spread. The sheet 2 is a rear surface of the sheet 1. The staple position "sp" is at the upper right corner of the read image 6 in the sheet 2 and at the upper left corner of the read image 9 in the sheet 3.

In FIG. 14(d), in horizontal direction sheets 1, 2, and 3, the read images are aggregated in the order of upper right, lower right, upper left, and lower left positions. In FIG. 14(d), when the staple position "sp" is designated at the upper right corner of the read image 1, the page turning direction "d" is predicted from the read image 4 to the read image 1. On the other hand, when the page turning direction "d" is designated from the read image 1 to the read image 4, the staple position "sp" is predicted at the lower left corner of the read image 4.

In FIG. 14(d), when the sheet 1 is turned, the sheets 2 and 3 are a two-page spread. The sheet 2 is a rear surface of the sheet 1. The staple position "sp" is at the upper left corner of the read image 6 in the sheet 2 and at the upper right corner of the read image 9 in the sheet 3.

Next, a relationship between a punch position "ph" and a page turning direction "d" is described.

Figure 15:
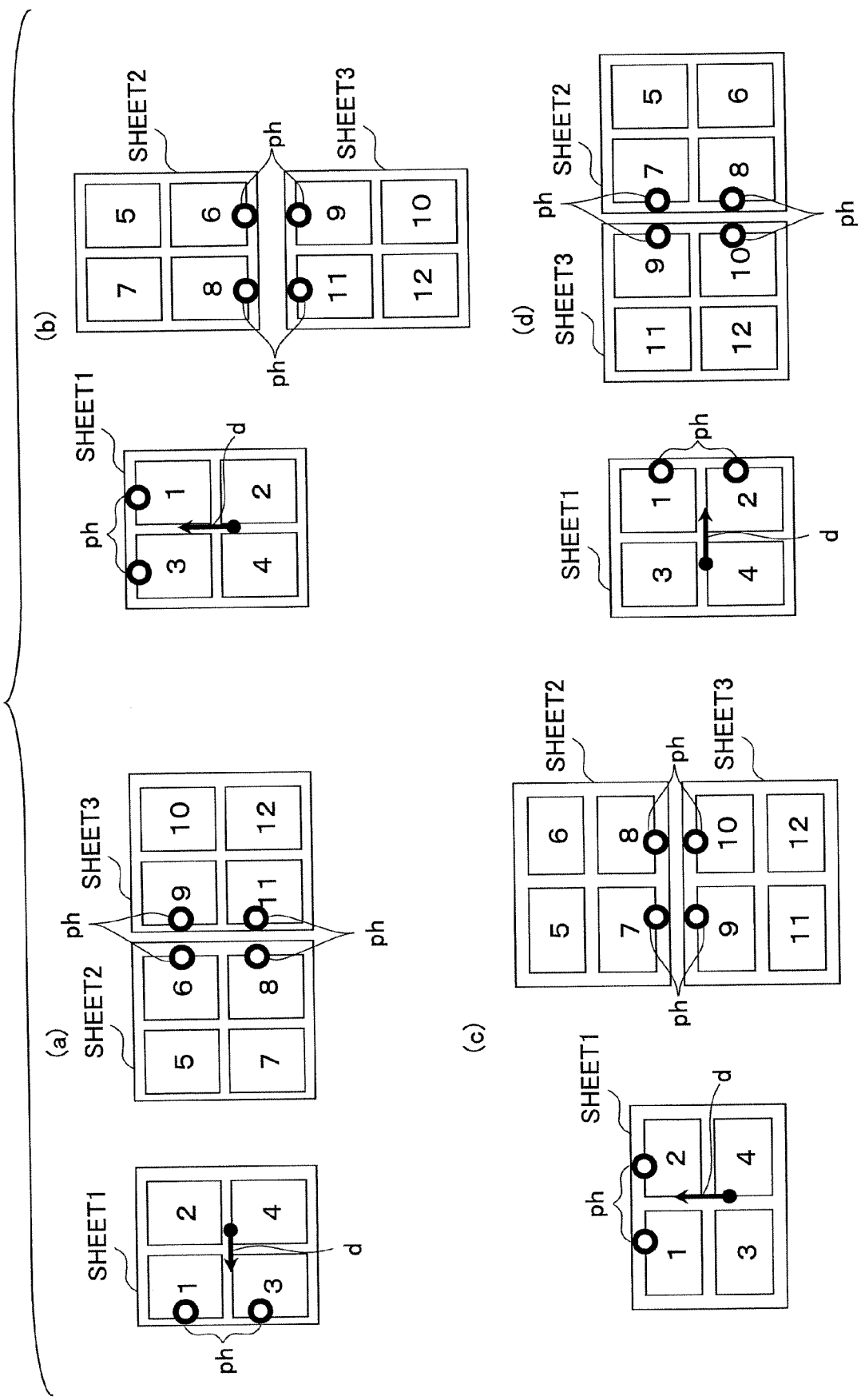
FIG. 15 is a diagram showing a relationship between a punch position and a page turning direction.

FIG. 15 is a diagram showing the relationship between the punch position "ph" and the page turning direction "d".

In FIG. 15(a), in vertical direction sheets 1, 2, and 3, the read images are aggregated in the order of upper left, upper right, lower left, and lower right positions. In FIG. 15(a), when the punch position "ph" is designated at the left sides of the read images 1 and 3, the page turning direction "d" is predicted from the read image 2 to the read image 1 (the read image 4 to the read image 3). On the other hand, when the page turning direction "d" is designated from the read image 1 to the read image 2 (the read image 3 to the read image 4), the punch position "ph" is predicted at the right sides of the read images 2 and 4.

In FIG. 15(a), when the sheet 1 is turned, the sheets 2 and 3 are a two-page spread. The sheet 2 is a rear surface of the sheet 1. The punch position "ph" is at the right sides of the read images 6 and 8 in the sheet 2 and at the left sides of the read images 9 and 11 in the sheet 3.

In FIG. 15(b), in vertical direction sheets 1, 2, and 3, the read images are aggregated in the order of upper right, lower right, upper left, and lower left positions. In FIG. 15(b), when the punch position "ph" is designated at the upper sides of the read images 1 and 3, the page turning direction "d" is predicted from the read image 2 to the read image 1 (the read image 4 to the read image 3). On the other hand, when the page turning direction "d" is designated from the read image 1 to the read image 2 (the read image 3 to the read image 4), the punch position "sp" is predicted at the lower sides of the read images 2 and 4.

In FIG. 15(b), when the sheet 1 is turned, the sheets 2 and 3 are a two-page spread. The sheet 2 is a rear surface of the sheet 1. The punch position "ph" is at the lower sides of the read images 6 and 8 in the sheet 2 and at the upper sides of the read images 9 and 11 in the sheet 3.

In FIG. 15(c), in horizontal direction sheets 1, 2, and 3, the read images are aggregated in the order of upper left, upper right, lower left, and lower right positions. In FIG. 15(c), when the punch position "ph" is designated at the upper sides of the read images 1 and 2, the page turning direction "d" is predicted from the read image 3 to the read image 1 (the read image 4 to the read image 2). On the other hand, when the page turning direction "d" is designated from the read image 1 to the read image 3 (the read image 2 to the read image 4), the punch position "ph" is predicted at the lower sides of the read images 3 and 4.

In FIG. 15(c), when the sheet 1 is turned, the sheets 2 and 3 are a two-page spread. The sheet 2 is a rear surface of the sheet 1. The punch position "ph" is at the lower sides of the read images 7 and 8 in the sheet 2 and at the upper sides of the read images 9 and 10 in the sheet 3.

In FIG. 15(d), in vertical direction sheets 1, 2, and 3, the read images are aggregated in the order of upper right, lower right, upper left, and lower left positions. In FIG. 15(d), when the punch position "ph" is designated at the right sides of the read images 1 and 2, the page turning direction "d" is predicted from the read image 3 to the read image 1 (the read image 4 to the read image 2). On the other hand, when the page turning direction "d" is designated from the read image 1 to the read image 3 (the read image 2 to the read image 4), the punch position "ph" is predicted at the left sides of the read images 3 and 4.

In FIG. 15(d), when the sheet 1 is turned, the sheets 2 and 3 are a two-page spread. The sheet 2 is a rear surface of the sheet 1. The punch position "ph" is at the left sides of the read images 7 and 8 in the sheet 2 and at the right sides of the read images 9 and 10 in the sheet 3.

FIG. 16 is a table 92 in which a binding method of a document and a page turning direction of the document are shown by correlating with each other.

The image processing apparatus 1 forms the table 92 shown in FIG. 16 based on methods similar to those shown in FIGS. 12 through 15 and stores the table 92 in the HDD 68.

In the binding method of the document, items of 2-position stapling, 1-position stapling, and punching are shown, and each item has a position and a rear surface direction for a front surface. In the page turning direction, items of left direction turning, right direction turning, and upper direction turning are shown, and each item has horizontal writing and vertical writing.

Further, in the position, a left side, a right side, and an upper side are shown. In the rear surface direction for front surface, the same direction and the head and tail reversed direction are shown.

Next, user patterns are described.

The following patters are estimated about user operations.

In pattern 1, a user scans an image, stores the scanned image, and processes the image.

In pattern 2, a user scans an image by setting a processing condition, displays a preview image, and prints the image and simultaneously stores the image.

In pattern 3, a user scans an image by setting a processing condition, displays a preview image, processes the image, and prints the image and simultaneously stores the image.

Next, processes to execute all the operations which can perform the above three patterns are described.

Figure 17:
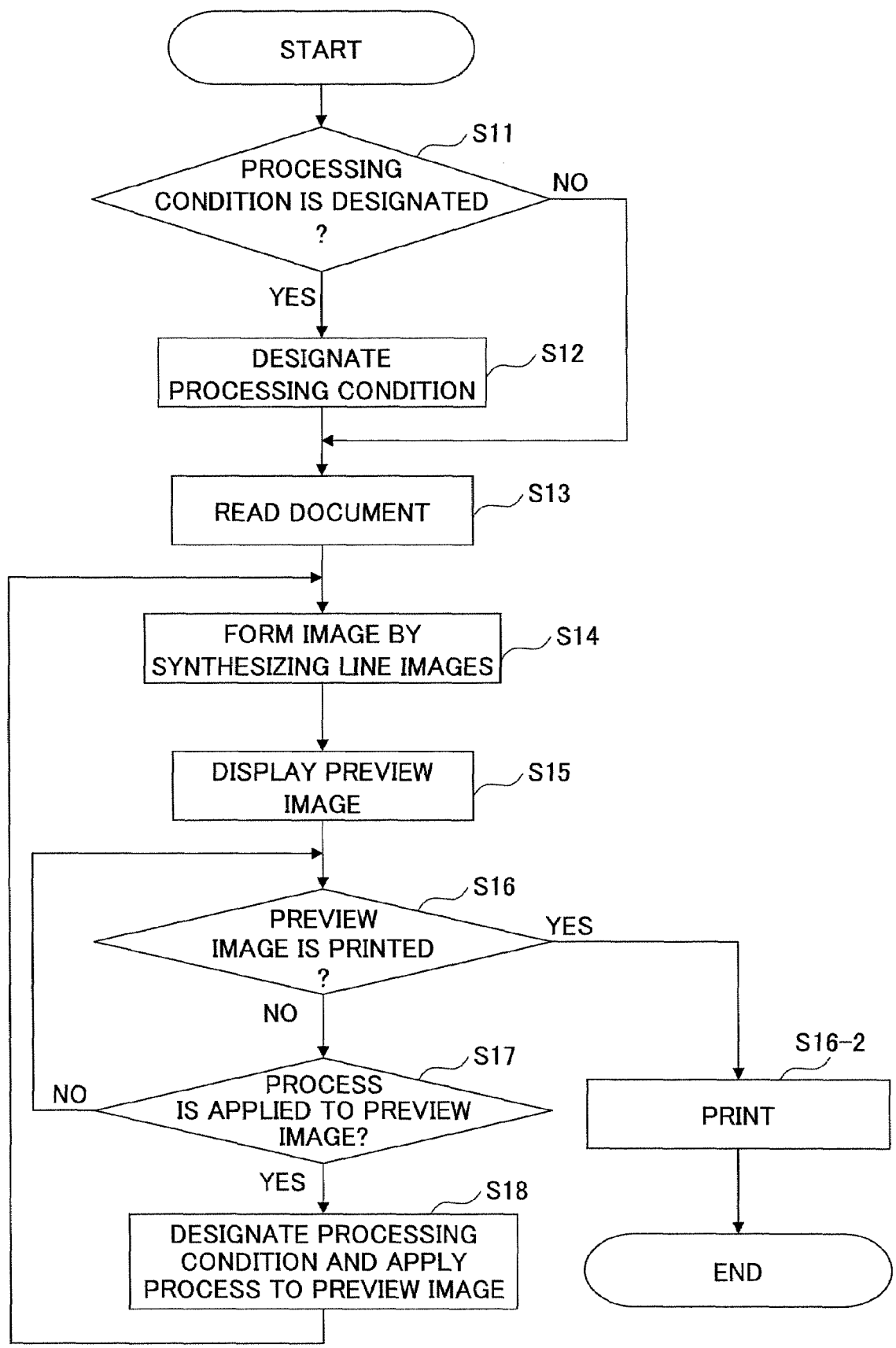
FIG. 17 is a flowchart showing processes to execute all the operations which can perform three patterns.

FIG. 17 is a flowchart showing the processes to execute all the operations which can perform the above three patterns.

Referring to FIG. 17, the processes are described. First, the image processing apparatus 1 determines whether a processing condition is designated by a user instruction (S11). When the image processing apparatus 1 determines that the processing condition is designated by the user (YES in S11), the user designates the processing condition (S12). When the image processing apparatus 1 does not determine that the processing condition is designated by the user (NO in S11), the process goes to S13.

Then, the image processing apparatus 1 reads a document by the scanner 12 (S13), and forms an image by synthesizing line images (S14). In the image synthesis, images in each line or in one page are sequentially synthesized to form a preview image by the designated processing condition. The synthesis of one line image and the one page image are automatically switched based on the designated processing condition (described below).

Next, a preview image is displayed on the operating panel 80 (S15). Then it is determined whether the user instructs to print the preview image (S16). When it is determined that the user instructs to print the preview image (YES in S16), the image processing apparatus 1 prints the preview image by the plotter 11 (S16-2).

When the user does not instruct to print the preview image (NO in S16), it is determined whether the user instructs to apply a process to the preview image (S17). When it is determined that the user instructs to apply a process to the preview image (YES in S17), the image processing apparatus 1 makes the user designate a processing condition and applies the process to the preview image based on the processing condition (S18) and the process returns to S14.

Next, referring to FIGS. 18 through 30, screens for designating a staple position on a document are described.

Figure 18:
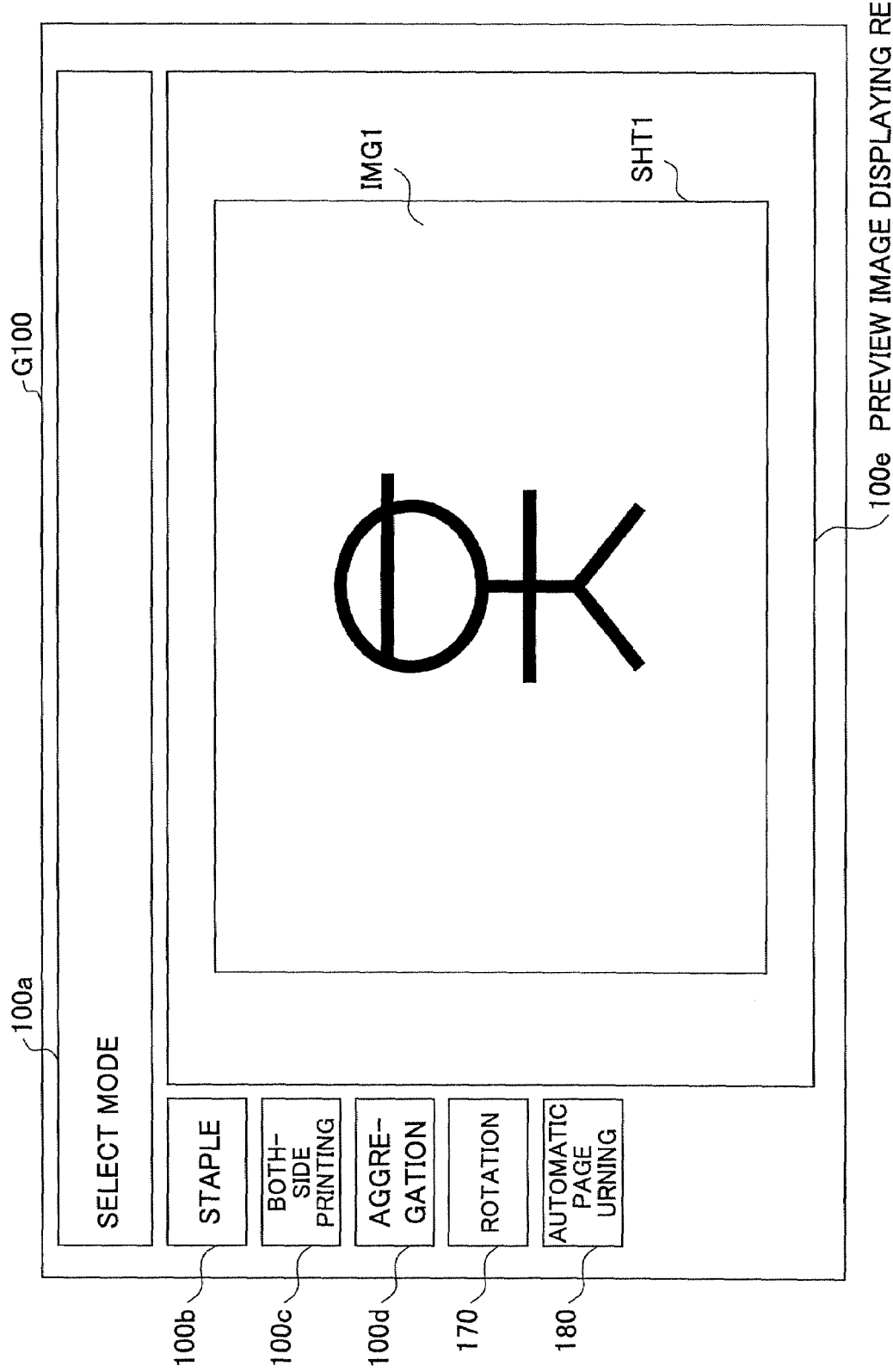
FIG. 18 is a diagram showing a screen on which a preview image is displayed after reading a document.

FIG. 18 is a diagram showing a screen on which a preview image is displayed after reading a document. As shown in FIG. 18, a screen G100 displayed on the LCD panel 90 includes a message region 100a, a staple button 100b, a both-side printing button 100c, a document aggregation button 100d, a rotation button 170, an automatic page turning button 180, and a preview image displaying region 100e. A staple position is designated by the staple button 100b, both-side printing is designated by the both-side printing button 100c, aggregation of pages is designated by the document aggregation button 100d, a preview image is rotated by the rotation button 170, and the status of all the pages of the document is shown by the automatic page turning button 180.

When a preview image is displayed after reading a document, a first document image IMG1 is displayed on a sheet image SHT1 in the preview image displaying region 100e, and a message, for example, "SELECT MODE" for instructing a user to operate is displayed on the message region 100a. In order to select a mode, the user pushes, for example, the staple button 100b and designates the staple position.

In addition to the automatic page turning button 180, a scroll bar can be disposed at the right side of the preview image displaying region 100e. With this, the user can view pages by using the scroll bar.

In the following, main buttons for executing the embodiment of the present invention are shown, and other buttons may be omitted.

FIG. 19 is a diagram showing the screen G100 on which a rotated preview image is displayed by pushing the rotation button 170 shown in FIG. 18.

When the user pushes the rotation button 170 shown in FIG. 18 on the screen G100, as shown in FIG. 19, a rotation method selecting button 172 is displayed. The rotation method selecting button 172 includes a head and tail reversing button 172a, a right direction rotation button 172b, a left direction rotation button 172c, an angle designation region 172d, and an OK button for determining the rotation angle.

The user can change the head and tail of the sheet image SHT1 by operating the head and tail reversing button 172a. In addition, the user can rotate the sheet image SHT1 clockwise on a 90° basis by operating the right direction rotation button 172b, and can rotate the sheet image SHT1 counterclockwise on a 90° basis by operating the left direction rotation button 172c. Further, the user can designate the rotation angle by selecting one of 90°, 180°, 270°, 360° (0°) by operating an up and down button in the angle designation region 172d. When the rotation angle is determined, the user pushes the "OK" button 172f. Then the user executes a next process.

FIG. 20A is a diagram showing the screen G100 on which a preview image is displayed by pushing the automatic page turning button 180 shown in FIG. 18.

When the user pushes the automatic page turning button 180 shown in FIG. 18 on the screen G100, as shown in FIG. 20A, a page turning speed selecting button 182 is displayed. The page turning speed selecting button 182 includes a fast button 182a, a normal button 182b, a slow button 182c, a page turning speed designating region 182d, and a start button for starting the page turning with the designated speed.

The user can select fast speed by operating the fast button 182a, can select normal speed by operating the normal button 182b, and can select slow speed by operating the slow button 182c.

In addition, the user can change the speed by operating an up and down button in the page turning speed designating region 182d. When the page turning speed is determined, the user pushes the start button 182f. With this, preview images are sequentially displayed at the selected speed on the preview image displaying region 100e in the order of the pages of the document read by the scanner 12.

FIG. 20B is a diagram showing the screen G100 on which a preview image on a page is displayed by pushing the start button 182f shown in FIG. 20A. In FIG. 20B, in the message region 100a, a message, for example, "STOP PAGE TURNING BY TOUCHING SCREEN, PUSH START TO RESTART" is displayed. The user can stop the automatic page turning at an arbitrarily page by touching the preview image display region 100e and can restart the automatic page turning by pushing the start button 182f.

Figure 21:
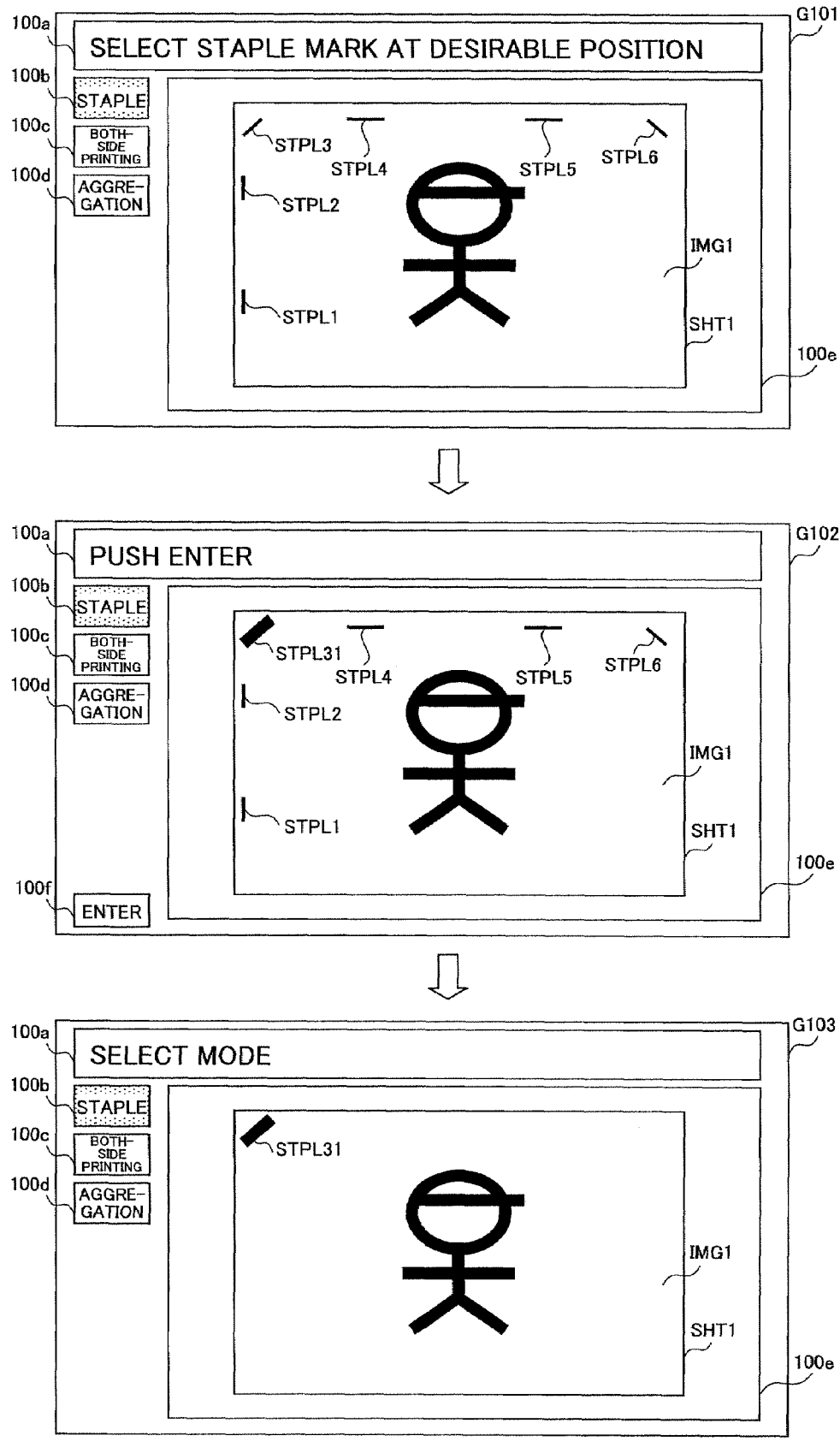
FIG. 21 is a diagram showing processes for designating a staple position.

FIG. 21 is a diagram showing processes for designating a staple position. In a screen G101 shown in FIG. 21, when the staple button 100b is selected, plural staple marks STPL1, STPL2, STPL3, STPL4, STPL5, and STPL6 are shown on the sheet image SHT1.

In the message region 100a of the screen G101, for example, a message "SELECT STAPLE MARK AT DESIRABLE POSITION" is displayed, and the user selects, for example, the staple mark STPL3 on the sheet image SHT1. The selected staple mark STPL3 is changed to a staple mark STPL31 by being exaggerated and the staple mark STPL31 is displayed on a screen G102.

In the message region 100a of the screen G102, for example, a message "PUSH ENTER" is displayed, and the user push an enter button 100f on the screen G102. When the user pushes the enter button 100f on the screen G102, a screen G103 is displayed.

On the screen G103, only the staple mark STPL31 is displayed on the sheet image SHT1, and "SELECT MODE" is displayed on the message region 100a. The user can continuously select another mode, for example, the both-side printing or the document aggregation. For example, when the user selects the document aggregation button 100d, processes of the document aggregation shown in FIG. 22 are started.

FIG. 22 is a diagram showing processes for designating a document aggregation. In a screen G111 shown in FIG. 22, in the message region 100a, "SELECT NUMBER OF DOCUMENTS TO BE AGGREGATED IN ONE SHEET" is displayed, and an aggregation candidate 110 is displayed.

The aggregation candidate 110 includes a button 110a which aggregates two documents into one sheet, a button 110b which aggregates four documents into one sheet, and a button 110c which aggregates nine documents into one sheet.

For example, when a user selects the button 110b, a screen G112 is displayed. In the message region 100a of the screen G112, for example, a message "PUSH ENTER BUTTON WHEN ORDER IS SUITABLE, PUSH PREFERABLE ARRANGEMENT BUTTON WHEN ORDER IS TO BE CHANGED" is displayed and a document arrangement candidate 114 is displayed instead of displaying the aggregation candidate 110.

The document arrangement candidate 114 includes buttons 114a, 114b, 114c, and 114d. In the button 114a, four documents are arranged in the order of upper left, upper right, lower left, and lower right positions. In the button 114b, four documents are arranged in the order of upper left, lower left, upper right, and lower right positions. In the button 114c, four documents are arranged in the order of upper right, upper left, lower right, and lower left positions. In the button 114d, four documents are arranged in the order of upper right, lower right, upper left, and lower left positions.

When the screen G112 is displayed, the four documents are displayed in the arrangement order of the button 114a. In the screen G112, the staple mark STPL31 selected by the user, the first document image IMG1, a second document image IMG2, a third document image IMG3, and a fourth document image IMG4 are displayed on the sheet image SHT1.

When the user satisfies the arrangement order shown by the button 114a, the user pushes the enter button 110f. However, when the user does not satisfy the arrangement order shown by the button 114a, the user can change the arrangement order by selecting one of the buttons 114b through 114d.

When the user pushes the enter button 110f, a screen G113 is displayed. In the message region 110a of the screen G113, the message "SELECT MODE" is displayed. When the user pushes the both-side printing button 100c, a screen shown in FIG. 23 is displayed.

Figure 23:
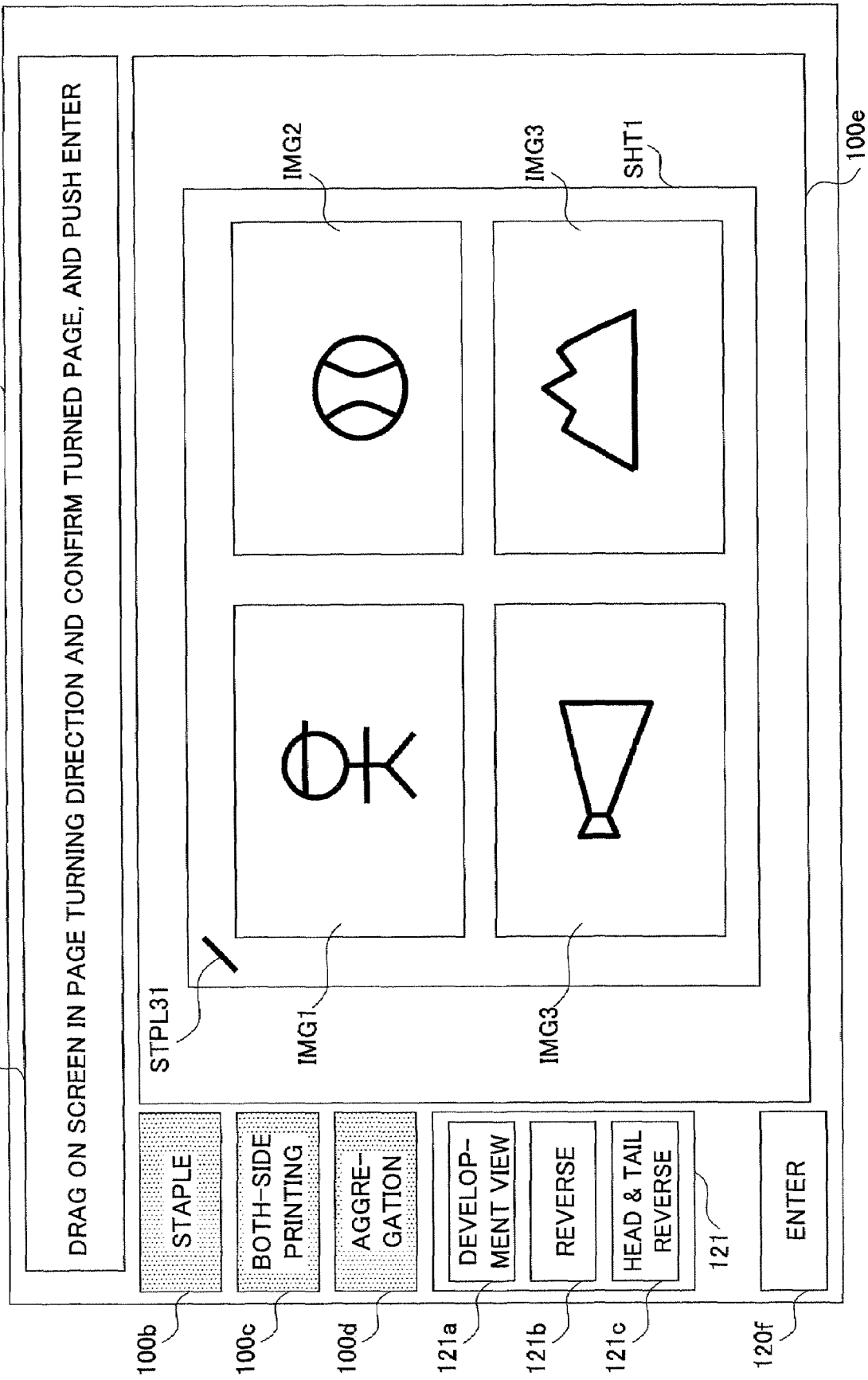
FIG. 23 is a diagram showing a screen of a preview image in which both-side printing is designated.

FIG. 23 is a diagram showing a screen G120 of a preview image in which both-side printing is designated. In the screen G120, in the message region 100a, for example, a message "DRAG ON SCREEN IN PAGE TURNING DIRECTION AND CONFIRM TURNED PAGE, AND PUSH ENTER" is displayed, and a both-side preview selection 121 is displayed.

The both-side preview selection 121 includes a development view button 121a for previewing a development view, a reverse button 121b for previewing a reversed preview image, and a head and tail changing button 121c for changing the head and tail.

When the user pushes the enter button 120f, the preview image is determined for printing.

Figure 24:
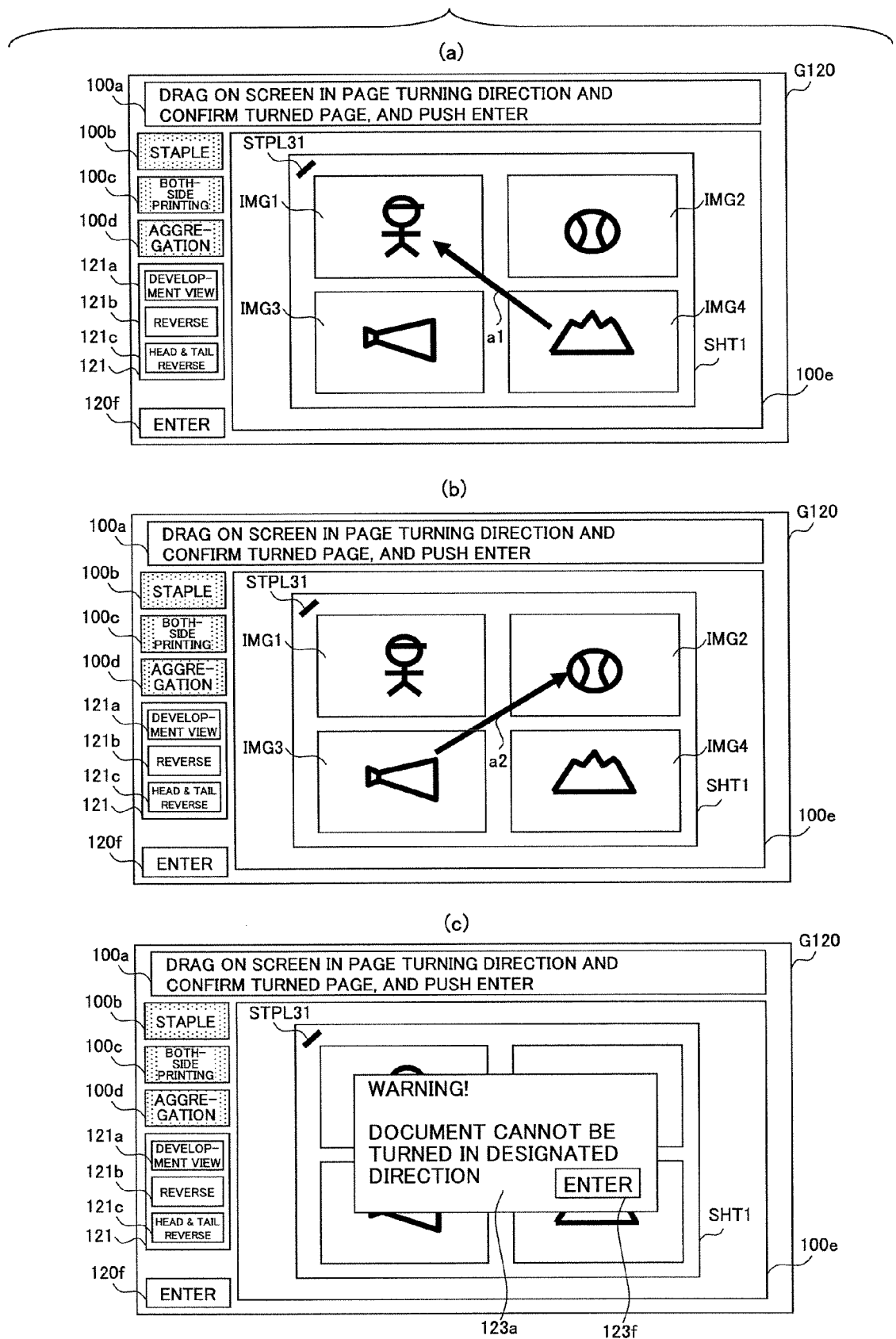
FIG. 24 is a diagram showing page turning directions.

FIG. 24 is a diagram showing page turning directions. In FIG. 24(a), the page turning direction faces the STPL31. When the user drags on the screen in a direction "a1" from the lower right position to the upper left position on the sheet image SHT1, the page turning status is shown in a screen G121 in FIG. 25(a). FIG. 25 is a diagram showing screens in which documents are turned.

On the other hand, as shown in FIG. 24(b), when the user drags on the screen in a direction "a2" from the lower left position to the upper right position on the sheet image SHT1, as shown in FIG. 24(c), a warning screen 123a is shown in the screen G120.

In FIG. 24(c), in the warning screen 123a, a message, for example, "WARNING! DOCUMENT CANNOT BE TURNED IN DESIGNATED DIRECTION" is displayed. The user pushes an enter button 123f and designates again a page turning direction.

Referring to FIG. 25, screens in which the sheet image SHT1 is turned are described. In a screen G121 shown in FIG. 25(a), the sheet image SHT1 is started to be turned. In a screen G122 shown in FIG. 25(b), the sheet image SHT1 (first page) is turned and the rear surface of the sheet image SHT1 (second page) and a sheet image SHT2 (third page) are shown. In a screen G123 shown in FIG. 25(c), the sheet image SHT1 has been almost turned and the rear surface of the sheet image SHT1 (second page) is shown.

Figure 26:
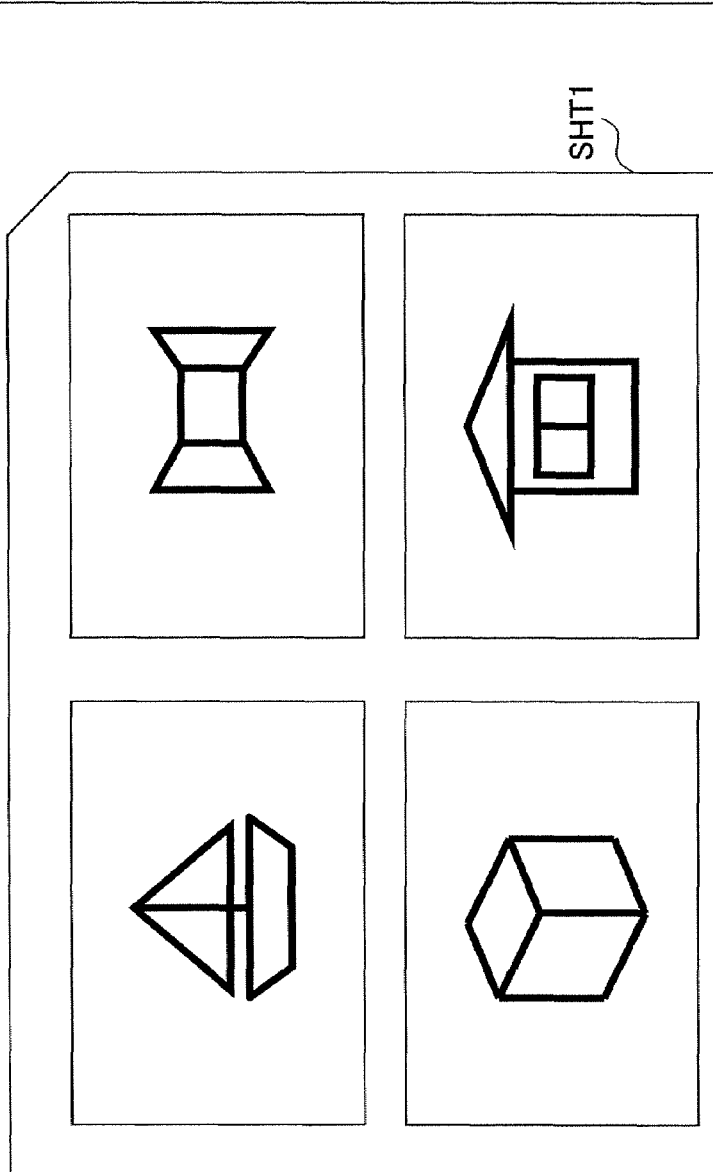
FIG. 26 is a diagram showing a screen in which a first sheet image has been completely turned.

FIG. 26 is a diagram showing a screen in which the sheet image SHT1 has been completely turned. As shown in FIG. 26, a screen G124 (preview screen) in which the sheet image SHT1 has been completely turned and the rear surface of the sheet image SHT1 (second page) is shown.

Figure 27:
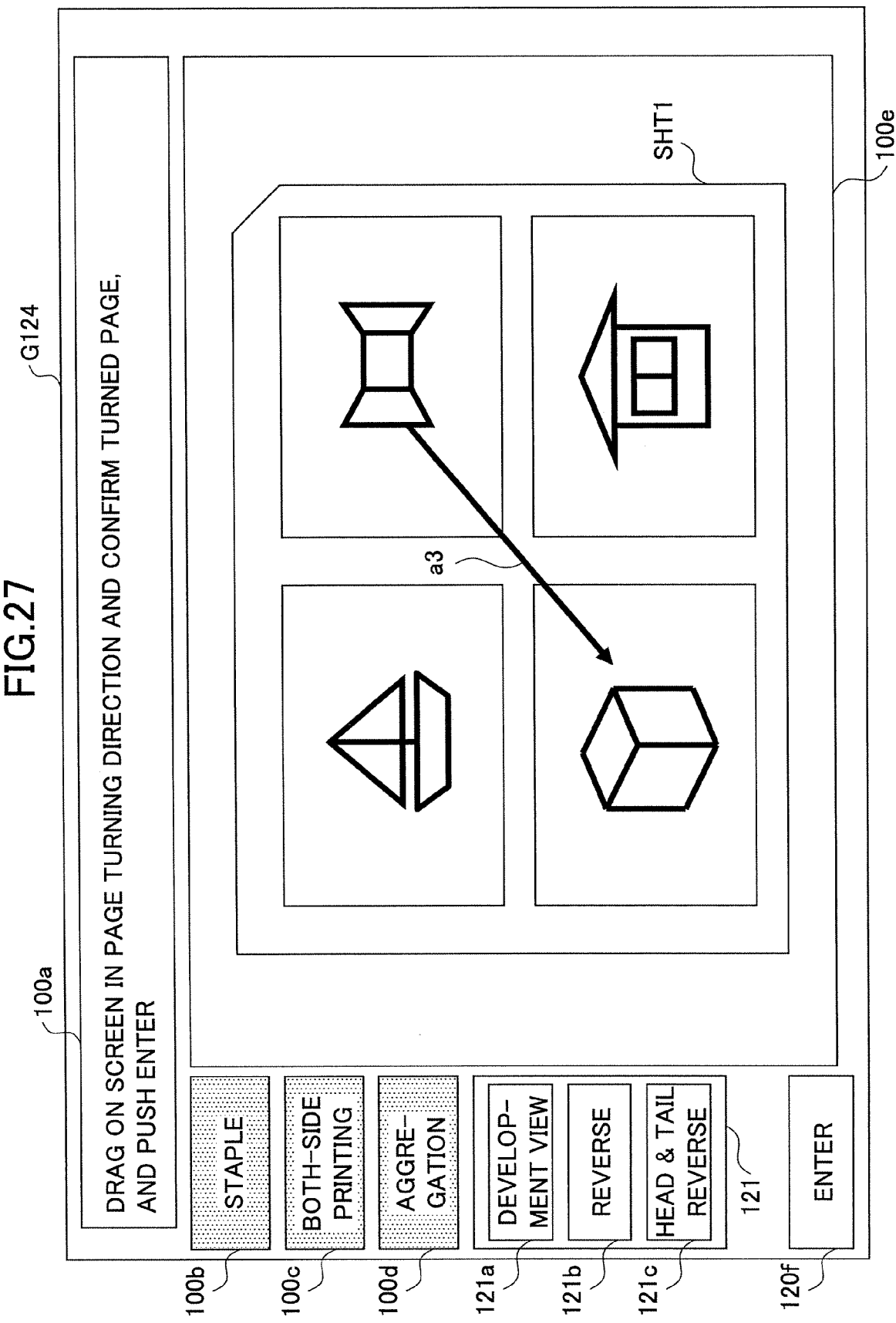
FIG. 27 is a diagram showing a screen in which a process returning to previous pages is shown.

FIG. 27 is a diagram showing a screen G124 in which a process returning to previous pages is shown. When the user drags on the screen G124 in a direction "a3" from the upper right position to the lower left position which direction is reverse to the page turning direction, the screen is sequentially returned from G124 to G123, G122, G122 (FIG. 25), and G120 (FIG. 24). That is, the screen is turned in reverse.

Figure 28:
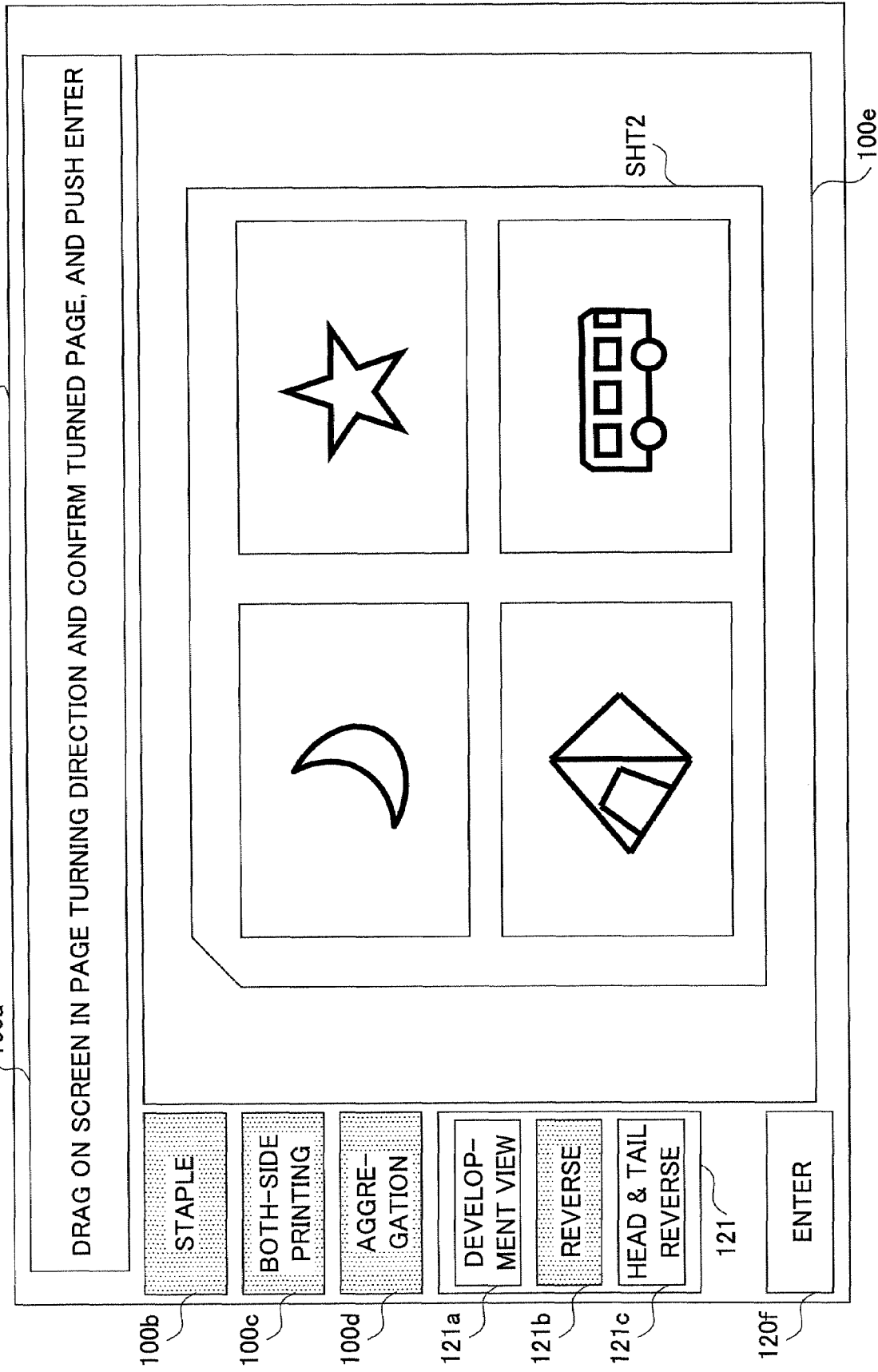
FIG. 28 is a diagram showing a screen in which a second sheet image is shown.

FIG. 28 is a diagram showing a screen G125 in which the sheet image SHT2 is shown. When the user pushes the reverse button 121b on the screen G124 shown in FIG. 27, the screen G125 shown in FIG. 28 is shown. In the screen G125, the front surface of the sheet image SHT2 (third page) is shown as a preview image. That is, in the sheet image SHT2, ninth through twelfth document images are shown.

Figure 29:
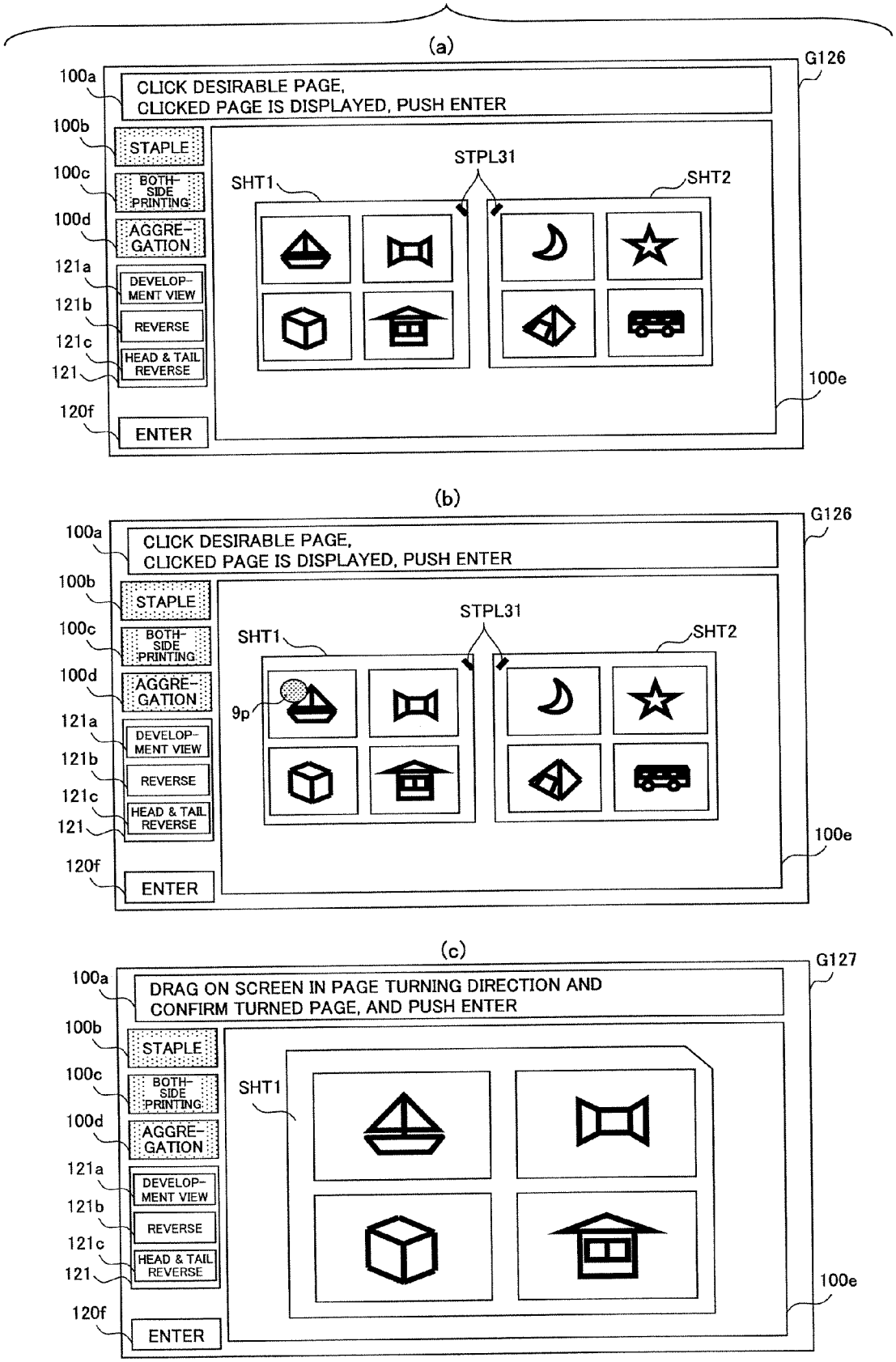
FIG. 29 is a diagram showing processes for displaying a development view.

FIG. 29 is a diagram showing processes for displaying a development view.

In FIG. 29(a), in a screen G126, the sheet images SHT1 and SHT2 are bound by the staple mark STPL31. In the message region 100a in the screen G126, a message, for example, "CLICK DESIRABLE PAGE, CLICKED PAGE IS DISPLAYED, PUSH ENTER".

For example, when the user clicks the screen G126 at a point "9p" in FIG. 29(b), as shown in FIG. 29(c), in a screen G127, only the rear surface of sheet image SHT1 (second page) is enlarged and displayed.

Figure 30:
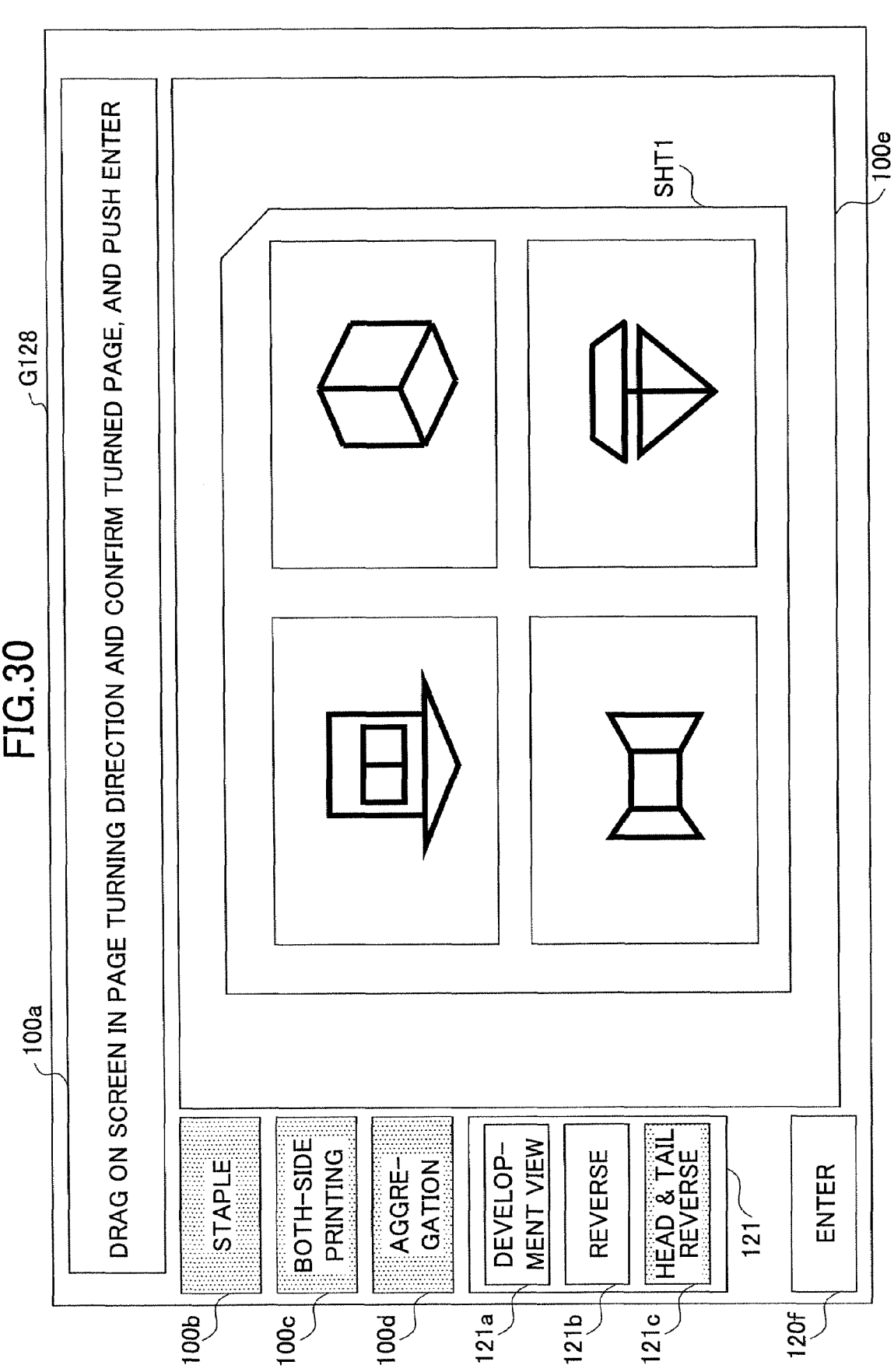
FIG. 30 is a diagram showing a screen in which the head and tail of the rear surface of the first sheet image is changed.

FIG. 30 is a diagram showing a screen G128 in which the head and tail of the rear surface of the sheet image SHT1 is changed.

When the user pushes the head and tail changing button 121c in the screen G127 shown in FIG. 29(c), as shown in FIG. 30, a preview image in which the head and tail of the rear surface of the sheet image SHT1 is changed is shown.

Next, referring to FIGS. 31 through 38, processes for designating the page turning direction are described. A case is described. In this case, first, the user selects the both-side printing and the document aggregation, and after this, the staple position is selected.

FIG. 31 is a diagram showing screens of a preview image in which the staple position is determined by designating the page turning direction. In FIG. 31, after the user selects the both-side printing and the document aggregation, when the user pushes the staple button 100b, a screen G201 is displayed. In the message region 100a of the screen G201, a message, for example, "DESIGNATE PAGE TURNING DIRECTION BY DRAG ON SCREEN" is displayed.

When the user drags in a direction "a5" (from lower to upper direction), a screen G202 is displayed. In the screen G202, the staple marks STPL21 and STPL22 are displayed along the upper side of the sheet image SHT1. In addition, in the message region 100a of the screen G202, a message, for example, "PUSH ENTER BUTTON" is displayed.

When the user pushes an enter button 220f, the sheet image SHT1 is determined as the preview image for printing.

Figure 32:
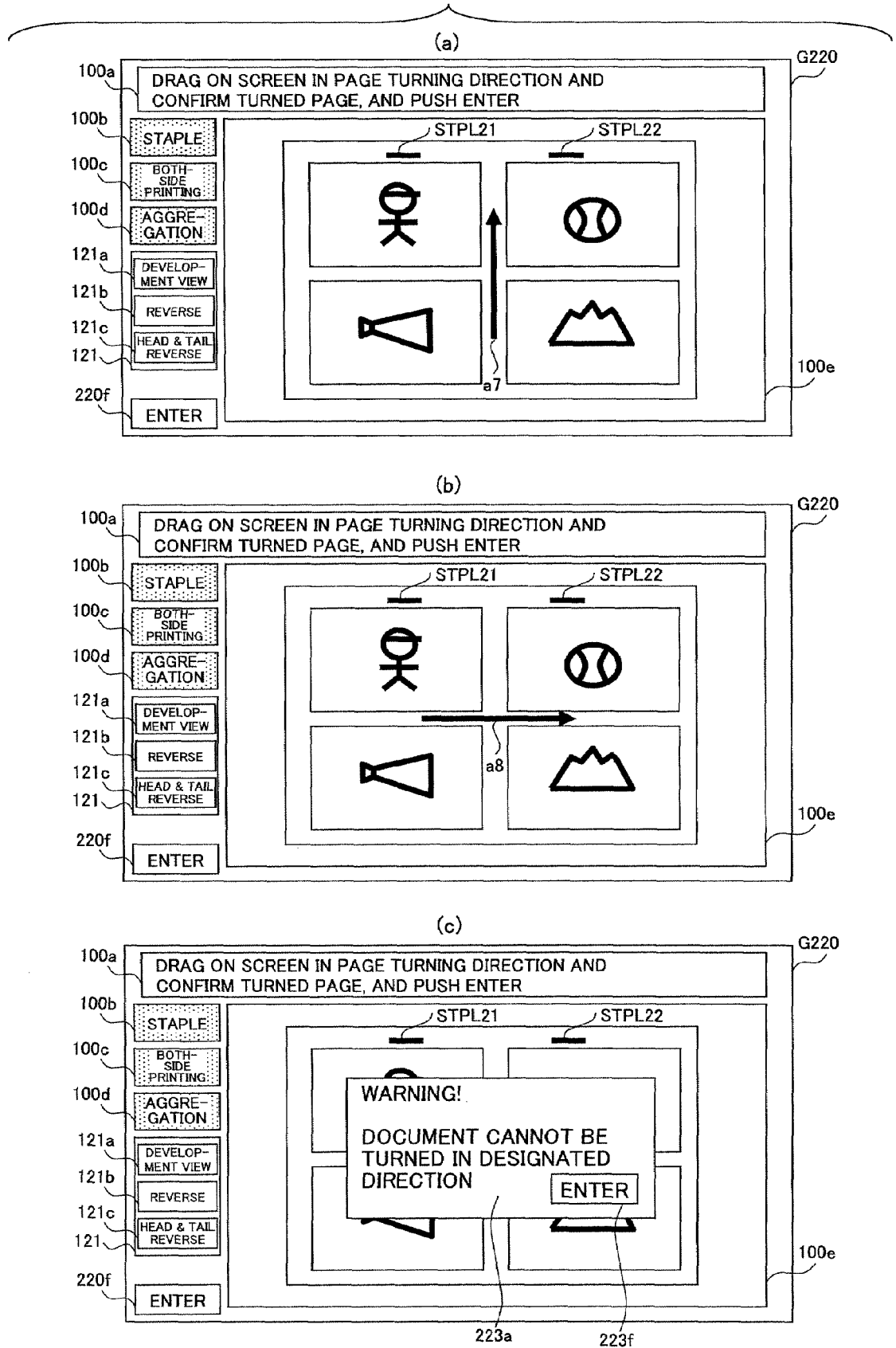
FIG. 32 is a diagram showing processes for designating the page turning direction.

Next, processes for designating the page turning direction on the sheet image SHT1 are described. FIG. 32 is a diagram showing processes for designating the page turning direction.

In FIG. 32(a), the page turning direction is designated to be a direction facing the staple marks STPL21 and STPL22 (from lower to upper positions). That is, when the user drags on the screen G220 in a direction "a7", as shown in FIG. 32(a), the sheet image SHT1 is started to be turned. FIG. 33 is a diagram showing screens in which the sheet image SHT1 is turned.

As shown in FIG. 32(b), when the user drags on the screen G220 in a direction "a8" (from left to right direction), a warning screen 223a is shown in the screen G220 of FIG. 32(c). In FIG. 32(c), in the warning screen 223a, a message, for example, "WARNING! DOCUMENT CANNOT BE TURNED IN DESIGNATED DIRECTION" is displayed. The user pushes an enter button 223f and designates again a page turning direction.

Referring to FIG. 33, turning the sheet image SHT1 is described. In FIG. 33, the turning progress is displayed as frames of moving images. In FIG. 33(a), in the screen G221, the sheet image SHT1 is started to be turned. In FIG. 33(b), in a screen G222, the rear surface of the sheet image SHT1 (second page) and the front surface of the sheet image SHT2 (third page) are started to be displayed. In FIG. 33(c), in a screen G223, the rear surface of the sheet image SHT1 (second page) has been almost displayed.

Figure 34:
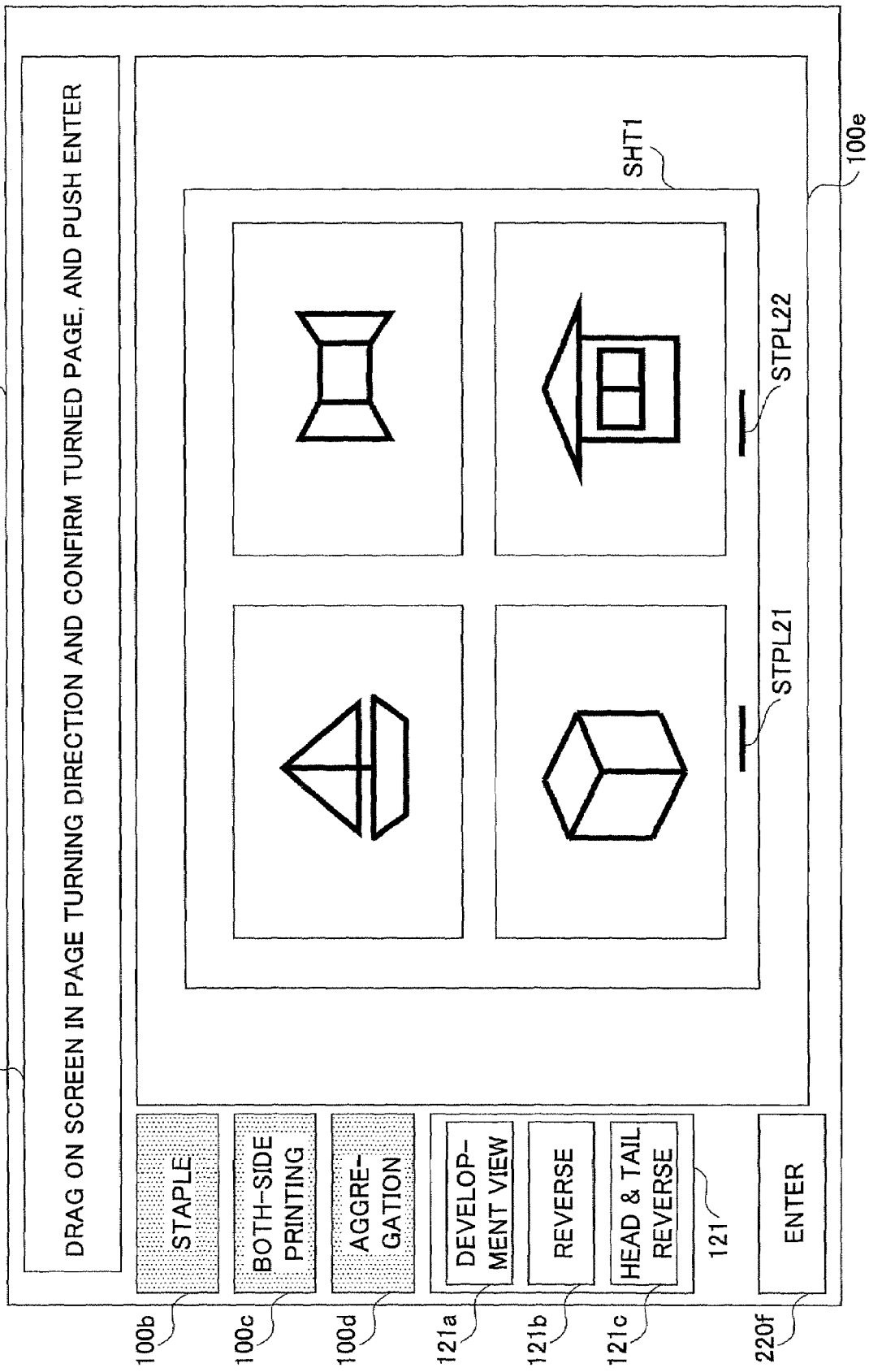
FIG. 34 is a diagram showing a screen in which the rear surface of the first sheet image (second page) is displayed.

Then, as shown in FIG. 34, when the sheet image SHT1 has been completely turned, the rear surface of the sheet image SHT1 (second page) is displayed. FIG. 34 is a diagram showing a screen G224 in which the rear surface of the sheet image SHT1 (second page) is displayed.

Figure 35:
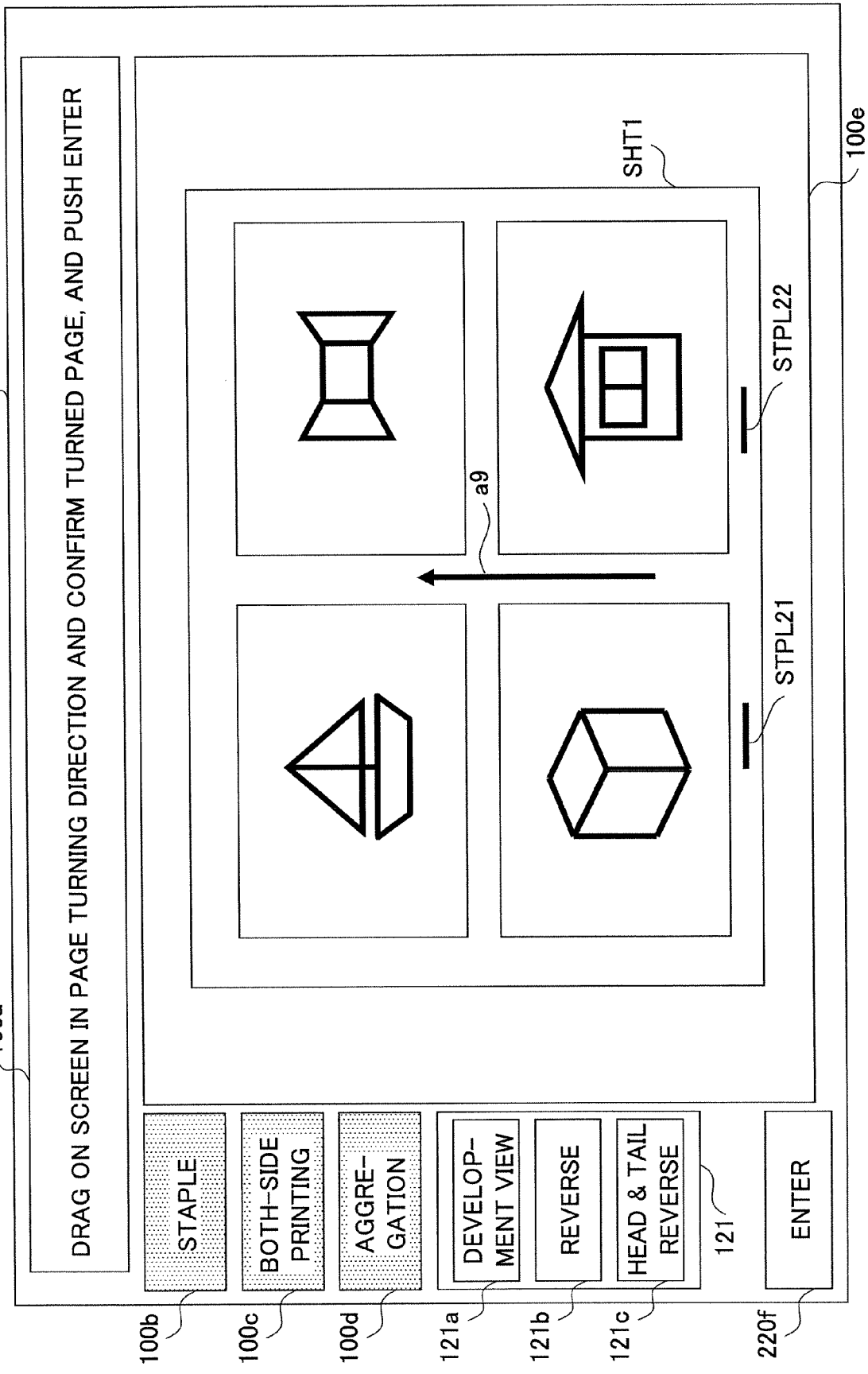
FIG. 35 is a diagram showing a screen in which a process returning to previous pages is shown.

FIG. 35 is a diagram showing the screen G224 in which a process returning to previous pages is shown. When the user drags on the screen G224 in a direction "a9" from the lower position to the upper position which direction is reverse to the page turning direction, the screen is sequentially returned from G224 to G223, G222, G221 (FIG. 33), and G220 (FIG. 32). That is, the screen is reversely turned.

Figure 36:
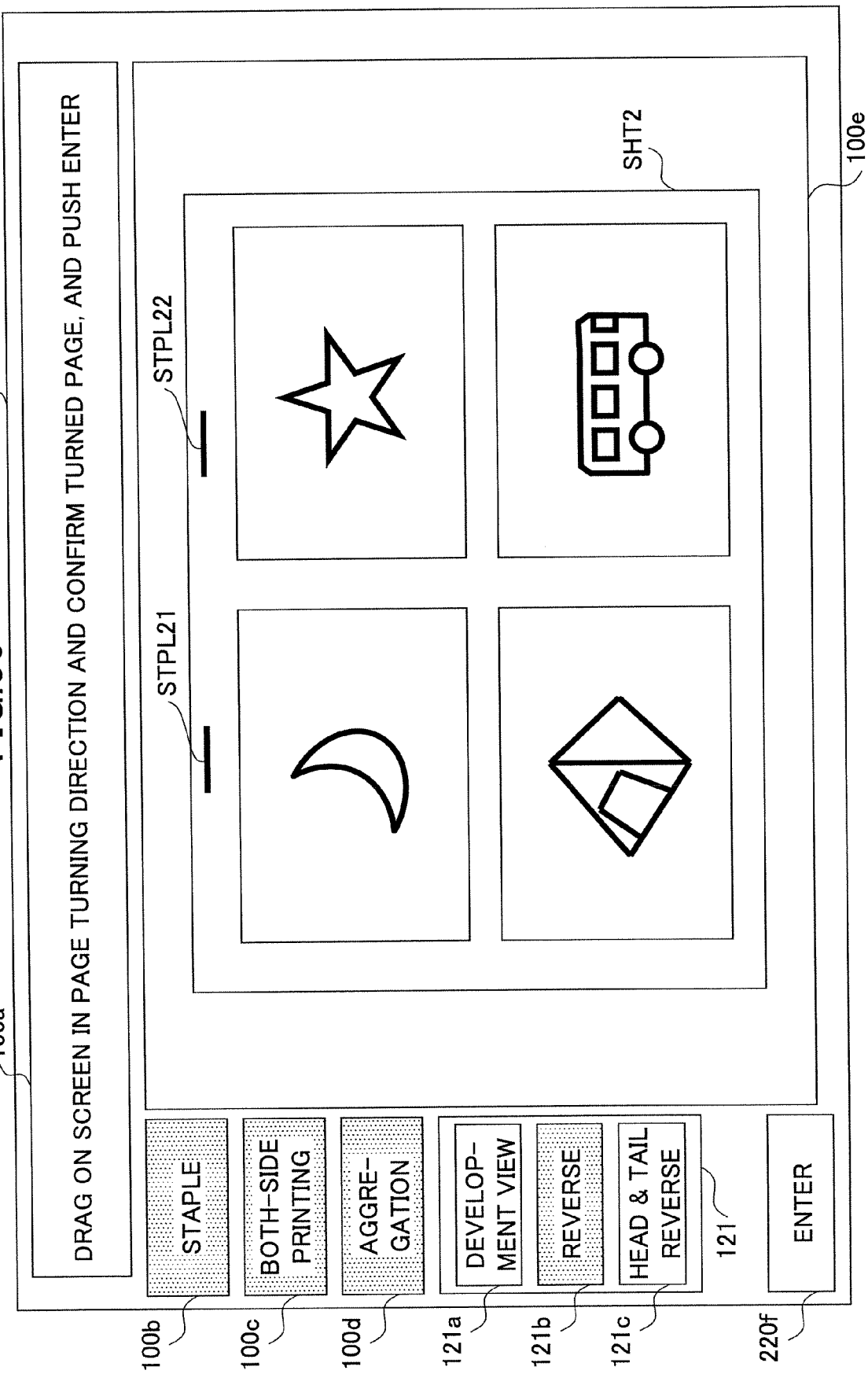
FIG. 36 is a diagram showing a screen in which the second sheet image is shown.

FIG. 36 is a diagram showing a screen G225 in which the sheet image SHT2 is shown. When the user pushes the reverse button 121b on the screen G224 shown in FIG. 35, the screen G225 shown in FIG. 36 is displayed. In the screen G225, the front surface of the sheet image SHT2 (third page) is shown as a preview image. That is, in the sheet image SHT2, ninth through twelfth document images are shown.

When the user pushes the development view button 121a on the screen G225, a screen flow (processes) shown in FIG. 37 is executed. FIG. 37 is a diagram showing processes to display a development view.

In FIG. 37(a), in a screen G226, the sheet images SHT1 and SHT2 are bound by the staple marks STPL21 and STPL22. In the message region 100a in the screen G226, a message, for example, "CLICK DESIRABLE PAGE, THEN IMAGE OF CLICKED PAGE IS DISPLAYED, PUSH ENTER BUTTON".

For example, when the user clicks the screen G226 at a point "29p" in FIG. 37(b), as shown in FIG. 37(c), in a screen G227, only the rear surface of sheet image SHT1 (second page) is enlarged and displayed.

When the user pushes the head and tail changing button 121c on the screen G227, a preview image shown in FIG. 38(a) or 38(b) in which the head and tail of the rear surface of the sheet image SHT1 are reversed is shown in a screen G228a or G228b.

Figure 38:
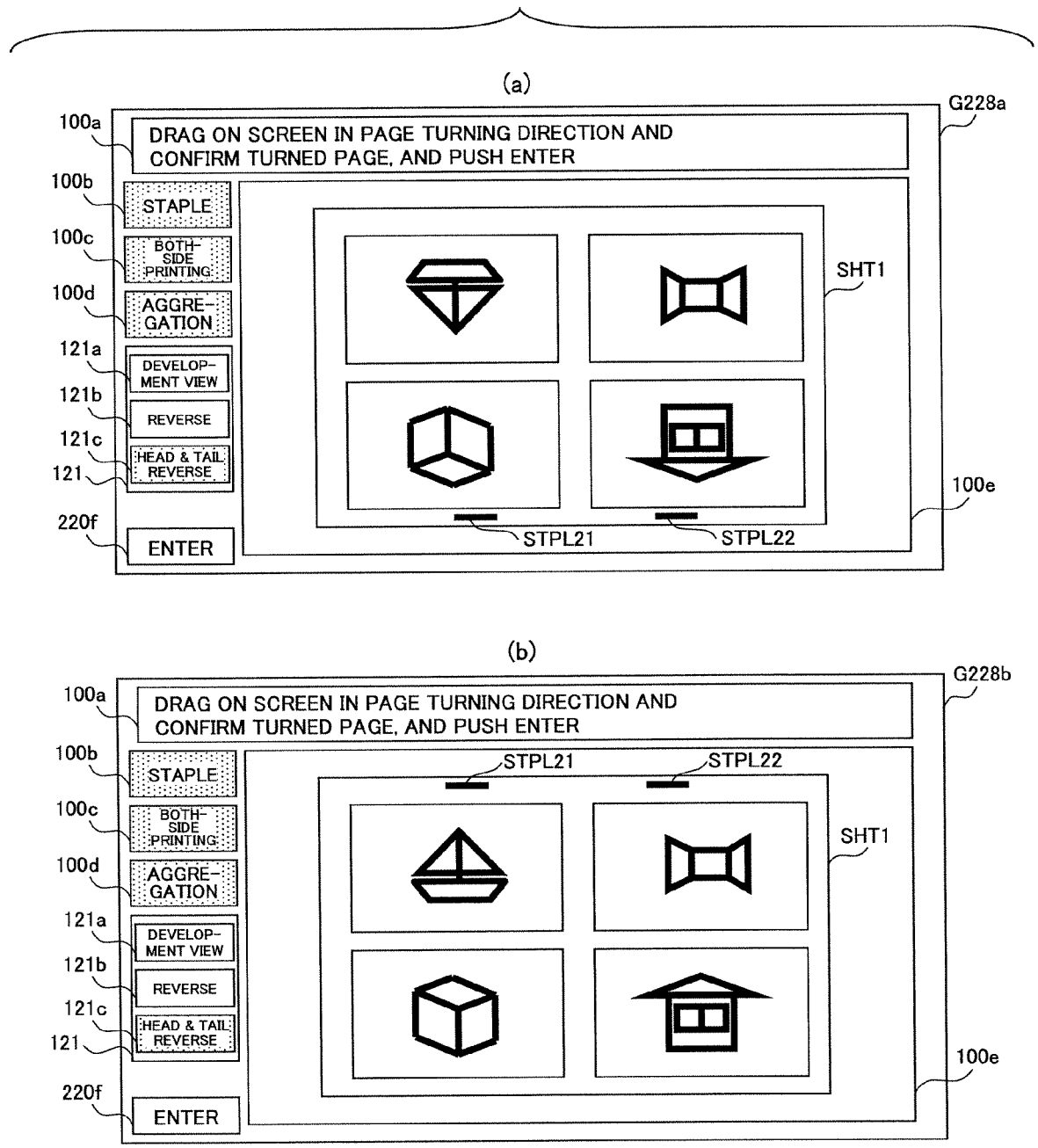
FIG. 38 is a diagram showing screens in which the head and tail of the rear surface of the first sheet image are reversed.

FIG. 38 is a diagram showing screens in which the head and tail of the rear surface of the sheet image SHT1 are reversed.

In FIG. 38(a), on the screen G228a, the head and tail of each image in the SHT1 are reversed. That is, the head and tail of the images in the rear surface of the sheet image SHT1 are reversed. In FIG. 38(b), on the screen G228b, the positions of the staple marks STPL21 and STPL22 are only reversed.

Figure 39:
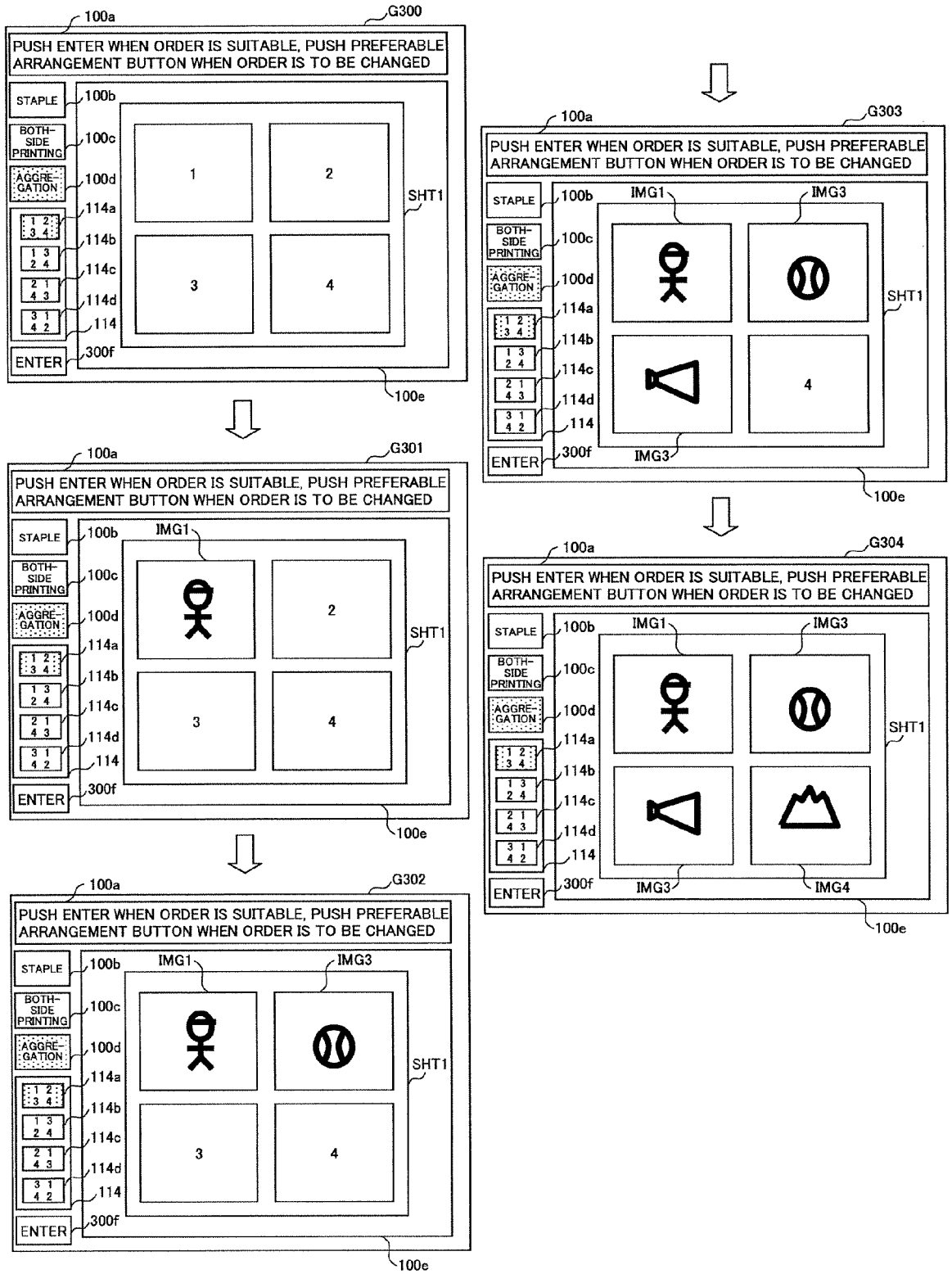
FIG. 39 is a diagram showing processes (screen flow) in which a processing condition is determined before reading a document.

Next, processes in which a processing condition is determined before reading a document are described. FIG. 39 is a diagram showing processes (screen flow) in which a processing condition is determined before reading a document. In FIG. 39, on a screen G300, a processing condition is determined before reading a document.

In the message region 100a on the screen G300, a message, for example, "PUSH ENTER WHEN ORDER IS SUITABLE, PUSH PREFERABLE ARRANGEMENT BUTTON WHEN ORDER IS TO BE CHANGED" is displayed.

When the user desires to change the arrangement order of documents, the user pushes one of the buttons in the document arrangement candidate 114. On the screen G300, the order is shown by numbers 1, 2, 3, and 4 on the sheet image SFT1. When the user pushes an enter button 300f, the image processing apparatus 1 reads a first document. As shown in a screen G301, a first document image IMG1 is displayed at the position of "1" on the sheet image SHT1.

When the image processing apparatus 1 reads a second document, as shown in a screen G302, a second document image IMG2 is displayed at the position of "2" on the sheet image SHT1. When the image processing apparatus 1 reads a third document, as shown in a screen G303, a third document image IMG3 is displayed at the position of "3" on the sheet image SHT1. In addition, when the image processing apparatus 1 reads a fourth document, as shown in a screen G304, a fourth document image IMG4 is displayed at the position of "4" on the sheet image SHT1.

Figure 40:
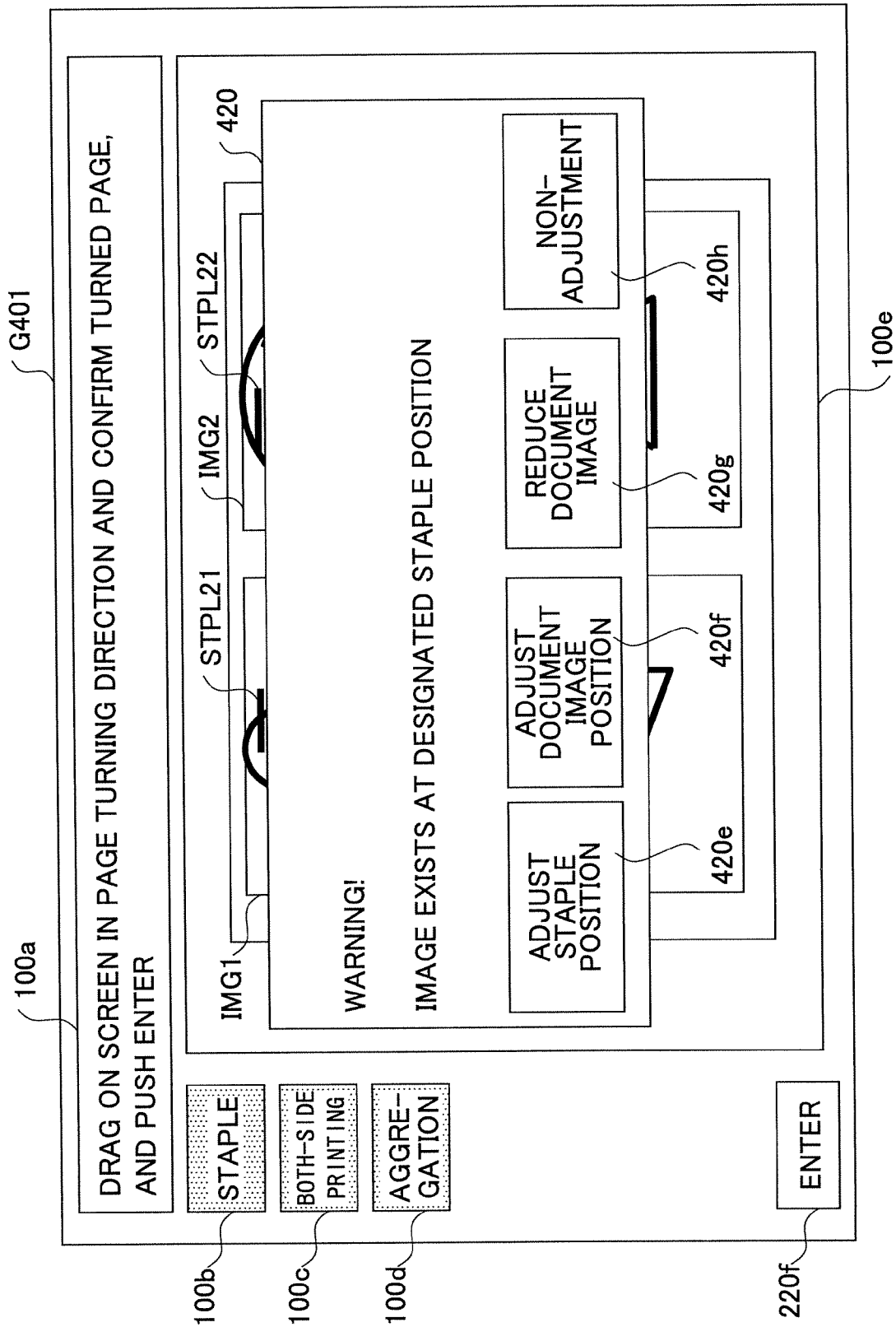
FIG. 40 is a diagram showing processes (screen flow) for adjusting a staple position.

Next, a staple position adjusting method is described. When a document image exists at a staple position, the staple position must be adjusted. FIG. 40 is a diagram showing processes (screen flow) for adjusting a staple position.

On a screen G401 of FIG. 40, when the staple marks STPL21 and STPL22 are designated to overlap the document image IMG1 and/or the document image IMG2, a warning screen 420 having a message, for example, "WARNING! IMAGE EXISTS AT DESIGNATED STAPLE POSITION" is displayed. The warning screen 420 includes a staple position adjusting button 420e, a document image position adjusting button 420f, a document image reducing button 420g, and a non-adjustment button 420h in which the current staple positions are used.

When the user finely adjusts the positions of the staple mark STPL21 and/or the staple mark STPL22, the user selects one of the buttons 420e, 420f, and 420g. When the user does not adjust the positions of the staple mark STPL21 and/or the staple mark STPL22, the user pushes the button 420h.

Figure 41:
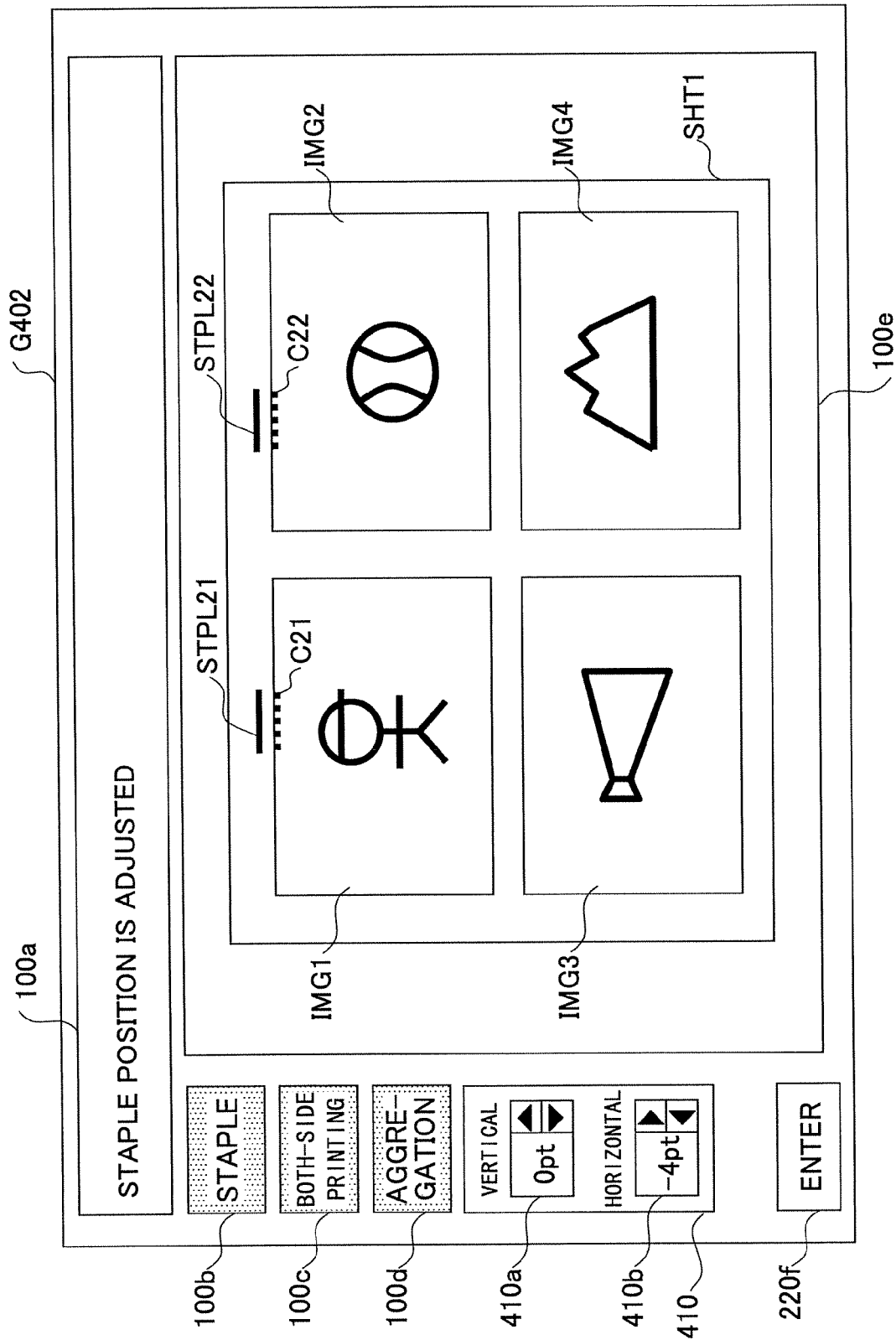
FIG. 41 is a diagram showing a screen in which the staple position is adjusted.

FIG. 41 is a diagram showing a screen G402 in which the staple position is adjusted. When the user pushes the button 402e, the screen G402 shown in FIG. 41 is displayed. In the message region 100a on the screen G402, a message, for example, "STAPLE POSITION IS ADJUSTED" is displayed, and staple position adjustment 410 is displayed.

The staple position adjustment 410 includes a vertical adjustment button 410a for vertically adjusting the staple position and a horizontal adjustment button 410b for horizontally adjusting the staple position.

The user adjusts the positions of the staple marks STPL21 and STPL22 by using the buttons 410a and 410b. When the user determines the positions of the staple marks STPL21 and STPL22, the user pushes an enter button 220f.

The image processing apparatus 1 again determines whether the staple position overlaps the document image IMG1 and/or IMG2. When the staple position overlaps the document image IMG1 and/or IMG2, the image processing apparatus 1 again displays the warning screen 420.

In the preview image displaying region 100e, the staple positions before adjustment are shown by broken line marks C21 and C22 on the sheet image SHT1. Therefore, the user can use the buttons 410a and 410b by viewing the screen G402.

Figure 42:
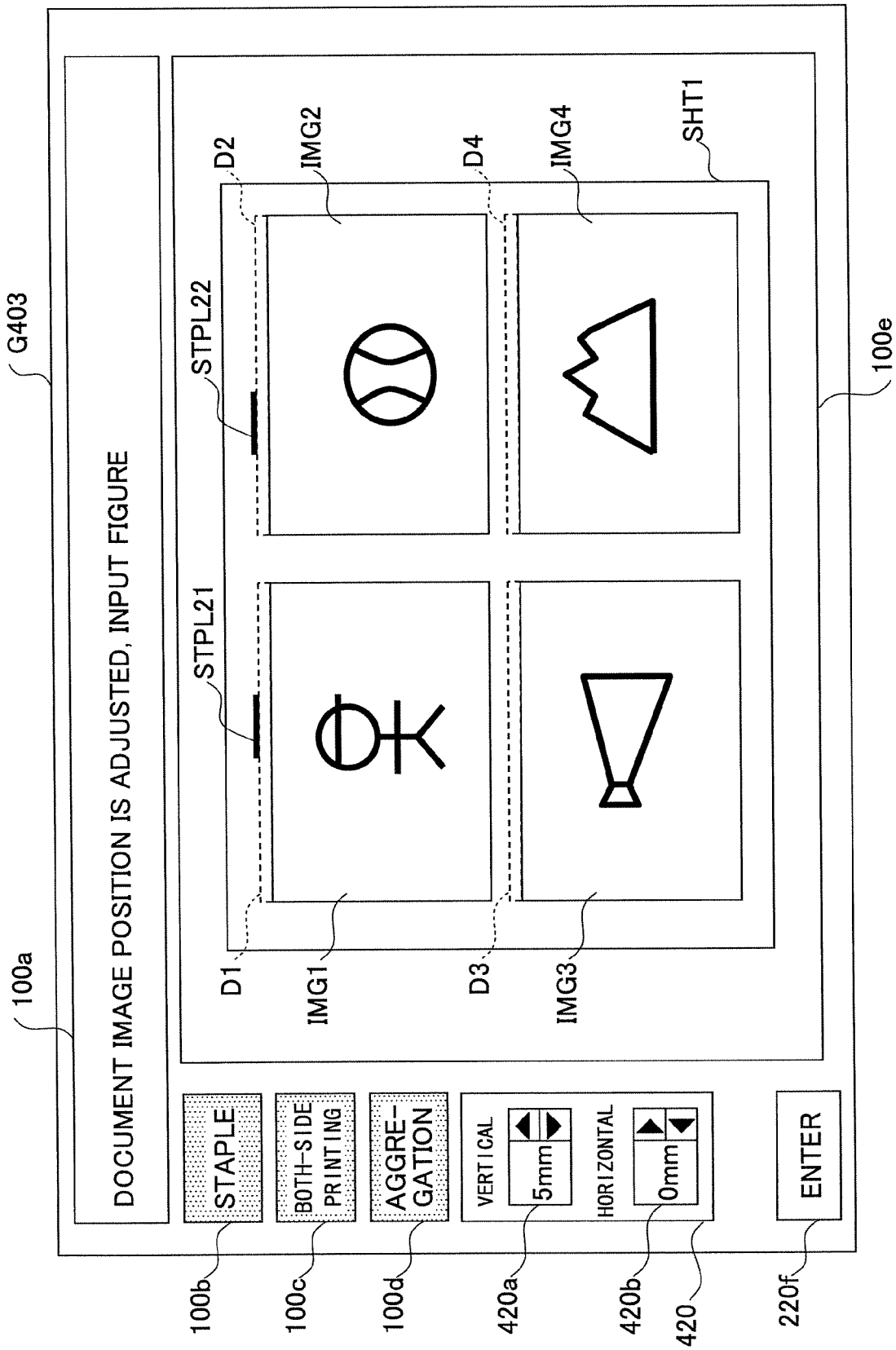
FIG. 42 is a diagram showing a screen in which a document image position is adjusted.

FIG. 42 is a diagram showing a screen G403 in which the document image position is adjusted. When the user pushes the button 402f shown in FIG. 40, the screen G403 shown in FIG. 42 is displayed. In the message region 100a on the screen G403, a message, for example, "DOCUMENT IMAGE POSITION IS ADJUSTED, INPUT FIGURE" is displayed, and document image position adjustment 420 is displayed.

The document image position adjustment 420 includes a vertical adjustment button 420a for vertically adjusting the document image position and a horizontal adjustment button 420b for horizontally adjusting the document image position.

The user adjusts the positions of the document images IMG1 through IMG4 by using the buttons 420a and 420b. When the user determines the positions of the document images IMG1 through IMG4, the user pushes the enter button 220f.

The image processing apparatus 1 again determines whether the staple position overlaps the document image IMG1 and/or IMG2. When the staple position overlaps the document image IMG1 and/or IMG2, the image processing apparatus 1 again displays the warning screen 420.

In the preview image displaying region 100e, the document image positions before adjustment are shown by broken line marks D1 through D4. Therefore, the user can use the buttons 420a and 420b by viewing the screen G403.

Figure 43:
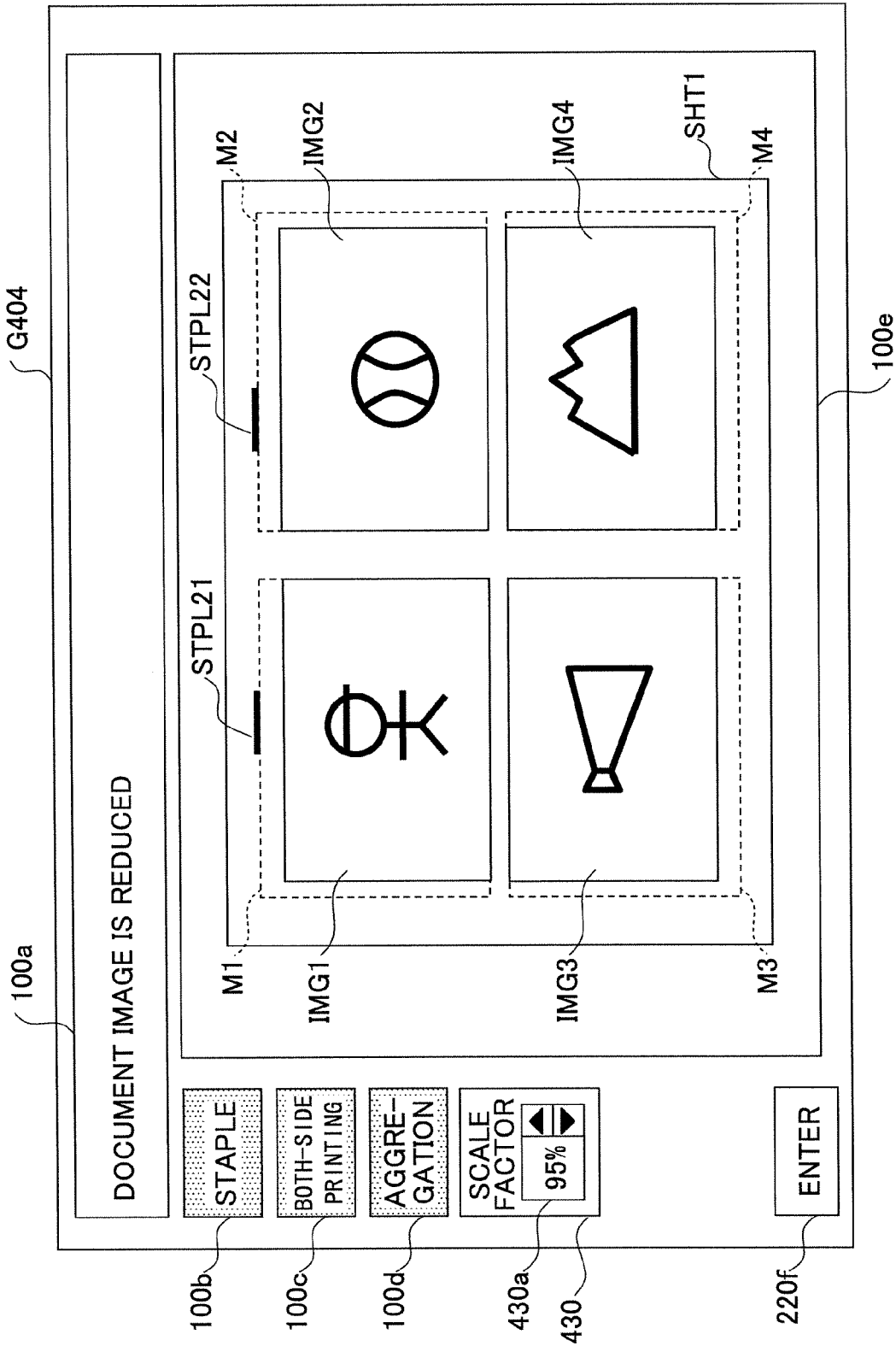
FIG. 43 is a diagram showing a screen in which a document image is reduced.

FIG. 43 is a diagram showing a screen G404 in which the document image is reduced. When the user pushes the button 402g, the screen G404 shown in FIG. 43 is displayed. In the message region 100a on the screen G404, a message, for example, "DOCUMENT IMAGE IS REDUCED" is displayed, and reduction adjustment 430 is displayed.

The reduction adjustment 430 includes a scale factor button 430a.

The user reduces the sizes of the document images IMG1 through IMG4 by using the buttons 430a. When the user determines the scale factor of the document images IMG1 through IMG4, the user pushes the enter button 220f.

The image processing apparatus 1 again determines whether the staple position overlaps the document image IMG1 and/or IMG2. When the staple position overlaps the document image IMG1 and/or IMG2, the image processing apparatus 1 again displays the warning screen 420.

In the preview image displaying region 100e, the sizes of the document images IMG1 through IMG4 before reduction are shown by broken line marks M1 through M4. Therefore, the user can use the button 430a by viewing the screen G404.

As described above, in order that a staple position does not overlap a document image, the user can adjust the staple position, the document image position, or can reduce the size of the document image by viewing the preview image displaying screen 100e. In addition, the user can combine the above adjustments (reduction). That is, a finishing process can be applied to the preview image. The finishing process includes a stapling process and a punching process.

In the staple position adjusting processes shown in FIGS. 41 through 43, the adjustment (reduction) can be applied to total pages of a document, only a page designated by a user, or a two-page spread. That is, the user may select the adjustment (reduction).

The above staple position adjustment can be applied to punch position adjustment.

Figure 44:
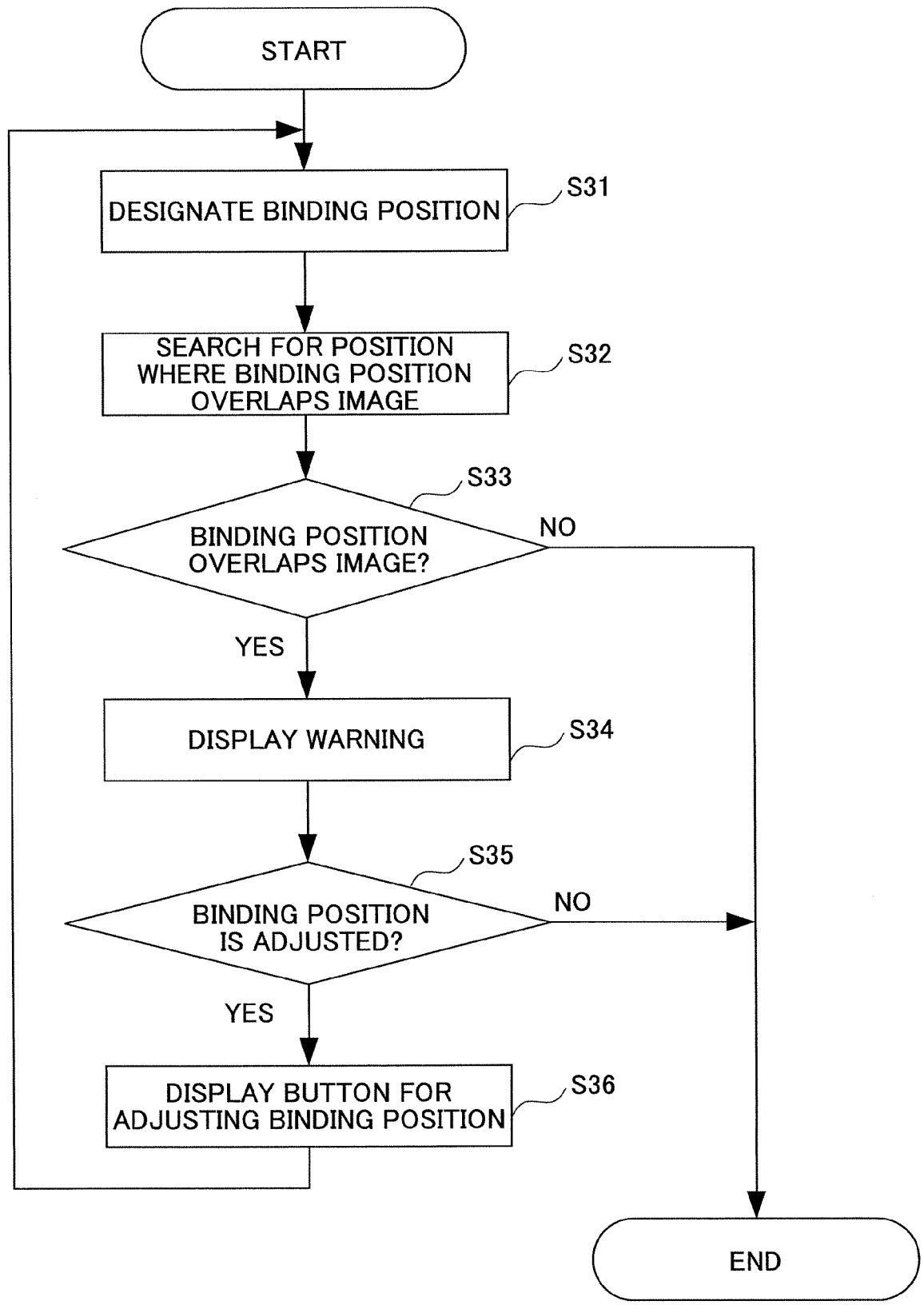
FIG. 44 is a flowchart showing processes to adjust an overlap position where a binding position of documents overlaps an image.

FIG. 44 is a flowchart showing processes to adjust an overlap position where a binding position of documents overlaps an image. That is, an overlap position is found where the staple position and/or the punch position overlaps an image.

First, a user designates a binding position of documents (S31). The image processing apparatus 1 searches for a position where the binding position overlaps an image (S32). In this case, a binding margin can be considered.

The image processing apparatus 1 determines whether the binding position overlaps the image based on the searched result (S33). When the binding position does not overlap the image (NO in S33), the process ends.

When the binding position overlaps the image (YES in S33), the image processing apparatus 1 displays a warning (S34). The image processing apparatus 1 determines whether a user adjusts the binding position (S35). When the user adjusts the binding position (YES in S35), a button for adjusting the binding position is displayed (S36). Then the process returns to S31, and the processes on and after S31 are repeated.

When the user does not adjust the binding position (NO in S35), the process ends.

The above processes for adjusting the overlap position where the binding position of the document overlaps the image can be executed in S12 shown in FIG. 17 or in S18 shown in FIG. 17 before a preview image is displayed when the staple position and/or the punch position is designated. That is, in S12, the processing condition is designated before the scanner 12 reads the document, and in S18, the processing condition is designated after the scanner 12 reads the document.

Next, timings of processes based on a processing condition in the image processing apparatus 1 are described. Referring to FIGS. 45 through 61, the timings of the processes are described. The processes in S13, S14, and S15 shown in FIG. 17 are realized in parallel based on a processing condition designated by the user. Each line of a document image read by the scanner 12 is stored in the PCI memory 79*b*, and after this, one band of the document image having predetermined number of lines is processed. The document images read by the scanner 12 are shown by the IMG1, the IMG2, the IMG3, the IMG4 . . . .

Figure 45:
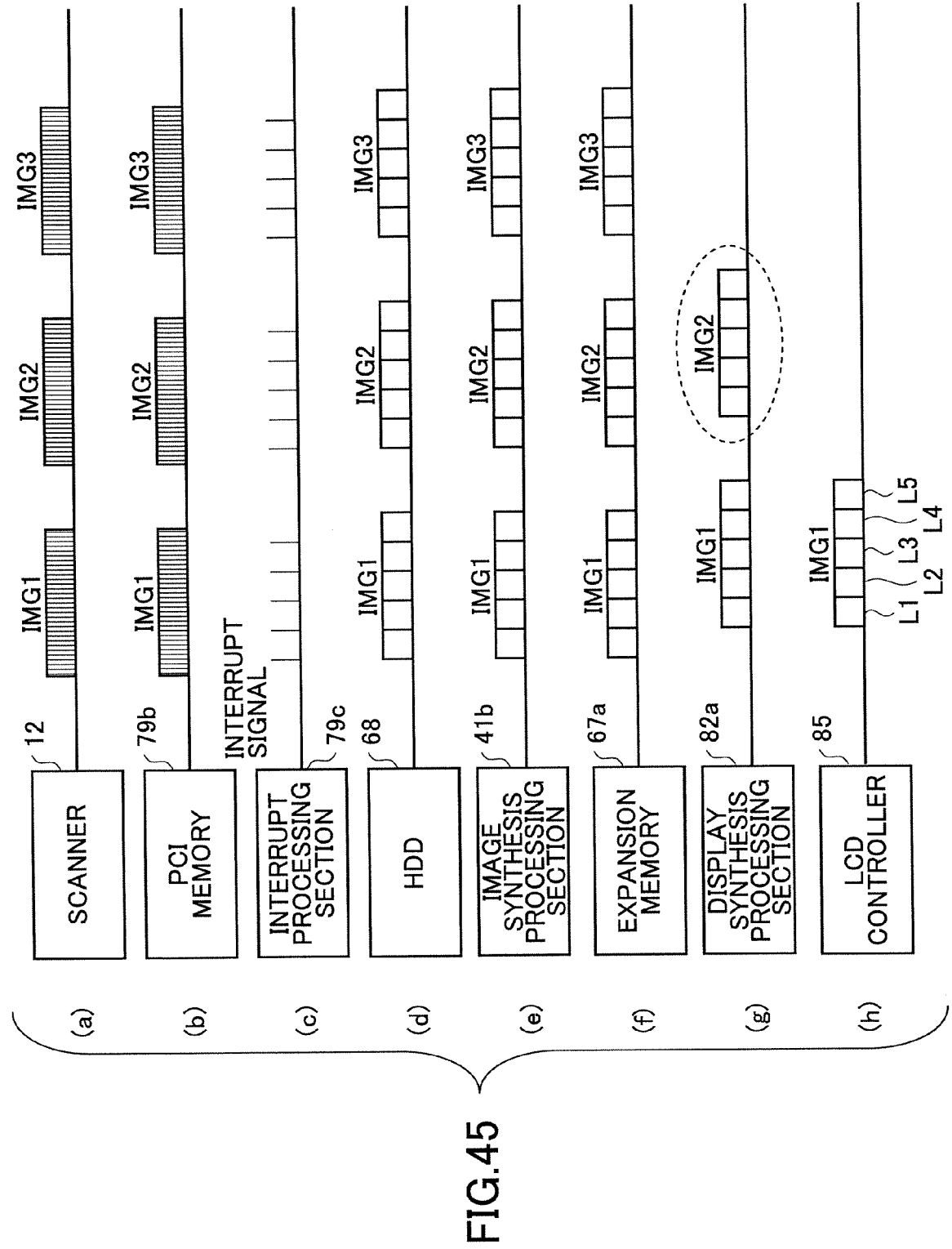
FIG. 45 is a timing chart of a normal operation for displaying a preview image.
Figure 46:
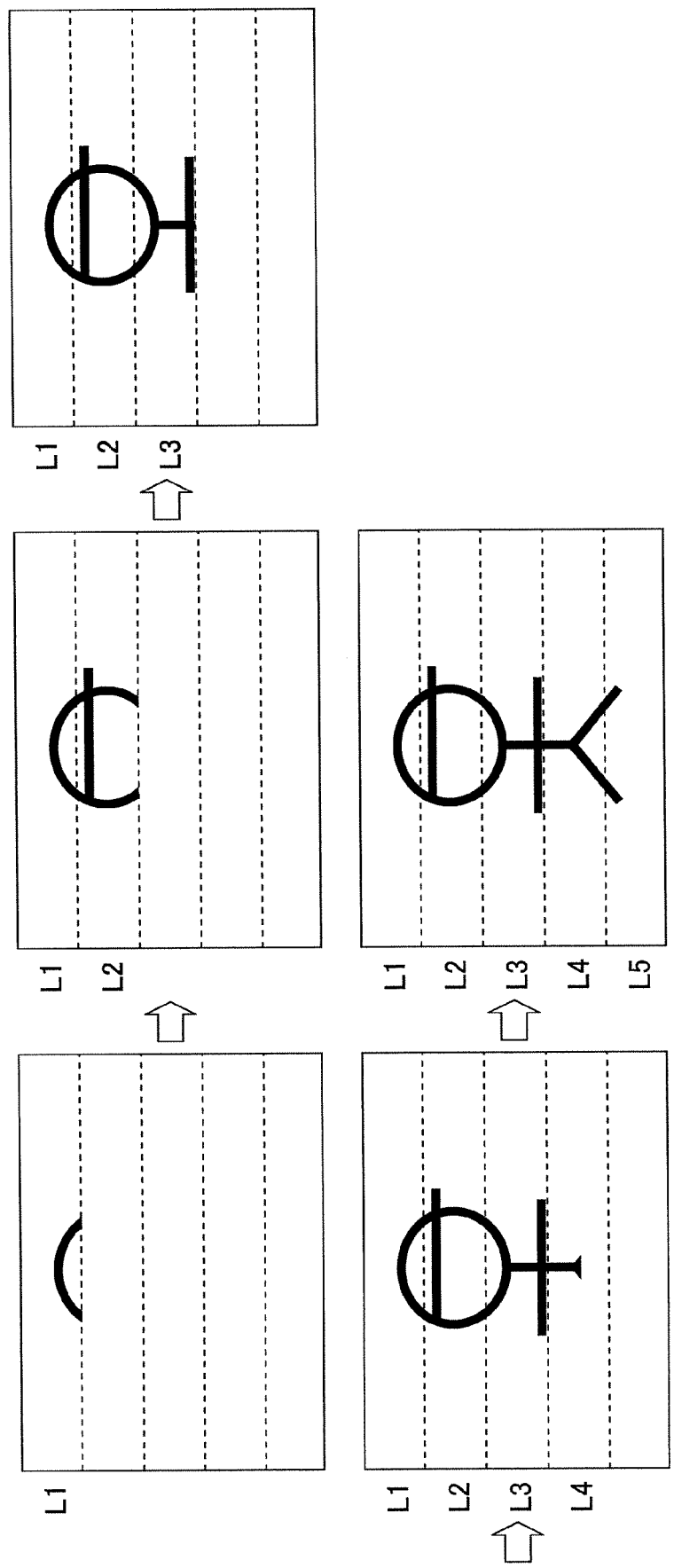
FIG. 46 is a diagram showing a flow for displaying a preview image in the normal operation.

FIG. 45 is a timing chart of a normal operation for displaying a preview image. FIG. 46 is a diagram showing a flow for displaying a preview image in the normal operation. Referring to FIGS. 45 and 46, the normal operation for displaying a preview image based on an initial processing condition is described.

In FIG. 45, the interrupt processing section 79*c* generates an interrupt signal each time when the scanner 12 reads an image of one band having the predetermined number of lines. The HDD 68 stores the one band image based on an image transfer clock, and the image synthesis processing section 41*b* and the expansion memory 67*a* obtain the one band image based on the interrupt signal.

Each time when the one band image is stored in the expansion memory 67*a*, the display synthesis processing section 82*a* synthesizes the one band images to form the document images IMG1 and IMG2. The LCD controller 85 displays the document image IMG1 in the order of band images L1, L2, L3, L4, and L5. The band images L1 through L5 are almost simultaneously displayed. Since the display synthesis processing section 82*a* stores the document image IMG2, the document image IMG2 can be simultaneously displayed when the page is turned. As shown in FIG. 46, the document image is displayed in the order of band images L1, L2, L3, L4, and L5.

Figure 47:
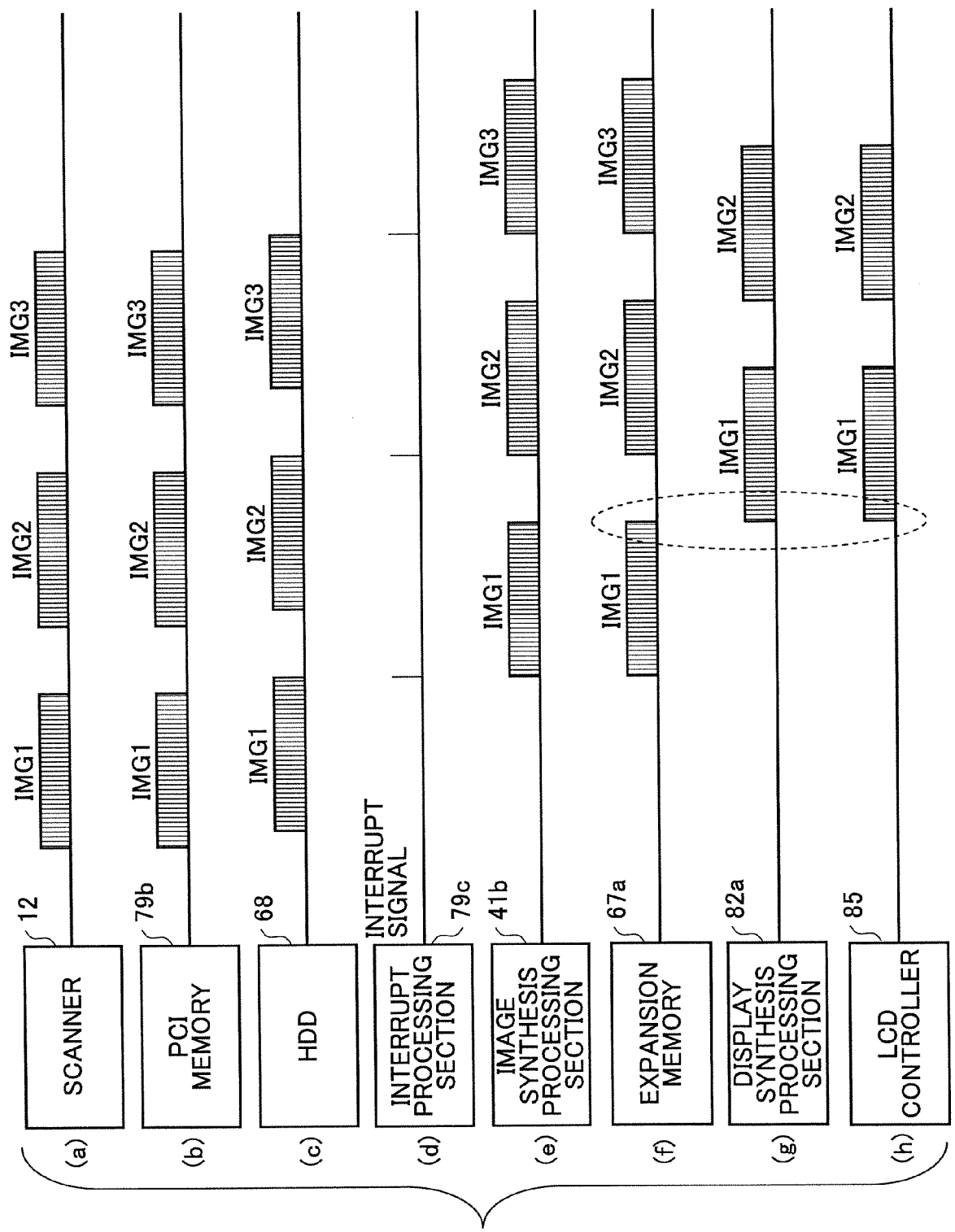
FIG. 47 is a timing chart for displaying a preview image when a rotation method is designated in a processing condition.

FIG. 47 is a timing chart for displaying a preview image when a rotation method is designated in a processing condition. FIG. 48 is a diagram showing the document images IMG1 when the image is read and displayed by being applied a rotation method. Referring to FIGS. 47 and 48, an operation is described in which the rotation method is designated in the processing condition for displaying a preview image.

When a user selects one of the buttons in the rotation method selecting button 172 on the screen G100 and pushes the OK button 172*f* in FIG. 19, a preview image is rotated.

In FIG. 47, signals of the document images IMG1, IMG2, and IMG3 read by the scanner 12 are instantly stored in the PCI memory 79*b*. In addition, the HDD 68 sequentially stores the document images IMG1, IMG2, and IMG3 based on an image transfer clock generated by the scanner 12.

When the rotation method is designated, the interrupt processing section 79*c* generates an interrupt signal each time when one of the document images IMG1, IMG2, and IMG3 is stored in the HDD 68. The image synthesis processing section 41*b* instantly stores the document images IMG1, IMG2, and IMG3 by rotating the images in the expansion memory 67*a* based on the interrupt signal.

Each time when the one band image is stored in the expansion memory 67*a*, the display synthesis processing section 82*a* synthesizes the one band images to form the document images IMG1, IMG2, and IMG3. The LCD controller 85 displays the document images IMG1, IMG2, and IMG3 in this order on the LCD panel 90. The document images IMG1, IMG2, and IMG3 are almost simultaneously displayed. As shown in FIG. 48, the document image IMG1 is vertically read and horizontally displayed.

Figure 49:
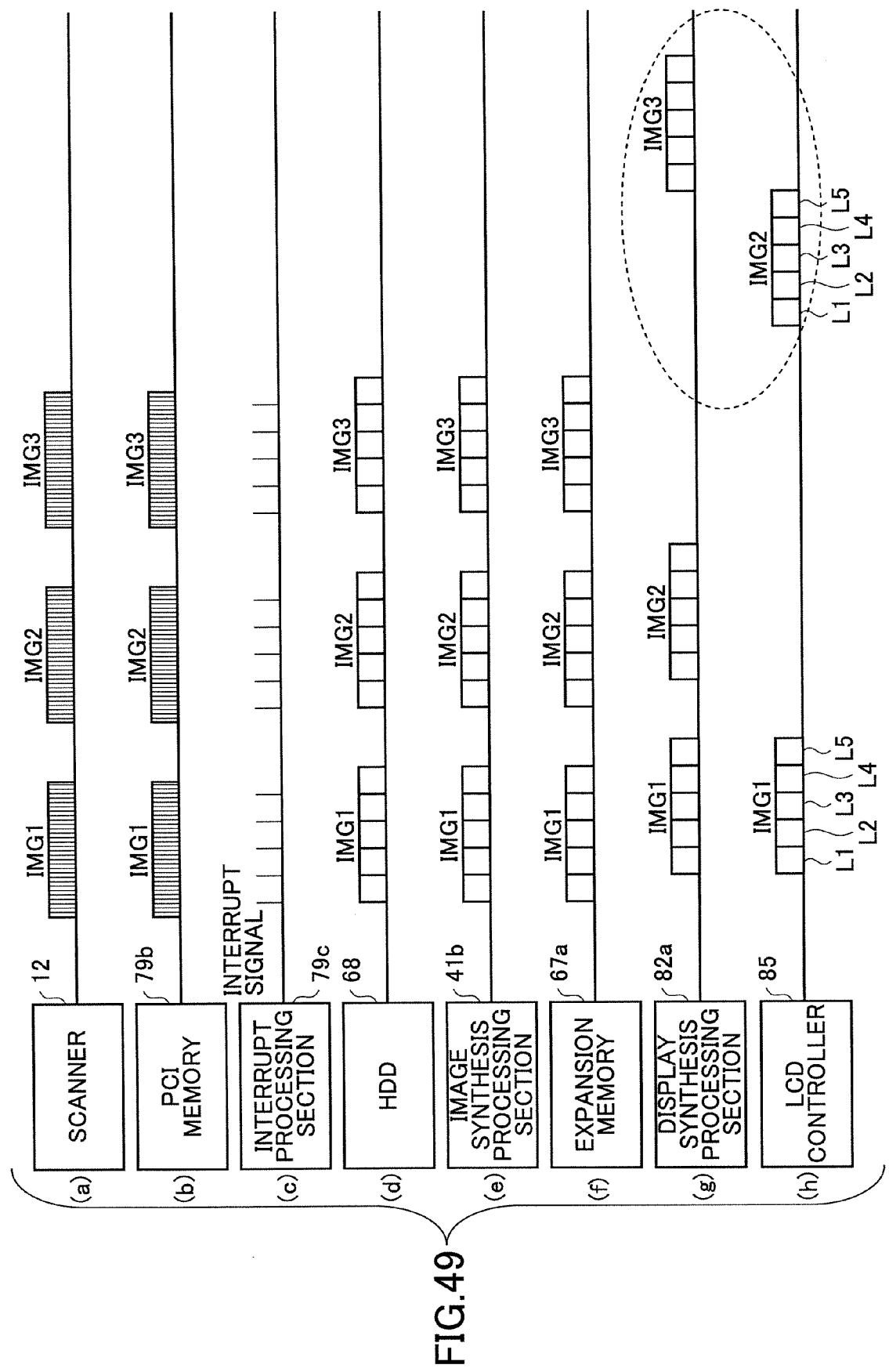
FIG. 49 is a timing chart for displaying a preview image when page turning is designated by a drag of a user.

FIG. 49 is a timing chart for displaying a preview image when page turning is designated by a drag of a user. Referring to FIG. 49, an operation is described in which the page turning is designated by a drag of a user on the preview image displaying region 10*e*. In FIG. 49, signals of the document images IMG1, IMG2, and IMG3 read by the scanner 12 are instantly stored in the PCI memory 79*b*.

The interrupt processing section 79*c* generates an interrupt signal each time when the scanner 12 reads an image of one band having the predetermined number of lines. The HDD 68 stores the one band image based on an image transfer clock, and the image synthesis processing section 41*b* and the expansion memory 67*a* obtain the one band image based on the interrupt signal.

Each time when the one band image is stored in the expansion memory 67*a*, the display synthesis processing section 82*a* synthesizes the one band images to form the document images IMG1 and IMG2. The LCD controller 85 displays the document image IMG1 in the order of band images L1, L2, L3, L4, and L5. The band images L1 through L5 are almost simultaneously displayed. The processes described above are almost the same as those shown in the normal operation in FIG. 45.

When the user designates to turn the document image IGM1 to a next document image (IMG2) by a drag on a screen, the LCD controller 85 displays the document image IMG2 in the order of band images L1, L2, L3, L4, and L5. When the document image IMG2 is displayed, the display synthesis processing section 82*a* synthesizes the band images to form a next document image (the document image IMG3).

When the user designates to turn the document image IGM2, the document image IMG3 is displayed. When the user designates to turn the document image IGM3 to a previous document image, the document image IMG2 is displayed. With this, the document image of a previous page or a next page can be easily displayed.

Figure 50:
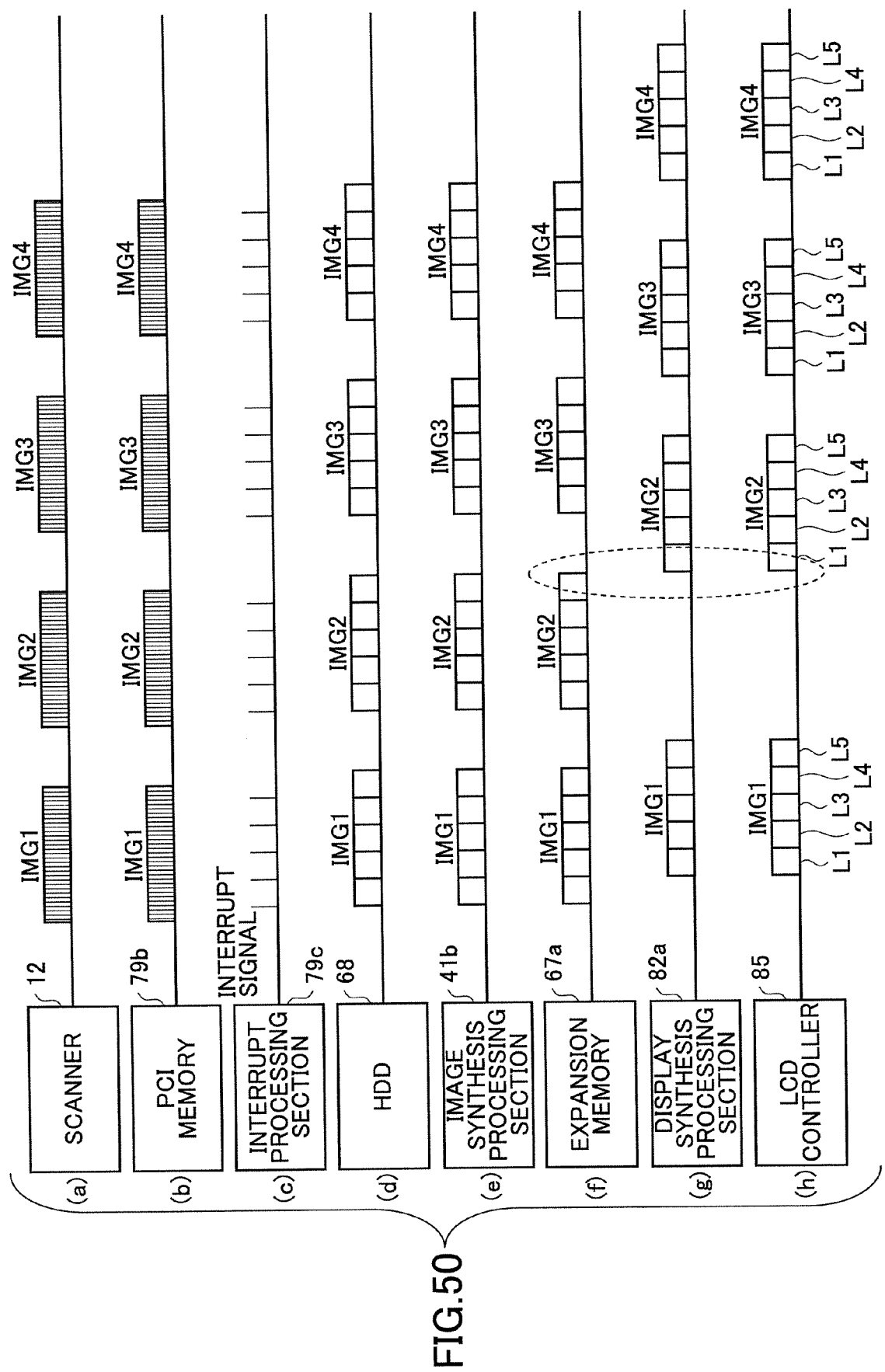
FIG. 50 is a timing chart for displaying a preview image when automatic page turning is designated by a user.

FIG. 50 is a timing chart for displaying a preview image when automatic page turning is designated by a user. Referring to FIG. 50, an operation is described in which the automatic page turning is designated by pushing the automatic page turning button 180 shown in FIG. 18 or an instruction on the image processing apparatus 1. In FIG. 50, signals of the document images IMG1, IMG2, IMG3, and IMG4 read by the scanner 12 are instantly stored in the PCI memory 79b.

The interrupt processing section 79c generates an interrupt signal each time when the scanner 12 reads an image of one band having the predetermined number of lines. The HDD 68 stores the one band image based on an image transfer clock, and the image synthesis processing section 41b and the expansion memory 67a obtain the one band image based on the interrupt signal.

Each time when the one band images of a document image are stored in the expansion memory 67a, the display synthesis processing section 82a synthesizes the one band images to form the document image IMG1; after synthesizing the one band images of the document image IMG1, the one band images of the document image IMG2 are synthesized. The above processes are continued to synthesize the one band images to form the document image IMG4. The LCD controller 85 displays the document image IMG1 in the order of band images L1, L2, L3, L4, and L5, after displaying the document image IMG1, the document image IMG2 is displayed. The above processes are continued to display the document image IMG4. The band images L1 through L5 are almost simultaneously displayed.

Since the document images IMG2 through IMG4 are displayed after displaying the document image IMG1 and after synthesizing the one band images thereof, the document image IMG1 is displayed longer than the document images IMG2 through IMG4. Therefore, the user can watch the document image IMG1 for a long time.

Next, referring to FIGS. 51 through 58, cases are described. In the cases, a preview image is displayed by aggregating two or more document images into one page. For example, when four document images are aggregated into one page, the sizes of the four document images are reduced. When an enlarged document image is reduced, the image quality is degraded; therefore, it is preferable that the original document image be reduced. Therefore, as shown in the data flow of FIG. 11, the original document image stored in the HDD 68 is used.

Figure 51:
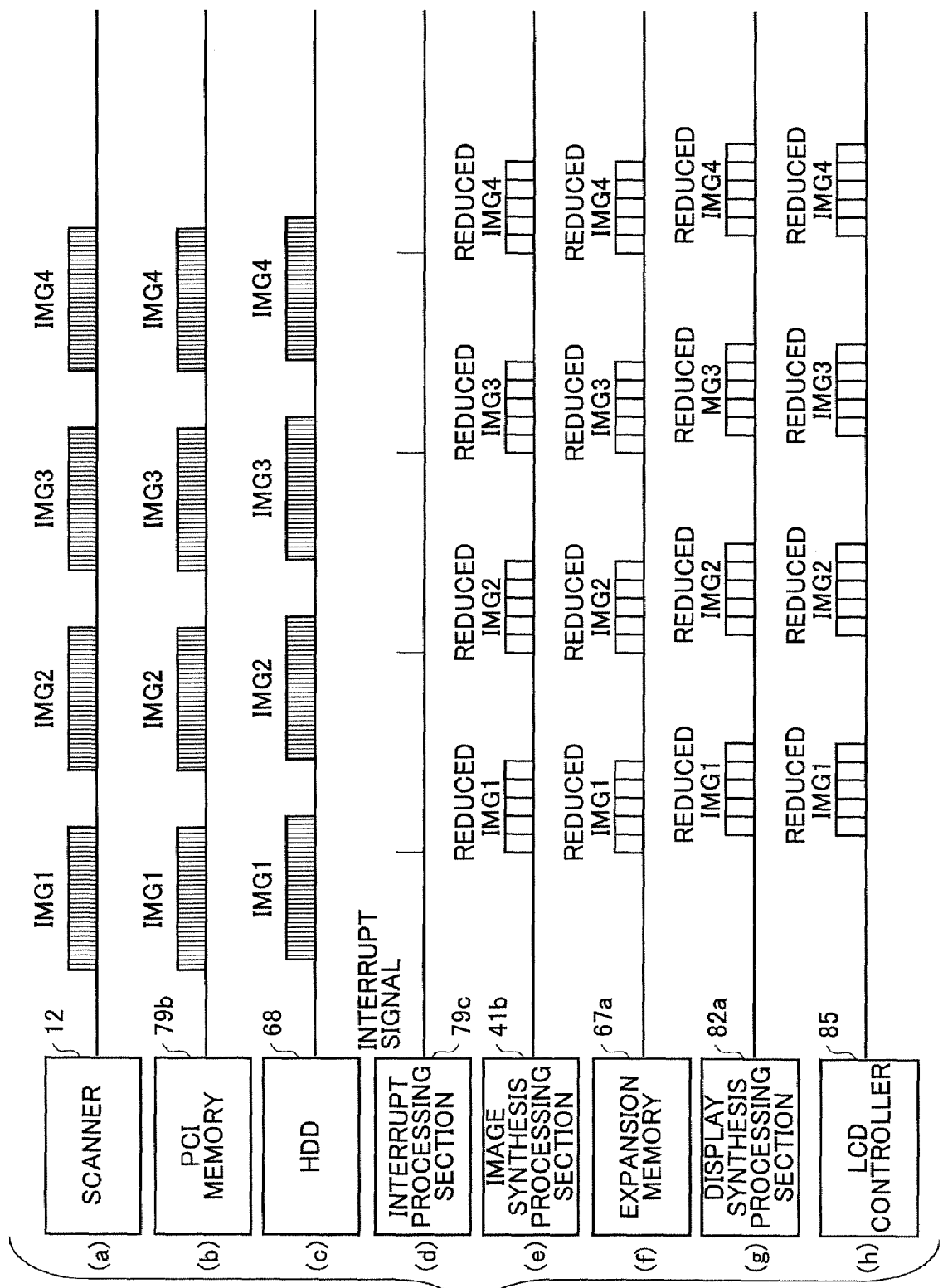
FIG. 51 is a first timing chart in which a preview image is displayed by aggregating four document images into one page.

First, referring to FIGS. 51 through 55, a first displaying method is described in which four document images are aggregated into one page. FIG. 51 is a first timing chart in which a preview image is displayed by aggregating four document images into one page. In FIG. 51, signals of the document images IMG1, IMG2, IMG3, and IMG4 read by the scanner 12 are instantly stored in the PCI memory 79b. In addition, the signals of the document images IMG1, IMG2, IMG3, and IMG4 are sequentially stored in the HDD 68 based on an image transfer clock generated at each time when an image of one band having the predetermined number of lines is read.

The interrupt processing section 79c calculates interrupt timing from a reducing factor designated by a processing condition. When the size of a document image is to be reduced, since the original document image is read from the HDD 68 by thinning (not reading all) data thereof, the reading speed is higher than the writing speed to the HDD 68. Therefore, the interrupt timing is determined by a predetermined algorithm with the consideration of the writing speed. For example, in a four document image aggregation, each document image, IMG1, IMG2, IMG3, or IMG4 is reduced to ¼ size, and the reading speed is four times higher than the writing speed due to the thinning. Therefore, the interrupt timing is the time when 75% of the document image IMG1 is written in the HDD 68.

The interrupt processing section 79c generates an interrupt signal at the calculated interrupt timing. The image synthesis processing section 41b sequentially reads the document images IMG1 through IMG4 based on the reading speed of the reducing factor while instantly storing the document images IMG1 through IMG4 in the expansion memory 67a.

Each time when the one band image of the reduced document image is stored in the expansion memory 67a, the display synthesis processing section 82a synthesizes the reduced document images IMG1 through IMG4 to form display images. The LCD controller 85 sequentially displays the reduced document images IMG1 through IMG4 on the LCD panel 90 in one sheet region. The reduced document images IMG1 through IMG4 are instantly displayed. In the LCD controller 85 of FIG. 51, the displaying timings of the reduced document images IMG1 through IMG4 on one sheet in the order of upper left, upper right, lower left, and lower right positions are shown.

Figure 52:
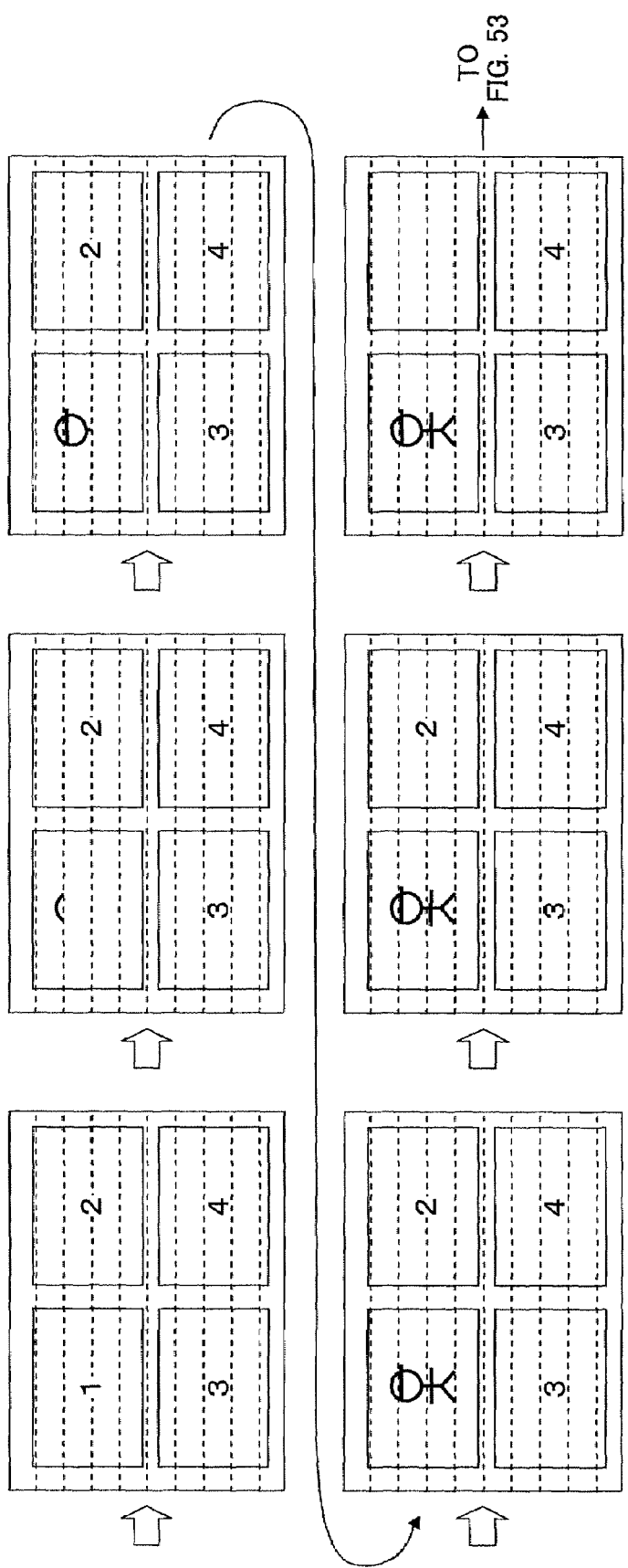
FIG. 52 is a diagram showing a first screen flow in which a preview image having four reduced document images is displayed.
Figure 53:
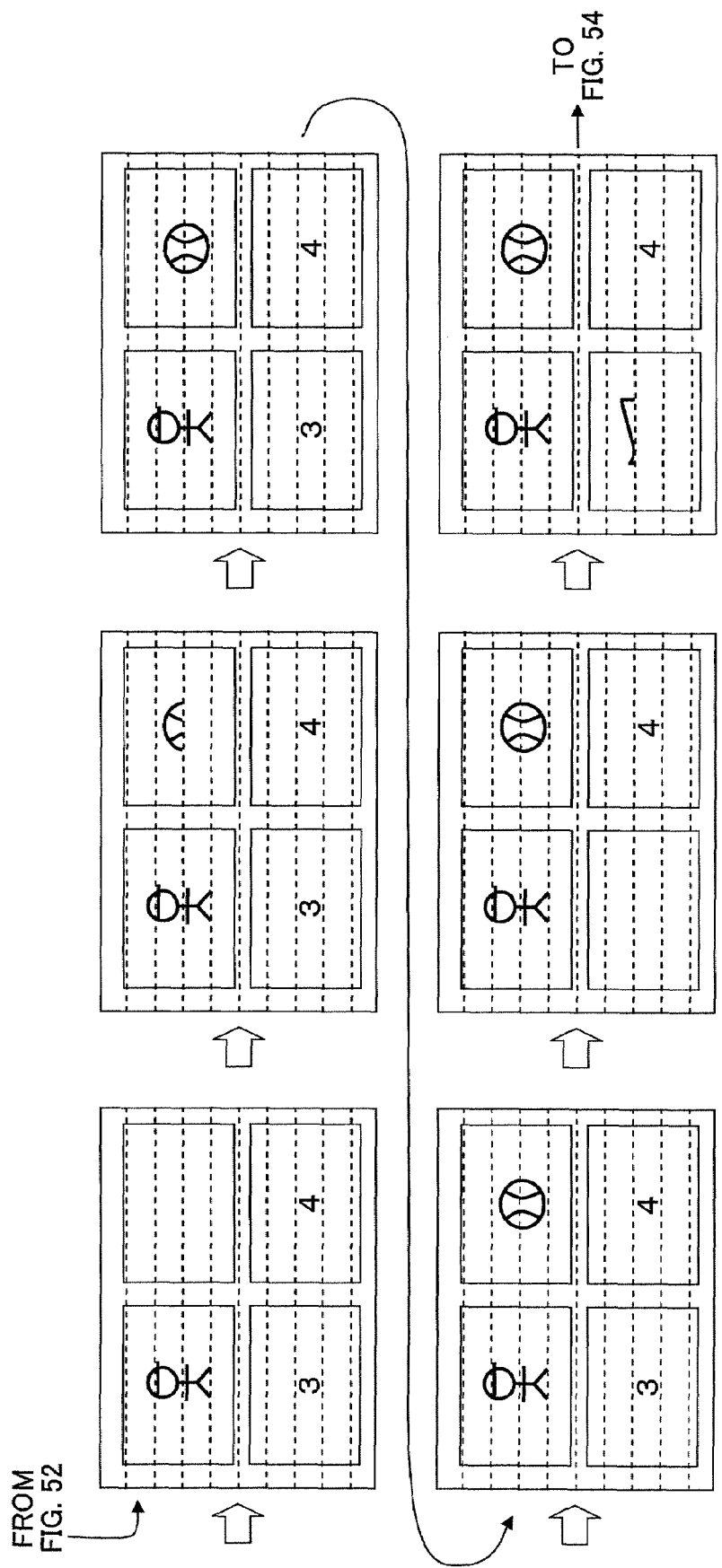
FIG. 53 is a diagram showing a second screen flow in which a preview image having the four reduced document images is displayed.
Figure 54:
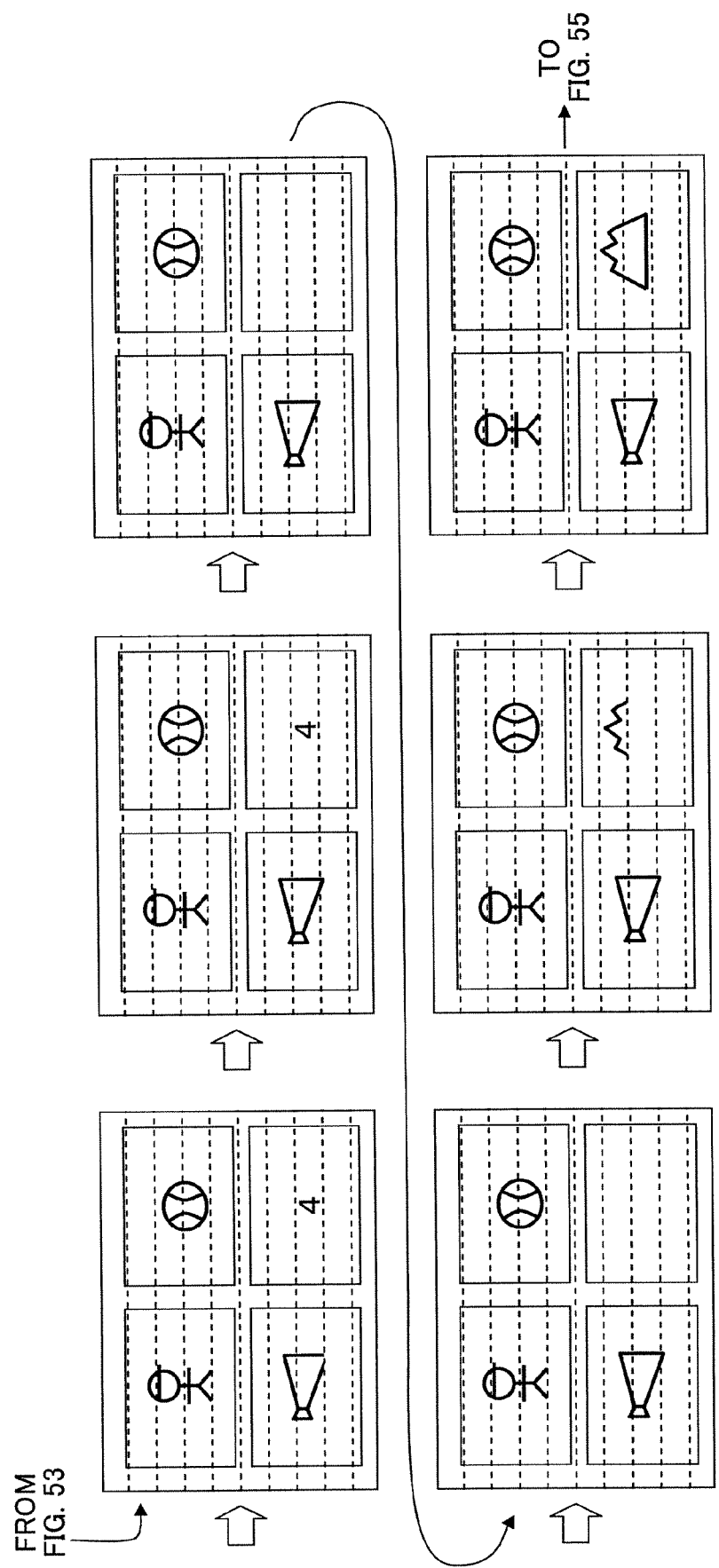
FIG. 54 is a diagram showing a third screen flow in which a preview image having the four reduced document images is displayed.

Referring to FIGS. 52 through 55, screen flows by the displaying timings are described. FIG. 52 is a diagram showing a first screen flow in which a preview image having the four reduced document images is displayed. FIG. 53 is a diagram showing a second screen flow in which a preview image having the four reduced document images is displayed. FIG. 54 is a diagram showing a third screen flow in which a preview image having the four reduced document images is displayed. FIG. 55 is a diagram showing a fourth screen flow in which a preview image having the four reduced document images is displayed. The screen flow for displaying a preview image of four document image aggregation is completed by connecting the screen flows shown in FIGS. 52 through 55.

In FIG. 52, first, the reduced document image IMG1 is displayed in the order of the one band images in the upper left position 1. Next, in FIG. 53, the reduced document image IMG2 is displayed in the order of the one band images in the upper right position 2, and the reduced document image IMG3 is started to display in the order of the one band images in the lower left position 3. Then, in FIG. 54, the reduced document image IMG3 is displayed in the order of the one band images in the lower left position 3, and the reduced document image IMG4 is started to display in the order of the one band images in the lower right 4. Finally, in FIG. 55, the reduced document image IMG4 is displayed in the lower right position 4. With this, a preview image of the four document image aggregation is completed.

Figure 56:
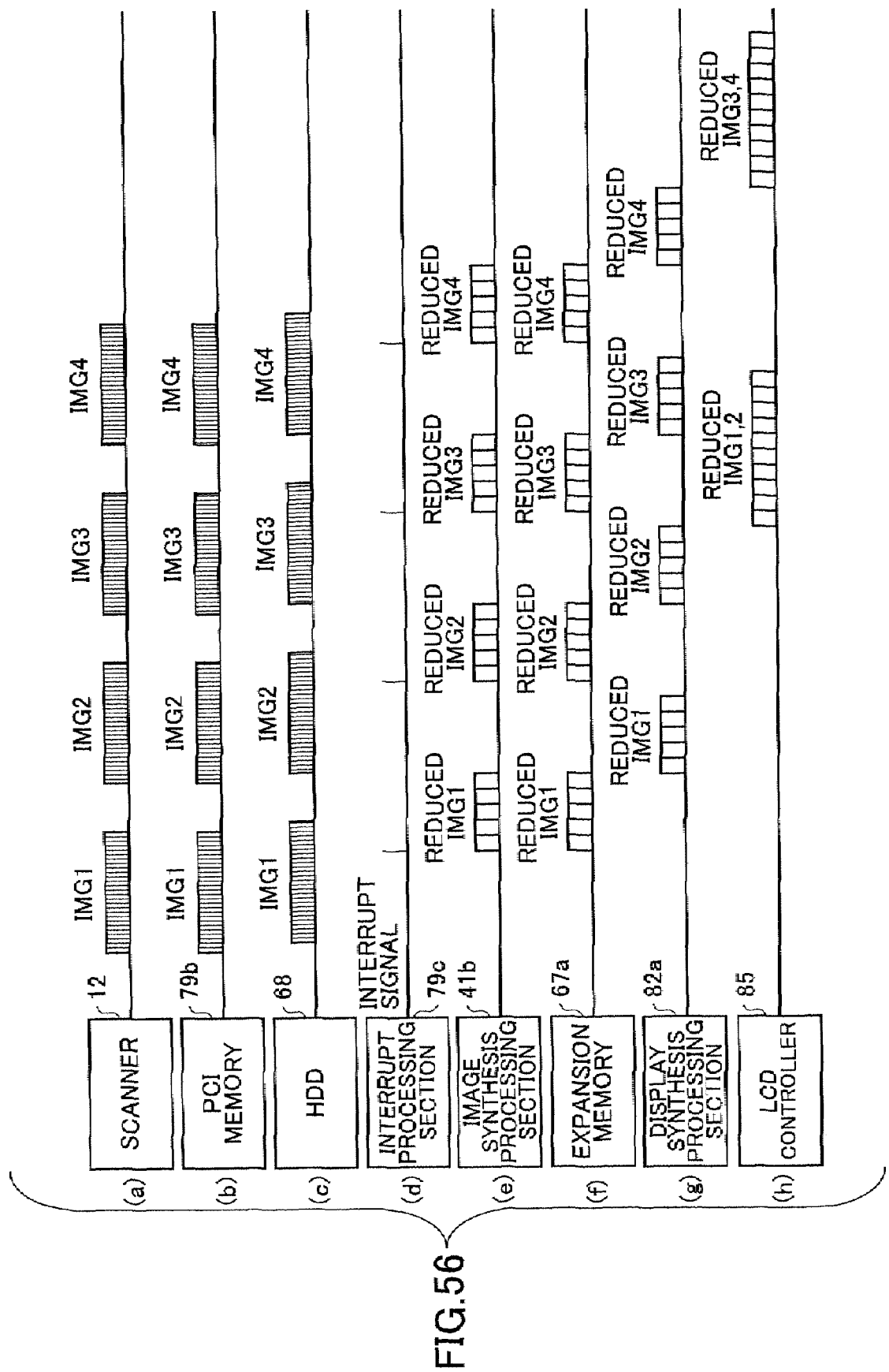
FIG. 56 is a second timing chart in which a preview image is displayed by aggregating four document images into one page.
Figure 57:
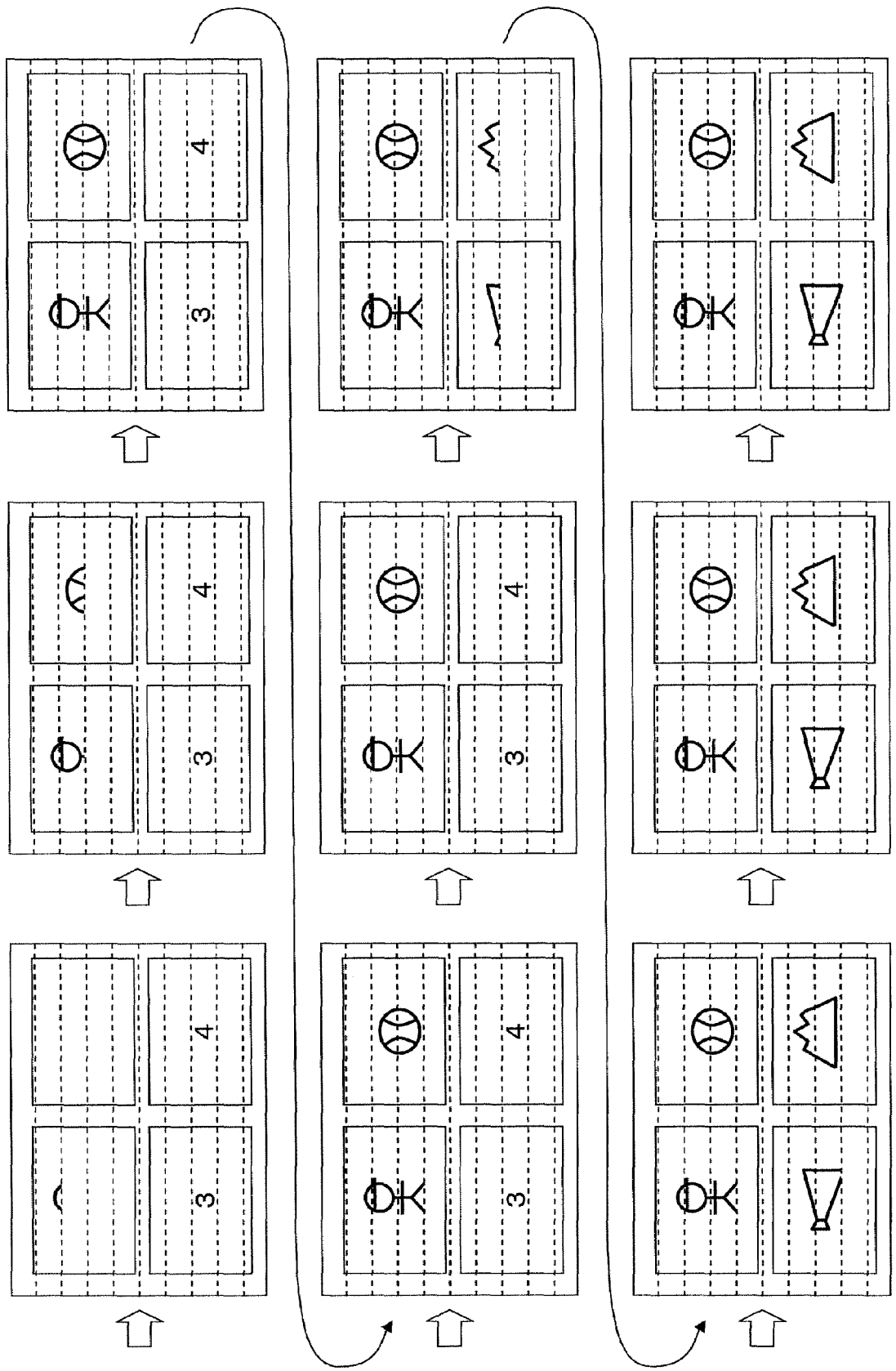
FIG. 57 is a diagram showing a screen flow in which a preview image having the four reduced document images is displayed based on the second timing chart.

Next, referring to FIGS. 56 and 57, a second displaying method is described in which four document images are aggregated into one page. In the second displaying method, the band images of two reduced document images are simultaneously displayed. FIG. 56 is a second timing chart in which a preview image is displayed by aggregating four document images into one page. In FIG. 56, signals of the document images IMG1, IMG2, IMG3, and IMG4 read by the scanner 12 are instantly stored in the PCI memory 79b. In addition, the signals of the document images IMG1, IMG2, IMG3, and IMG4 are sequentially stored in the HDD 68 based on an image transfer clock generated at each time when an image of one band having the predetermined number of lines is read.

The interrupt processing section 79c calculates interrupt timing from a reducing factor designated by a processing condition. The calculation method of the interrupt timing is the same as that in the first displaying method described above.

The interrupt processing section 79c generates an interrupt signal based on the calculated interrupt timing. The image synthesis processing section 41b sequentially reads the document images IMG1 through IMG4 based on the reading speed of the reducing factor of the four document image aggregation while instantly storing the document images IMG1 through IMG4 in the expansion memory 67a.

Each time when the one band images of the reduced document image are stored in the expansion memory 67a, the display synthesis processing section 82a sequentially synthesizes the reduced document images IMG1 through IMG4 to form display images. When the reduced document image IMG2 is formed, the LCD controller 85 simultaneously displays the reduced document images IMG1 and IMG2 on a predetermined region, and when the reduced document image IMG4 is formed, the LCD controller 85 simultaneously displays the reduced document images IMG3 and IMG4 on another predetermined region.

In the LCD controller 85 of FIG. 56, the displaying timing to simultaneously display the reduced document images IMG1 and IMG2 on upper half position of one sheet and the displaying timing to simultaneously display the reduced document images IMG3 and IMG4 on lower half position of the one sheet are shown.

Referring to FIG. 57, a screen flow by the displaying timings is described. FIG. 57 is a diagram showing a screen flow in which a preview image having the four reduced document images is displayed based on the second timing chart. In FIG. 57, the reduced document images IMG1 and IMG2 are simultaneously displayed in the order of the one band images in the upper half positions on one sheet. Then, the reduced document images IMG3 and IMG4 are simultaneously displayed in the order of the one band images in the lower half positions on the one sheet.

Figure 58:
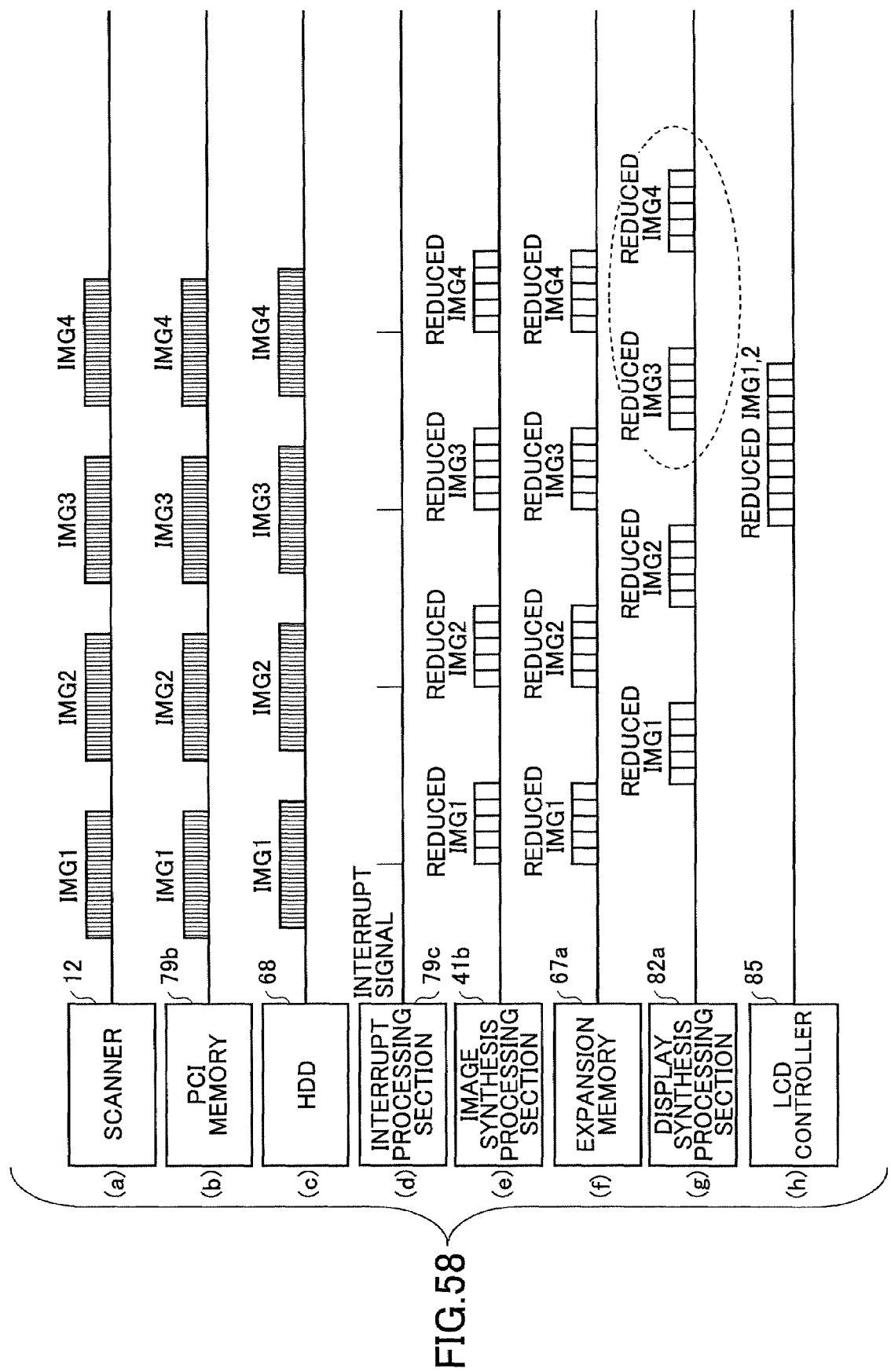
FIG. 58 is a third timing chart in which a preview image is displayed by aggregating two document images into one page.

Next, referring to FIG. 58, a third displaying method is described in which two document images are aggregated into one page. In the third displaying method, the band images of two reduced document images are simultaneously displayed. FIG. 58 is a third timing chart in which a preview image is displayed by aggregating two document images into one page. In FIG. 58, signals of the document images IMG1, IMG2, IMG3, and IMG4 read by the scanner 12 are instantly stored in the PCI memory 79b. In addition, the signals of the document images IMG1, IMG2, IMG3, and IMG4 are sequentially stored in the HDD 68 based on an image transfer clock generated at each time when an image of one band having the predetermined number of lines is read.

The interrupt processing section 79c calculates interrupt timing from a reducing factor designated by a processing condition. The calculation method of the interrupt timing is the same as that in the first displaying method described above. However, in this case, since the reducing factor is 50%, the reading speed is twice that of the writing speed. Therefore, the interrupt timing is the time when 50% of the document image IMG1 is written in the HDD 68.

Each time when the one band images of the reduced document image are stored in the expansion memory 67a, the display synthesis processing section 82a sequentially synthesizes the reduced document images IMG1 through IMG4 to form display images. When the reduced document image IMG2 is formed, the LCD controller 85 simultaneously displays the reduced document images IMG1 and IMG2 on one sheet.

In FIG. 58, since the display synthesis processing section 82a stores the synthesized reduced document images IMG3 and IMG4, when the page is turned, a next preview image formed of the reduced document images IMG3 and IMG4 can be quickly displayed.

Figure 59:
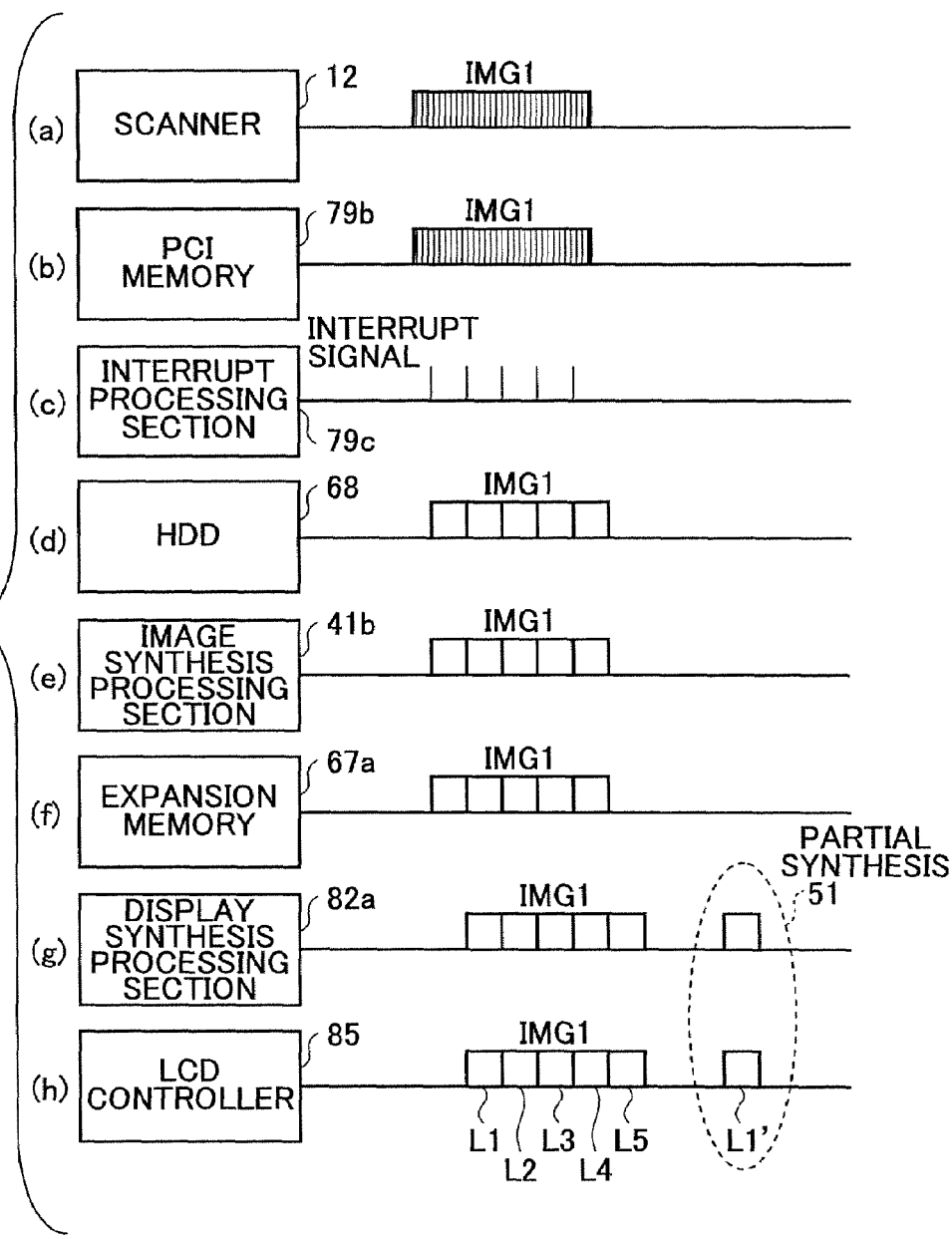
FIG. 59 is a timing chart showing processes to attach a staple mark on a preview image of a document image.

Referring to FIGS. 59 through 61, a case is described. In this case, a preview image of a document image is displayed by attaching a staple mark to the preview image. When the user pushes the staple button 100b on the screen G100 displaying a preview image shown in FIG. 18, the image processing apparatus 1 synthesizes a staple mark on a band image where the staple mark is to be displayed and displays a preview image having the staple mark.

In FIGS. 59 through 61, one staple mark is attached to the document image IMG1. However, when plural staple marks are attached to the document image IMG1, the same processes as those shown in FIG. 59 can be used. FIG. 59 is a timing chart showing processes to attach a staple mark on a preview image of a document image. In FIG. 59, signals of the document image IMG1 read by the scanner 12 are instantly stored in the PCI memory 79b.

The interrupt processing section 79c generates an interrupt signal each time when the scanner 12 reads an image of one band having the predetermined number of lines. The HDD 68 stores the one band image based on an image transfer clock, and the image synthesis processing section 41b and the expansion memory 67a obtain the one band image based on the interrupt signal.

Each time when the one band images are stored in the expansion memory 67a, the display synthesis processing section 82a synthesizes the one band images to form the document image IMG1. The LCD controller 85 displays the document image IMG1 in the order of band images L1, L2, L3, L4, and L5. The band images L1 through L5 are almost simultaneously displayed.

When the user pushes the staple button 100b and designates the position of a staple mark in the document image IMG1 which is previewed, the display synthesis processing section 82a synthesizes a part of the band image L1 where the staple is to be attached with a staple mark read from the symbol mark region 84a (partial synthesis 51) and rewrites the position of the staple mark on a part of the band image where the staple mark is already positioned. Then the new staple mark position is displayed. In FIG. 59, the LCD controller 85 displays the staple mark position at a position L1'.

When the document images IMG2, IMG3, IMG4, . . . are read after reading the document image IMG1, the normal operation shown in FIG. 45 is used.

FIG. 60 is a screen flow when a staple mark is attached to a preview image. In FIG. 60, when a document image is displayed by the band images L1 through L5 and the user designates a staple position of a staple mark M31, the band image L1 is replaced by a synthesis image part 52.

When a preview image is displayed by being enlarged, as shown in FIG. 61, a part of the document image is replaced by a new image.

FIG. 61 is a diagram showing screens of preview images in which the staple position is determined. In a screen G501 shown of FIG. 61(a), on a sheet image SHT1 of a normal preview display, a staple position is determined and the staple mark L31 is displayed. In a screen G502 of FIG. 61(b), the staple position is enlarged.

As described above, according to the embodiment of the present invention, a user can determine a processing condition for printing a document image by directly operating a preview image. In addition, the user can determine the processing condition by operations such as a click and a drag. Further, the user can visually and intuitively determine the processing condition.

Moreover, according to the embodiment of the present invention, when the user touches a desirable position on a preview image, the user can designate a binding position by a staple. In addition, since the user can operate on the preview image by touching a screen and pushing a button, the operability for the user can be increased.

Further, the present invention is not limited to the specifically disclosed embodiment, and variations and modifications may be made without departing from the scope of the present invention.

The present invention is based on Japanese Priority Patent Application No. 2006-073406, filed on Mar. 16, 2006, and Japanese Priority Patent Application No. 2007-060381, filed on Mar. 9, 2007, with the Japanese Patent Office, the entire contents of which are hereby incorporated herein by reference.

What is claimed is:

1. An image processing apparatus which previews a read image, comprising:
a preview image processing unit in which a user sets a processing condition for the read image by operating on the read image to generate a first preview image of a first side of a page to be printed, the processing condition including a binding condition and a double-sided printing condition; and
a displaying section configured to display the first preview image processed by the processing condition together with the setting of the processing condition, wherein
the preview image processing unit is configured to orient the first preview image according to the double-sided printing condition, the binding condition, and an orientation of a second preview image of a second side of the page to be printed.

2. The image processing apparatus as claimed in claim 1, wherein:
the preview image processing unit allows the user to apply a process to the read image to which the processing condition is to be applied and displays a processed preview image on a displaying section.

3. The image processing apparatus as claimed in claim 2, wherein:
the preview image processing unit makes the user designate a finishing process for the read image as the processing condition.

4. The image processing apparatus as claimed in claim 2, wherein:
the preview image processing unit allows the user to designate a binding position of documents of pages to be printed by dragging on the read image in a page turning direction, and displays the page turning status in a moving image.

5. The image processing apparatus as claimed in claim 4, wherein:
the preview image processing unit displays a message when the page turning direction dragged by the user on the read image does not correspond to the binding position of the documents.

6. The image processing apparatus as claimed in claim 4, wherein:
the preview image processing unit includes
a determining unit for determining whether the binding position of the documents overlaps the read image; and
a warning message displaying unit for displaying a warning message when the binding position of the documents overlaps the read image.

7. The image processing apparatus as claimed in claim 6, wherein:
the preview image processing unit displays a function button for adjusting the binding position of the documents when the binding position of the documents overlaps the read image.

8. The image processing apparatus as claimed in claim 1, wherein:
image processing timing is changed corresponding to the set processing condition.

9. The image processing apparatus as claimed in claim 8, wherein:
at least one of image synthesizing timing to form a print image and image synthesizing timing to form a preview image is changed for the read image by a scanner corresponding to the setting of the processing condition.

10. The image processing apparatus as claimed in claim 1, wherein:
the preview image processing unit is effective before and after reading an image.

11. The image processing apparatus of claim 1, wherein
the preview image processing unit is configured to orient a head and tail of the first preview image according to a head and tail orientation of the second preview image.

12. The image processing apparatus of claim 1, wherein
the displaying section is configured to display the first preview image and a third preview image of a first side of a second page to be printed according to the double-sided printing condition and the binding condition.

13. The image processing apparatus of claim 1, wherein:
the binding condition is set in the preview image processing unit to include one or more staple positions.

14. The image processing apparatus of claim 1, wherein:
the binding condition is set in the preview image processing unit to include one or more punched hole positions.

15. A preview image displaying method which previews a read image on a displaying panel in an image processing apparatus, comprising:
setting a processing condition for the read image by operating on the read image to generate a first preview image of a first side of a page to be printed, the processing condition including a binding condition and a double-sided printing condition; and
displaying the first a preview image processed by the processing condition together with the setting of the processing condition on the displaying panel; and
orienting the first preview image according to the double-sided printing condition, the binding condition, and an orientation of a second preview image of a second side of the page to be printed.

16. The preview image displaying method as claimed in claim 15, wherein:
the preview image processing step allows the user to designate a binding position of documents on the read image.

17. The preview image displaying method as claimed in claim 15, wherein:
the preview image processing step makes the user designate a finishing process for the read image as the processing condition.

18. The preview image displaying method as claimed in claim 15, wherein:
image processing timing is changed corresponding to the set processing condition.

19. The preview image displaying method as claimed in claim 15, wherein:
the preview image processing step is effective before and after reading an image.

\* \* \* \* \*